(12) United States Patent
Lin et al.

(10) Patent No.: US 11,226,472 B2
(45) Date of Patent: Jan. 18, 2022

(54) OPTICAL IMAGING MODULE, IMAGE CAPTURING APPARATUS AND ELECTRONIC DEVICE

(71) Applicant: LARGAN PRECISION CO., LTD., Taichung (TW)

(72) Inventors: Cheng-Chen Lin, Taichung (TW); Chun-Yen Chen, Taichung (TW); Yu-Tai Tseng, Taichung (TW); Kuan-Ting Yeh, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 16/394,168

(22) Filed: Apr. 25, 2019

(65) Prior Publication Data

US 2019/0250380 A1   Aug. 15, 2019

Related U.S. Application Data

(63) Continuation of application No. 15/673,615, filed on Aug. 10, 2017, now Pat. No. 10,317,646.
(Continued)

(51) Int. Cl.
*G02B 13/00* (2006.01)
*G02B 9/62* (2006.01)
(Continued)

(52) U.S. Cl.
CPC .......... *G02B 13/0045* (2013.01); *G02B 9/62* (2013.01); *G02B 13/04* (2013.01); *G02B 13/18* (2013.01);
(Continued)

(58) Field of Classification Search
CPC ........ G02B 9/62; G02B 9/64; G02B 13/0045; G02B 13/18; G02B 27/0025; H04N 5/2254
(Continued)

(56) References Cited

U.S. PATENT DOCUMENTS 5,663,836 A    9/1997   Ogata
9,201,216 B2   12/2015  Huang et al.
(Continued)

FOREIGN PATENT DOCUMENTS

CN    103777330 A    5/2014
CN    104991331 A    10/2015
(Continued)

*Primary Examiner* — Travis S Fissel
(74) *Attorney, Agent, or Firm* — McClure, Qualey & Rodack, LLP

(57) ABSTRACT

An optical imaging module includes six lens elements, the six lens elements being, in order from an object side to an image side, a first lens element, a second lens element, a third lens element, a fourth lens element, a fifth lens element and a sixth lens element. The first lens element has negative refractive power. The second lens element has an image-side surface being concave. The third lens element has an image-side surface being convex. The fourth lens element has positive refractive power. The fifth lens element with negative refractive power has an object-side surface being concave and an image-side surface being convex. The sixth lens element has an image-side surface being concave, wherein an object-side surface and the image-side surface of the sixth lens element are both aspheric, and the image-side surface of the sixth lens element includes at least one inflection point.

29 Claims, 41 Drawing Sheets

Related U.S. Application Data

(60) Provisional application No. 62/408,134, filed on Oct. 14, 2016.

(51) Int. Cl.
  *G02B 13/18* (2006.01)
  *G02B 27/00* (2006.01)
  *G02B 13/04* (2006.01)
  *H04N 5/225* (2006.01)

(52) U.S. Cl.
  CPC ....... *G02B 27/0025* (2013.01); *H04N 5/2254* (2013.01)

(58) Field of Classification Search
  USPC .................................. 359/713, 756, 761, 658
  See application file for complete search history.

(56) References Cited

U.S. PATENT DOCUMENTS

| | | | |
|---|---|---|---|
| 2012/0268835 A1 | 10/2012 | Huang | |
| 2014/0092491 A1* | 4/2014 | Hsu | G02B 13/0045 359/761 |
| 2015/0116572 A1 | 4/2015 | Liao | |
| 2015/0116573 A1 | 4/2015 | Liao | |
| 2015/0207998 A1 | 7/2015 | Lin et al. | |
| 2015/0241659 A1* | 8/2015 | Huang | H04N 5/2254 348/360 |
| 2016/0142627 A1 | 5/2016 | Chou et al. | |
| 2016/0154211 A1 | 6/2016 | Jo | |
| 2016/0223796 A1* | 8/2016 | Lee | G02B 9/62 |
| 2016/0274339 A1 | 9/2016 | Lee | |
| 2016/0341933 A1* | 11/2016 | Liu | G02B 9/62 |
| 2017/0031135 A1 | 2/2017 | Tang et al. | |
| 2017/0031136 A1 | 2/2017 | Tang et al. | |
| 2017/0045718 A1 | 2/2017 | Park | |
| 2017/0153420 A1 | 6/2017 | Park | |
| 2017/0160519 A1 | 6/2017 | Katsuragi | |
| 2017/0184818 A1 | 6/2017 | Dai et al. | |
| 2017/0269336 A1* | 9/2017 | Lai | G02B 7/04 |

FOREIGN PATENT DOCUMENTS

| | | |
|---|---|---|
| CN | 106443969 A | 2/2017 |
| JP | H05-346542 A | 12/1993 |
| JP | H07-27976 A | 1/1995 |
| JP | 2004-354572 A | 12/2004 |
| TW | 201618531 A | 5/2016 |
| WO | 2014-192567 A | 12/2014 |

* cited by examiner

OPTICAL IMAGING MODULE, IMAGE CAPTURING APPARATUS AND ELECTRONIC DEVICE

RELATED APPLICATIONS

The present application is a continuation of the application Ser. No. 15/673,615, filed Aug. 10, 2017, now U.S. Pat. No. 10,317,646, which claims priority to U.S. Provisional Application Ser. No. 62/408,134, filed Oct. 14, 2016, which is herein incorporated by reference.

BACKGROUND

Technical Field

The present disclosure relates to an optical imaging module and an image capturing apparatus. More particularly, the present disclosure relates to a compact optical imaging module and an image capturing apparatus which are applicable to electronic devices.

Description of Related Art

With widespread utilizations of image capturing apparatuses in different fields, applications in various smart electronic devices such as embedded automobile devices, identification systems, entertainment devices, sports devices and smart home systems are becoming the trend of the technology development in the future, particularly portable electronic devices which are popular among public demands. In order to provide a wider range of user experiences, the smart electronic devices equipped with one, two, three or more image capturing apparatuses or imaging lens apparatuses gradually become mainstream products in the market, so that the optical imaging modules with various features has been developed based on different requirements.

The optical imaging module in a conventional wide-angle lens apparatus is often equipped with spherical glass lens elements and its aperture stop being positioned closer to the image surface, thus the lens elements thereof require larger lens surfaces for receiving light and become difficult for size reduction of the wide-angle lens apparatus in order to achieve compact size. Accordingly, the image capturing apparatus would become large and thick, which is not favorable for satisfying the requirement of compactness in portable electronic devices. Currently, the view angle of most micro image capturing apparatuses with high image quality is still very limited and unable to provide a sufficient photographing range. Therefore, the conventional optical imaging modules can no longer satisfy the needs of the current technology development.

SUMMARY

According to one aspect of the present disclosure, an optical imaging module includes six lens elements, the six lens elements being, in order from an object side to an image side, a first lens element, a second lens element, a third lens element, a fourth lens element, a fifth lens element and a sixth lens element. The first lens element has negative refractive power. The second lens element has an image-side surface being concave. The third lens element has an image-side surface being convex. The fourth lens element has positive refractive power. The fifth lens element with negative refractive power has an object-side surface being concave and an image-side surface being convex. The sixth lens element has an image-side surface being concave, wherein an object-side surface and the image-side surface of the sixth lens element are both aspheric, and the image-side surface of the sixth lens element includes at least one inflection point. When an axial distance between the second lens element and the third lens element is T23, an axial distance between the fifth lens element and the sixth lens element is T56, a focal length of the first lens element is f1, and a focal length of the second lens element is f2, the following conditions are satisfied:

$0 < T56/T23 < 3.0$; and $|f1/f2| < 3.0$.

According to another aspect of the present disclosure, an image capturing apparatus includes the optical imaging module according to the aforementioned aspect, a driving unit and an image sensor. The driving unit is for driving the optical imaging module. The image sensor is disposed on an image surface of the optical imaging module.

According to another aspect of the present disclosure, an electronic device includes the image capturing apparatus according to the foregoing aspect and an imaging lens apparatus, wherein a maximum field of view of the imaging lens apparatus is smaller than a maximum field of view of the optical imaging module.

According to another aspect of the present disclosure, an optical imaging module includes six lens elements, the six lens elements being, in order from an object side to an image side, a first lens element, a second lens element, a third lens element, a fourth lens element, a fifth lens element and a sixth lens element. The first lens element has negative refractive power. The second lens element has an image-side surface being concave. The third lens element has an image-side surface being convex. The fifth lens element with negative refractive power has an object-side surface being concave and an image-side surface being convex. The sixth lens element has an image-side surface being concave, wherein an object-side surface and the image-side surface of the sixth lens element are both aspheric, and the image-side surface of the sixth lens element includes at least one inflection point. When a focal length of the optical imaging module is f, a central thickness of the sixth lens element is CT6, a focal length of the first lens element is f1, and a focal length of the second lens element is f2, the following conditions are satisfied:

$0.30 < f/CT6 < 3.50$; and $|f1/f2| < 3.0$.

According to another aspect of the present disclosure, an optical imaging module includes six lens elements, the six lens elements being, in order from an object side to an image side, a first lens element, a second lens element, a third lens element, a fourth lens element, a fifth lens element and a sixth lens element. The first lens element has negative refractive power. The second lens element has an object-side surface being convex. The third lens element has an image-side surface being convex. The fourth lens element has positive refractive power. The fifth lens element with negative refractive power has an object-side surface being concave and an image-side surface being convex. The sixth lens element has an image-side surface being concave, wherein an object-side surface and the image-side surface of the sixth lens element are both aspheric, and the image-side surface of the sixth lens element includes at least one inflection point. When a central thickness of the first lens element is CT1, and a central thickness of the sixth lens element is CT6, the following condition is satisfied:

$0 < CT1/CT6 < 0.60$.

DETAILED DESCRIPTION

Figure 1:
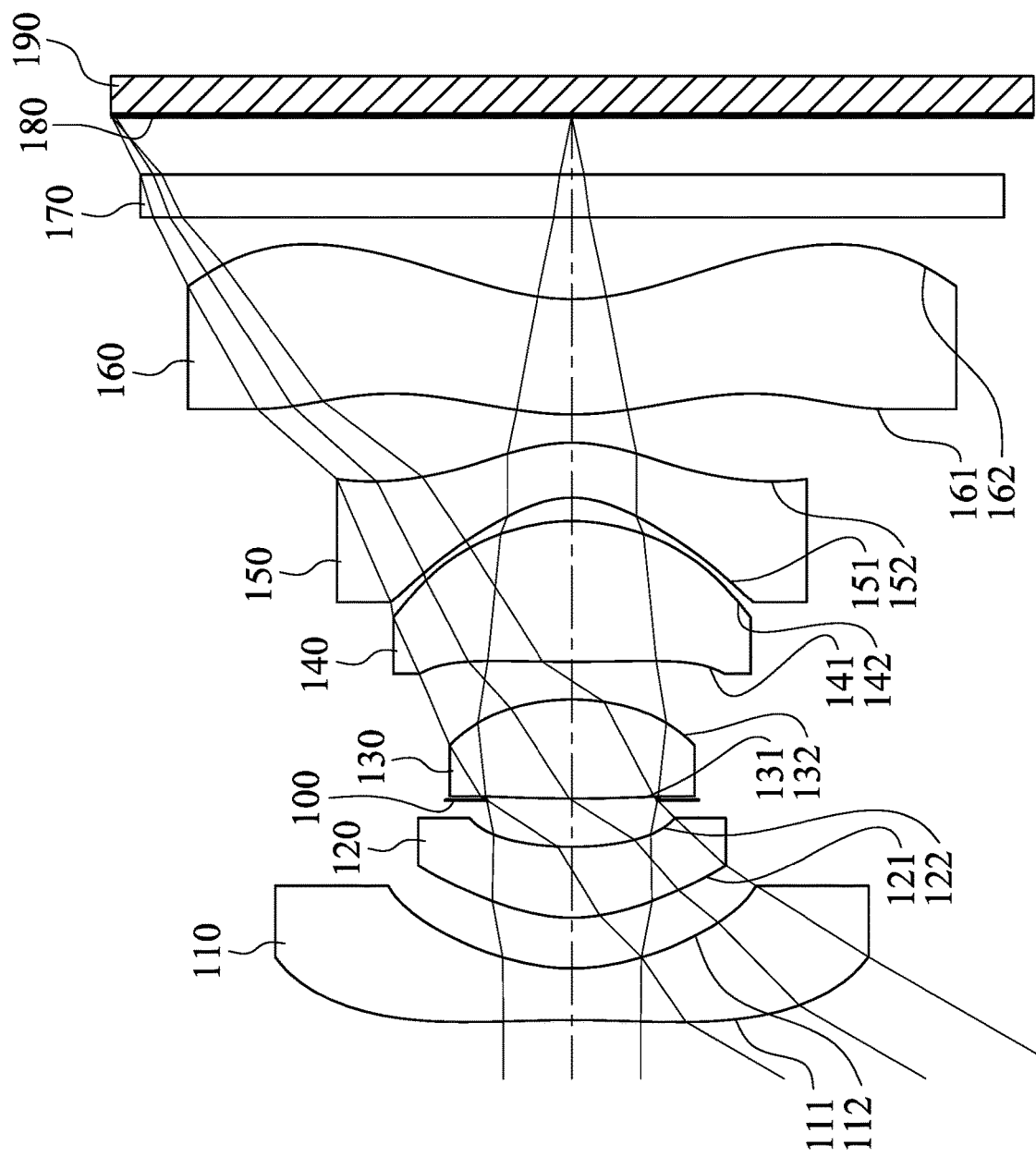
FIG. 1 is a schematic view of an image capturing apparatus according to the 1st embodiment of the present disclosure.

An optical imaging module includes six lens elements, in order from an object side to an image side, a first lens element, a second lens element, a third lens element, a fourth lens element, a fifth lens element and a sixth lens element.

The first lens element has negative refractive power. Therefore, it is favorable for enlarging the field of view of the optical imaging module so as to satisfy requirements of various applications. The first lens element can have an object-side surface being concave, so that the curvature of the first lens element can be well distributed to avoid any single lens surface with overly large curvature, which would reduce the manufacturability. At least one of the object-side surface and an image-side surface of the first lens element can include at least one inflection point. Therefore, it is favorable for effectively reducing the space proportion occupied by the first lens element, so that the optical imaging module can be prevented from being excessively large, and becomes favorable in designs and applications for compact electronic devices.

The second lens element can have positive refractive power. Therefore, the light converging ability of the object side of the optical imaging module can be provided so as to miniaturize the image capturing apparatus and the electronic device. The second lens element can have an object-side surface being convex. Therefore, it is favorable for receiving the light with a larger range from the first lens element and avoiding the total reflection resulted from a large incident angle in an off-axial region thereof, so as to reduce the unwanted light spots in the image. The second lens element can have an image-side surface being concave. Therefore, it is favorable for balancing aberrations of the optical imaging module so as to enhance image quality with high clarity.

The third lens element can have positive refractive power. Therefore, the positive refractive power of the optical imaging module can be effectively distributed between the third lens element and the fourth lens element, so that excessive aberrations and the stray light resulted from overly large curvature of the fourth lens element can be avoided. The third lens element can have an image-side surface being convex. Therefore, it is favorable for enhancing the symmetry of the optical imaging module so as to prevent excessive aberrations. The fourth lens element can have positive refractive power. Therefore, it is favorable for providing the main portion of light convergence power of the optical imaging module to control the total track length thereof so as to satisfy the requirements of compact electronic devices. The fourth lens element can have an image-side surface being convex. Therefore, it is favorable for enhancing the light converging ability of the image side of the optical imaging module so as to provide a retro-focus structure to be applicable to various image capturing apparatus with large field of view.

The fifth lens element has negative refractive power. Therefore, it is favorable for balancing the retro-focus design so as to effectively control the total track length of the optical imaging module and correcting the lateral chromatic aberration. The fifth lens element has an object-side surface being concave and an image-side surface being convex. Therefore, it is favorable for correcting off-axial aberrations, such as astigmatism etc.

At least one of object-side surfaces and image-side surfaces of the fourth lens element and the fifth lens element can include at least one inflection point. Therefore, it is favorable for correcting distortion and off-axial aberrations of the optical imaging module.

The sixth lens element can have an object-side surface being convex. Therefore, it is favorable for controlling the strength of refractive power with the surface shape so as to provide a correction lens design to enhance aberration corrections. The sixth lens element has an image-side surface being concave. Therefore, it is favorable for controlling the back focal length and maintaining the overall size of the optical imaging module being compact. The image-side surface of the sixth lens element includes at least one inflection point. Therefore, it is favorable for correcting off-axial aberrations and Petzval field curvature.

The optical imaging module can further include an aperture stop, which can be disposed between the second lens element and the third lens element. Therefore, it is favorable for enhancing the symmetry of the optical imaging module so as to avoid excessive aberrations.

When an axial distance between the second lens element and the third lens element is T23, and an axial distance between the fifth lens element and the sixth lens element is T56, the following condition is satisfied: $0<T56/T23<3.0$. Therefore, it is favorable for the spatial configuration of the optical imaging module and the off-axial aberration correction so as to avoid blurs around the image periphery. Preferably, the following condition is satisfied: $0<T56/T23<1.50$. More preferably, the following condition is satisfied: $0<T56/T23<0.80$.

When a focal length of the first lens element is f1, and a focal length of the second lens element is f2, the following condition is satisfied: $|f1/f2|<3.0$. Therefore, it is favorable for obtaining greater field of view by the first lens element with sufficient refractive power so as to enlarge the photographing range. Preferably, the following condition is satisfied: $|f1/f2|<2.0$. More preferably, the following condition is satisfied: $|f1/f2|<1.0$.

When a focal length of the optical imaging module is f, and a central thickness of the sixth lens element is CT6, the following condition is satisfied: $0.30<f/CT6<3.50$. Therefore, it is favorable for improving the structural strength and yield rate by avoiding the thickness of the sixth lens element being too thin. Preferably, the following condition is satisfied: $0.80<f/CT6<3.50$. More preferably, the following condition is satisfied: $1.20<f/CT6<3.50$.

When a central thickness of the first lens element is CT1, and the central thickness of the sixth lens element is CT6, the following condition is satisfied: $0<CT1/CT6<0.60$. Therefore, it is favorable for balancing the lens thickness configuration between the object side and the image side of the optical imaging module so as to increase the stability of the optical imaging module.

When an axial distance between the object-side surface of the first lens element and an image surface is TL, and a maximum image height of the optical imaging module is ImgH, the following condition is satisfied: $TL/ImgH<3.50$. Therefore, it is favorable for achieving the compact size of the optical imaging module with sufficient light receiving range, so as to increase the image brightness and enhance the image quality. Preferably, the following condition is satisfied: $1.50<TL/ImgH<2.50$.

When a curvature radius of an object-side surface of the third lens element is R5, and a curvature radius of the image-side surface of the third lens element is R6, the following condition is satisfied: $0<(R5+R6)/(R5-R6)<1.0$. Therefore, it is favorable for balancing the lens shape distribution of the optical imaging module with improved symmetry so as to enhance the image quality by having a desirable curvature configuration of the third lens element.

When an axial distance between the first lens element and the second lens element is T12, and the axial distance between the second lens element and the third lens element is T23, the following condition is satisfied: $0<T12/T23<2.80$. Therefore, it is favorable for avoiding the axial distance between the first lens element and the second lens element being excessively large while reducing the effective radius of the first lens element, so that the favorable aperture size of the electronic device may be obtained. Preferably, the following condition is satisfied: $0.30<T12/T23<1.80$.

When a half of a maximum field of view of the optical imaging module is HFOV, the following condition is satisfied: 1.20<tan(HFOV)<6.0. Therefore, it is favorable for obtaining the desirable photographing range of the optical imaging module so as to satisfy the demands of further applications. Preferably, the following condition is satisfied: 1.50<tan(HFOV)<3.5.

When an f-number of the optical imaging module is Fno, the following condition is satisfied: 1.40<Fno<2.80. Therefore, it is favorable for controlling the incident light range so as to ensure enough light on an image sensor and avoid insufficient image brightness.

When a maximum effective radius of the object-side surface of the first lens element is Y11, and a maximum effective radius of the image-side surface of the sixth lens element is Y62, the following condition is satisfied: 0.50<Y11/Y62<1.50. Therefore, it is favorable for effectively balancing the sizes of the lens elements between the object side and the image side of the optical imaging module, so as to avoid the optical imaging module being too large due to larger lens elements at the object side, and to avoid limited field of view resulted from smaller lens elements at the object side. Preferably, the following condition is satisfied: 0.50<Y11/Y62<1.10.

When an Abbe number of the fifth lens element is V5, and an Abbe number of the sixth lens element is V6, the following condition is satisfied: 0<V5/V6<0.50. Therefore, it is favorable for correcting the chromatic aberration so as to avoid image overlapping due to imaged position shifts from the light of different wavelengths.

When the focal length of the optical imaging module is f, a focal length of the third lens element is f3, and a focal length of the fourth lens element is f4, the following condition is satisfied: −0.50<(f/f3)−(f/f4)<0.50. Therefore, it is favorable for moderating the refractive power of the third lens element and the fourth lens element so as to avoid significant aberrations from excessive power differences between the third lens element and the fourth lens element.

When the axial distance between the fifth lens element and the sixth lens element is T56, and the central thickness of the sixth lens element is CT6, the following condition is satisfied: T56/CT6<0.80. Therefore, it is favorable for a better lens design by increasing the spatial configuration efficiency of the image side of the optical imaging module. Preferably, the following condition is satisfied: T56/CT6<0.50.

When a curvature radius of the object-side surface of the sixth lens element is R11, a curvature radius of the image-side surface of the sixth lens element is R12, and the central thickness of the sixth lens element is CT6, the following condition is satisfied: 1.50<(|R11|+|R12|)/CT6<5.50. Therefore, it is favorable for an effective configuration of the shapes and curvature strength of the sixth lens element so as to correct off-axial aberrations.

When the axial distance between the object-side surface of the first lens element and the image surface is TL, and the focal length of the optical imaging module is f, the following condition is satisfied: 2.0<TL/f<3.0. Therefore, it is favorable for providing the specifications of the optical imaging module with the wide field of view and being applicable to the electronic devices with thin form factor in accordance with the current market demands.

When a displacement in parallel with an optical axis from an axial vertex on the object-side surface of the first lens element to a maximum effective radius position on the object-side surface of the first lens element is Sag11, and a displacement in parallel with the optical axis from an axial vertex on the object-side surface of the second lens element to a maximum effective radius position on the object-side surface of the second lens element is Sag21, the following condition is satisfied: |Sag11/Sag21|<10.0. Therefore, it is favorable for effectively controlling the curvature strength of the lens elements of the object side of the optical imaging module so as to avoid mechanical design difficulties and poor aesthetics resulted from the excessively large opening for the optical imaging module in the electronic device. Preferably, the following condition is satisfied: |Sag11/Sag21|<5.00. More preferably, the following condition is satisfied: 0.30<|Sag11/Sag21|<2.0.

When a distortion percentage on the maximum image height of the optical imaging module is DST1.0, and the maximum field of view of the optical imaging module is FOV, the following condition is satisfied: |DST1.0/FOV|<0.25 (%/degrees). Therefore, it is favorable for controlling the total track length and maintaining the large field of view while having enough light receiving area, so as to overcome the disadvantages of insufficient off-axial brightness in a conventional wide-angle lens apparatus.

When the focal length of the optical imaging module is f, the focal length of the first lens element is f1, and the focal length of the second lens element is f2, the following condition is satisfied: 0.80<|f/f1|+|f/f2|<3.80. Therefore, it is favorable for having sufficient refractive power of the object side of the optical imaging module so as to effectively control the field of view in a limited space. Preferably, the following condition is satisfied: 1.0<|f/f1|+|f/f2|<2.80.

When the focal length of the first lens element is f1 and a focal length of the fifth lens element is f5, the following condition is satisfied: 0.30<f1/f5<1.0. Therefore, it is favorable for balancing the negative refractive power arrangement between the lens elements of the object side and the image side so as to achieve a proper specification.

When an axial distance between the aperture stop and the image-side surface of the sixth lens element is SD, and an axial distance between the object-side surface of the first lens element and the image-side surface of the sixth lens element is TD, the following condition is satisfied: 0.50<SD/TD<0.80. Therefore, it is favorable for effectively balancing the field of view and the total track length by controlling the location of the aperture stop, and enhancing the compact size and practicality of the electronic device.

When a vertical distance between a critical point in an off-axial region on the image-side surface of the sixth lens element and the optical axis is Yc62, and the focal length of the optical imaging module is f, the following condition is satisfied: 0.50<Yc62/f<1.0. Therefore, it is favorable for controlling the incident angle of the off-axial light on the image sensor and correcting off-axial aberrations while maintaining the sufficient image height and imaging range.

When the distortion percentage on the maximum image height of the optical imaging module is DST1.0, the following condition is satisfied: |DST1.0|<30%. Therefore, it is favorable for avoiding serious distortion and vignetting effect in the off-axial regions of the image.

When the focal length of the first lens element is f1, and the focal length of the fourth lens element is f4, the following condition is satisfied: f4/f1<−0.20. Therefore, it is favorable for the pairing of the negative refractive power of the first lens element and the positive refractive power of the fourth lens element so as to enhance the image quality. Preferably, the following condition is satisfied: −2.50<f4/f1<−0.50.

When the axial distance between the first lens element and the second lens element is T12, the axial distance between the second lens element and the third lens element is T23, an axial distance between the third lens element and the fourth lens element is T34, an axial distance between the fourth lens element and the fifth lens element is T45, and the axial distance between the fifth lens element and the sixth lens element is T56, the following condition is satisfied: (T12+T56)/(T23+T34+T45)<3.0. Therefore, it is favorable for effectively balancing the spatial configuration of the optical imaging module to achieve a better space utilization.

When a maximum value among refractive indices of the first lens element, the second lens element, the third lens element, the fourth lens element, the fifth lens element and the sixth lens element is Nmax, the following condition is satisfied: 1.60<Nmax<1.72. Therefore, it is favorable for balancing the aberrations by having lens configuration with consideration as a whole optical imaging module and optimizing shape properties of the lens surfaces with a higher degree of freedom.

According to the optical imaging module of the present disclosure, the lens elements thereof can be made of plastic or glass materials. When the lens elements are made of plastic materials, the manufacturing cost can be effectively reduced. When the lens elements are made of glass materials, the arrangement of the refractive power of the optical imaging module may be more flexible to design. Furthermore, surfaces of each lens element can be arranged to be aspheric, since the aspheric surface of the lens element is easy to form a shape other than spherical surfaces so as to have more controllable variables for eliminating aberrations thereof, and to further decrease the required number of the lens elements. Therefore, the total track length of the optical imaging module can also be reduced.

According to the optical imaging module of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. According to the optical imaging module of the present disclosure, the refractive power or the focal length of a lens element being positive or negative may refer to the refractive power or the focal length in a paraxial region of the lens element.

According to the optical imaging module of the present disclosure, a critical point is a non-axial point of the lens surface where its tangent is perpendicular to the optical axis, wherein a convex critical point is a critical point located on a convex shape of the lens surface.

According to the optical imaging module of the present disclosure, the optical imaging module can include at least one stop, such as an aperture stop, a glare stop or a field stop. The glare stop or the field stop is for eliminating to the stray light and thereby improving the image resolution thereof.

According to the optical imaging module of the present disclosure, the image surface, depending on the corresponding image sensor, can be a planar surface or a curved surface with any curvature, particularly a curved surface being concave toward the object side.

According to the optical imaging module of the present disclosure, an aperture stop can be configured as a middle stop. A middle stop disposed between the first lens element and the image surface is favorable for enlarging the field of view of the optical imaging module and thereby provides a wider field of view for the same.

According to the optical imaging module of the present disclosure, the optical imaging module can be optionally applied to moving focus optical systems. Furthermore, the optical imaging module is featured with good correction ability and high image quality, and can be applied to 3D (three-dimensional) image capturing applications, in products such as digital cameras, mobile devices, digital tablets, smart TVs, network monitoring devices, motion sensing input devices, driving recorders, rear view camera systems, extreme sports cameras, industrial robots, wearable devices and other electronic imaging products.

According to the present disclosure, an image capturing apparatus is further provided. The image capturing apparatus includes the aforementioned optical imaging module according to the present disclosure, a driving unit and an image sensor. The driving unit is for driving the optical imaging module. The image sensor is disposed on the image surface of the optical imaging module. Therefore, it is favorable for simultaneously satisfying the requirements of the large field of view, the compact size and the superior image quality. Preferably, the image capturing apparatus can further include a barrel member, a holder member or a combination thereof.

According to the image capturing apparatus of the present disclosure, the driving unit can be for capturing clear images under various object distances. The driving unit may include an auto focus (AF) element to achieve a better imaging position, wherein a driving mechanism thereof may be implemented by a voice coil motor (VCM), a microelectro-mechanical system (MEMS), a shape memory alloy and the like. The driving unit may also adjust the displacements of the optical imaging module along various axial directions to compensate for the image blur resulted from the shaking while photographing according to the methods such as optical image stabilization (OIS), electric image stabilization (EIS) and so on.

According to the image capturing apparatus of the present disclosure, the image capturing apparatus can further include a light blocking element to act as a stop, such as an aperture stop, a glare stop, a flare stop and so on, wherein the light blocking element may be featured with fixed luminous flux or adjustable luminous flux. In case the light blocking element acts as the glare stop or the flare stop, a light blocking range of the light blocking element is not substantially greater than 30% of a light non-blocking range thereof preferably. Furthermore, the word "substantially" indicates a range covering ±10% expansion of a given value in the present disclosure.

When the light blocking element is featured with fixed luminous flux, the light blocking element may be made of a composite material. Preferably, a thickness parallel to the optical axis of the light blocking element is not greater than 0.04 mm. More preferably, the thickness parallel to the optical axis of the light blocking element may be substantially 0.018 mm, 0.023 mm and so on. When the light blocking element is featured with adjustable luminous flux, the luminous flux may be adjusted according to changes of a mechanical mean or liquid crystal. Furthermore, the light blocking element featured with adjustable luminous flux may be disposed on an object side of the image capturing apparatus or between the first lens element and the image sensor.

According to the image capturing apparatus of the present disclosure, each of the lens elements includes a portion inside an effective radius (i.e. a portion passed by the effective light) and a portion outside the effective radius. The portion outside the effective radius may include a connecting structure for alignment with another adjacent lens element. In addition, the portion outside the effective radius may be processed by a treatment, such as sandblasting, laser processing, electrical discharge, coating, or a surface microstructure design for reducing the stray light and further avoiding unwanted artifacts in the image.

According to the image capturing apparatus of the present disclosure, the lens elements may be non-circular, such as rectangular, chamfered rectangular, irregular shapes and so on. It is advantageous in reducing the volume of the image capturing apparatus, thereby reducing the thickness of the electronic device, increasing the image height for enhancing the receiving range of the light, as well as improving the image brightness and image quality.

According to the present disclosure, an electronic device is provided, wherein the electronic device includes the aforementioned image capturing apparatus and an imaging lens apparatus, and a maximum field of view of the imaging lens apparatus is smaller than the maximum field of view of the optical imaging module of the image capturing apparatus. Therefore, the electronic device equipped with a dual-lens apparatus (one lens indicates the image capturing apparatus, the other lens indicates the imaging lens apparatus, and a total of two lenses) is favorable for satisfying the need for compact size while enhancing the image quality. Preferably, the electronic device can further include but not limited to a control unit, a display, a storage unit, a random access memory unit (RAM) or a combination thereof.

According to the electronic device of the present disclosure, the optical imaging module or the image capturing apparatus can be applied together with one, two or more imaging lens apparatuses, wherein the field of view of at least one imaging lens apparatus may be different from the field of view of the optical imaging module of the image capturing apparatus. The image capturing apparatus and the imaging lens apparatus may be applied together with an image signal processor (ISP) to enhance a depth of field effect, and achieve the functionalities of telephoto and macro photography. Furthermore, the functions of optical zoom and digital zoom may be integrated thereof to change the magnification to achieve the zoom effect, wherein the magnification of the electronic device may be 2 to 20 times. The arrangement between the optical imaging module of the image capturing apparatus and the imaging lens apparatus of the electronic device of the present disclosure may be listed below but not limited:

(a) The electronic device includes the optical imaging module of the present disclosure and one imaging lens apparatus, wherein a field of view of the imaging lens apparatus is substantially 70 degrees to 90 degrees, and the optical axis of the optical imaging module and an optical axis of the imaging lens apparatus are substantially parallel to each other.

(b) The electronic device includes the optical imaging module of the present disclosure and one imaging lens apparatus, wherein a field of view of the imaging lens apparatus is substantially 40 degrees to 60 degrees, and the optical axis of the optical imaging module and an optical axis of the imaging lens apparatus are substantially parallel to each other.

(c) The electronic device includes the optical imaging module of the present disclosure and one imaging lens apparatus, wherein a field of view of the imaging lens apparatus is substantially 20 degrees to 50 degrees. The optical axis of the optical imaging module and an optical axis of the imaging lens apparatus are substantially perpendicular to each other, wherein the imaging lens apparatus may include one or two reflective elements, and the reflective element may be a prism, a mirror or the like.

(d) The electronic device includes the optical imaging module of the present disclosure and two imaging lens apparatuses, wherein fields of view of the two imaging lens apparatuses are substantially 70 degrees to 90 degrees, and 20 degrees to 50 degrees respectively. The optical axis of the optical imaging module and an optical axis of at least one of the imaging lens apparatuses are substantially perpendicular to each other. At least one of the imaging lens apparatuses may include at least one reflective element, wherein the reflective element may be a prism, a mirror or the like.

According to the electronic device of the present disclosure, the electronic device may include multiple lens apparatuses (one of those is the image capturing apparatus of the present disclosure). The lens apparatus with a field of view of substantially 70 degrees to 90 degrees may be configured with an image sensor of 12M (Mega Pixels), 13M, 16M, 20M or 24M preferably. The lens apparatus with a field of view of substantially 20 degrees to 50 degrees, or 110 degrees to 200 degrees may be configured with an image sensor of VGA, 1M, 5M, 8M, 12M or 13M preferably. The optical imaging module of the image capturing apparatus of the present disclosure may be configured with an image sensor of 5M, 8M or 12M preferably. Furthermore, a microlens array may be disposed on an object side of the image sensor to detect the intensity, color and direction of the light, so as to focus after images being captured to achieve the effect of the light field camera.

According to the electronic device of the present disclosure, the electronic device may include multiple lens apparatuses (one of those is the image capturing apparatus of the present disclosure). The lens apparatus with a field of view of substantially 70 degrees to 90 degrees may have an Fno value of 1.20 to 2.0 preferably. The lens apparatus with a field of view of substantially 20 degrees to 50 degrees, or 110 degrees to 200 degrees may have an Fno value of 1.60 to 2.60 preferably.

According to the electronic device of the present disclosure, the electronic device may have functions of image processing and communication, and may include the image capturing apparatus, the imaging lens apparatus, a touch screen, an iris identification module, a fingerprint identification module, a sensing element, a flash module, an infrared focusing module, a laser focusing module, an image signal processor and so on.

According to the electronic device of the present disclosure, a protection housing on the object side of each of the lens apparatuses (one of those is the image capturing apparatus of the present disclosure) may be provided. The protection housing may be planar or non-planar. The protection housing may be disposed on a housing of the electronic device, and may be located on the same side or on a different side with the screen of the electronic device.

According to the above description of the present disclosure, the following 1st-22th specific embodiments are provided for further explanation.

1st Embodiment

Figure 2:
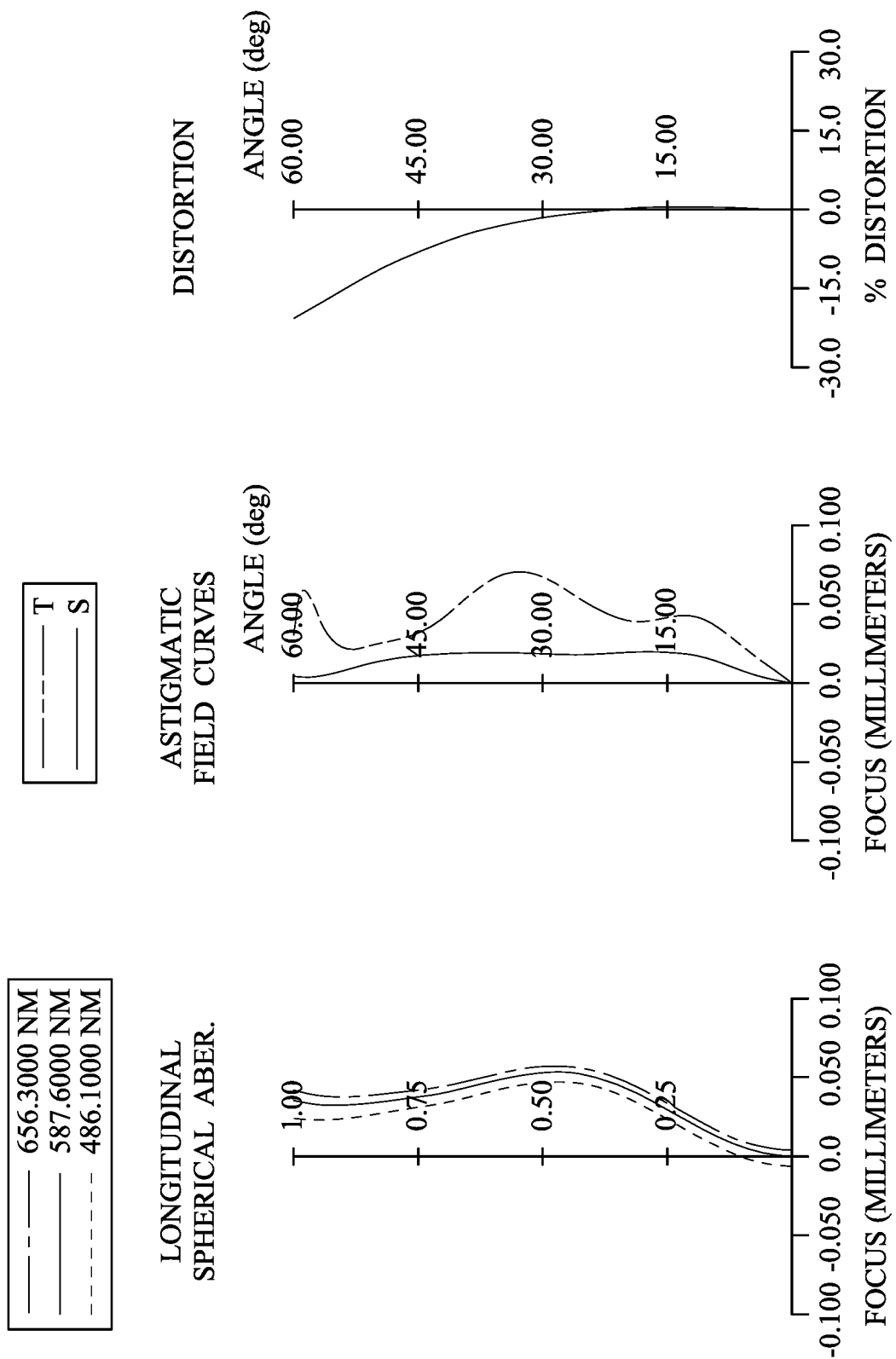
FIG. 2 shows spherical aberration curves, astigmatic field curves and a distortion curve of the image capturing apparatus according to the 1st embodiment.

FIG. 1 is a schematic view of an image capturing apparatus according to the 1st embodiment of the present disclosure. FIG. 2 shows, in order from left to right, spherical aberration curves, astigmatic field curves and a distortion curve of the image capturing apparatus according to the 1st embodiment. In FIG. 1, the image capturing apparatus includes the optical imaging module (its reference numeral is omitted), a driving unit (not shown herein) and an image sensor 190, wherein the driving unit is for driving the optical imaging module. The optical imaging module includes, in order from an object side to an image side, a first lens element 110, a second lens element 120, an aperture stop 100, a third lens element 130, a fourth lens element 140, a fifth lens element 150, a sixth lens element 160, an IR-cut filter 170 and an image surface 180. The image sensor 190 is disposed on the image surface 180 of the optical imaging module. The optical imaging module includes six lens elements (110, 120, 130, 140, 150 and 160) without additional one or more lens elements inserted between the first lens element 110 and the sixth lens element 160.

The first lens element 110 with negative refractive power has an object-side surface 111 being concave and an image-side surface 112 being concave. The first lens element 110 is made of a plastic material, and has the object-side surface 111 and the image-side surface 112 being both aspheric.

The second lens element 120 with positive refractive power has an object-side surface 121 being convex and an image-side surface 122 being concave. The second lens element 120 is made of a plastic material, and has the object-side surface 121 and the image-side surface 122 being both aspheric.

The third lens element 130 with positive refractive power has an object-side surface 131 being convex and an image-side surface 132 being convex. The third lens element 130 is made of a plastic material, and has the object-side surface 131 and the image-side surface 132 being both aspheric.

The fourth lens element 140 with positive refractive power has an object-side surface 141 being convex and an image-side surface 142 being convex. The fourth lens element 140 is made of a plastic material, and has the object-side surface 141 and the image-side surface 142 being both aspheric.

The fifth lens element 150 with negative refractive power has an object-side surface 151 being concave and an image-side surface 152 being convex. The fifth lens element 150 is made of a plastic material, and has the object-side surface 151 and the image-side surface 152 being both aspheric. The sixth lens element 160 with negative refractive power has an object-side surface 161 being convex and an image-side surface 162 being concave. The sixth lens element 160 is made of a plastic material, and has the object-side surface 161 and the image-side surface 162 being both aspheric.

The IR-cut filter 170 is made of a glass material and located between the sixth lens element 160 and the image surface 180, and will not affect the focal length of the optical imaging module.

The equation of the aspheric surface profiles of the aforementioned lens elements of the 1st embodiment is expressed as follows:

$$X(Y) = (Y^2/R)/(1 + sqrt(1 - (1+k)\times(Y/R)^2)) + \sum_i (Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical imaging module according to the 1st embodiment, when a focal length of the optical imaging module is f, an f-number of the optical imaging module is Fno, and half of a maximum field of view of the optical imaging module is HFOV, these parameters have the following values: f=1.61 mm; Fno=2.39; and HFOV=60.0 degrees.

In the optical imaging module according to the 1st embodiment, when a maximum value among refractive indices of the first lens element 110, the second lens element 120, the third lens element 130, the fourth lens element 140, the fifth lens element 150 and the sixth lens element 160 is Nmax, the following condition is satisfied: Nmax=1.660.

In the optical imaging module according to the 1st embodiment, when an Abbe number of the fifth lens element 150 is V5, and an Abbe number of the sixth lens element 160 is V6, the following condition is satisfied: V5/V6=0.36.

In the optical imaging module according to the 1st embodiment, when an axial distance between the first lens element 110 and the second lens element 120 is T12, and an axial distance between the second lens element 120 and the third lens element 130 is T23, the following condition is satisfied: T12/T23=1.04.

In the optical imaging module according to the 1st embodiment, when the axial distance between the second lens element 120 and the third lens element 130 is T23, and an axial distance between the fifth lens element 150 and the sixth lens element 160 is T56, the following condition is satisfied: T56/T23=0.58.

In the optical imaging module according to the 1st embodiment, when the axial distance between the fifth lens element 150 and the sixth lens element 160 is T56, and a central thickness of the sixth lens element 160 is CT6, the following condition is satisfied: T56/CT6=0.24.

In the optical imaging module according to the 1st embodiment, when the focal length of the optical imaging module is f, and the central thickness of the sixth lens element 160 is CT6, the following condition is satisfied: f/CT6=2.84.

In the optical imaging module according to the 1st embodiment, when a central thickness of the first lens element 110 is CT1, and the central thickness of the sixth lens element 160 is CT6, the following condition is satisfied: CT1/CT6=0.45.

In the optical imaging module according to the 1st embodiment, when the axial distance between the first lens element 110 and the second lens element 120 is T12, the axial distance between the second lens element 120 and the third lens element 130 is T23, an axial distance between the third lens element 130 and the fourth lens element 140 is T34, an axial distance between the fourth lens element 140 and the fifth lens element 150 is T45, and the axial distance between the fifth lens element 150 and the sixth lens element 160 is T56, the following condition is satisfied: (T12−T56)/(T23+T34+T45)=0.72.

In the optical imaging module according to the 1st embodiment, when a curvature radius of the object-side surface 131 of the third lens element 130 is R5, and a curvature radius of the image-side surface 132 of the third lens element 130 is R6, the following condition is satisfied: (R5+R6)/(R5−R6)=0.72.

In the optical imaging module according to the 1st embodiment, when a curvature radius of the object-side surface 161 of the sixth lens element 160 is R11, a curvature radius of the image-side surface 162 of the sixth lens element 160 is R12, and the central thickness of the sixth lens element 160 is CT6, the following condition is satisfied: (|R11|+|R12|)/CT6=4.74.

In the optical imaging module according to the 1st embodiment, when the focal length of the optical imaging module is f, a focal length of the first lens element 110 is f1, a focal length of the second lens element 120 is f2, a focal length of the third lens element 130 is f3, a focal length of the fourth lens element 140 is f4, and a focal length of the fifth lens element 150 is f5, the following conditions are satisfied: |f1/f2|=0.53; |f/f1|+|f/f2|=1.51; (f/f3)−(f/f4)=−0.10; f1/f5=0.59; and f4/f1=−1.02.

Figure 25:
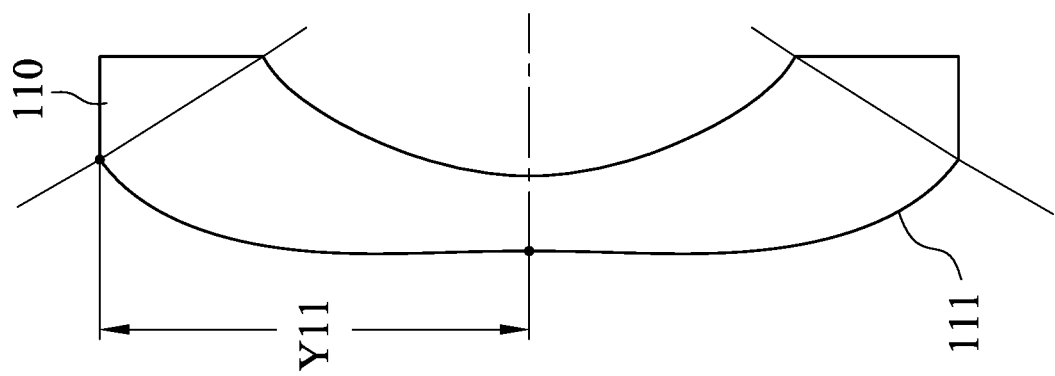
FIG. 25 shows a schematic view of the parameter Y11 of the optical imaging module of the image capturing apparatus according to FIG. 1.
Figure 26:
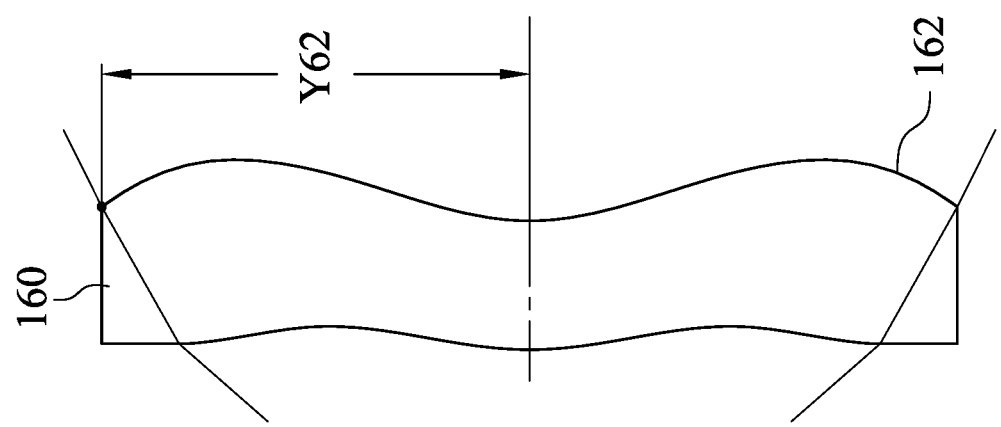
FIG. 26 shows a schematic view of the parameter Y62 of the optical imaging module of the image capturing apparatus according to FIG. 1.

FIG. 25 shows a schematic view of the parameter Y11 of the optical imaging module of the image capturing apparatus according to FIG. 1, and FIG. 26 shows a schematic view of the parameter Y62 of the optical imaging module of the image capturing apparatus according to FIG. 1. In FIG. 25 and FIG. 26, when a maximum effective radius of the object-side surface 111 of the first lens element 110 is Y11, and a maximum effective radius of the image-side surface 162 of the sixth lens element 160 is Y62, the following condition is satisfied: Y11/Y62=0.77.

Figure 27:
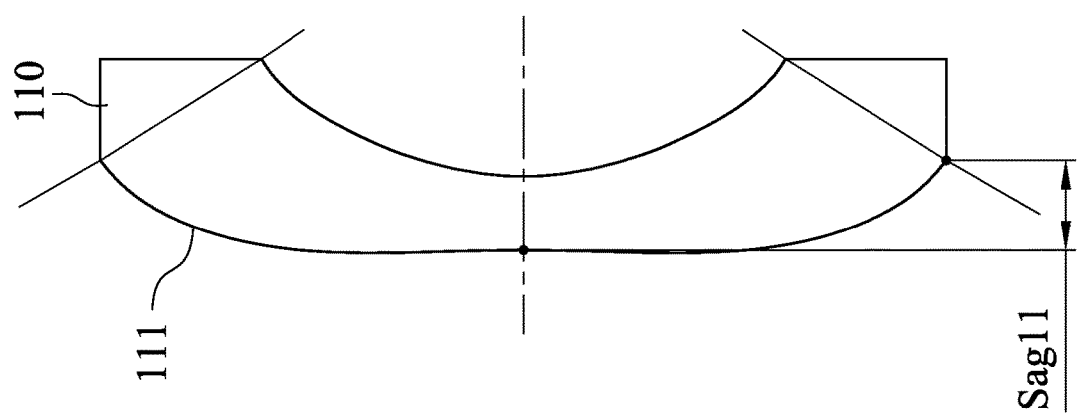
FIG. 27 shows a schematic view of the parameter Sag11 of the optical imaging module of the image capturing apparatus according to FIG. 1.
Figure 28:
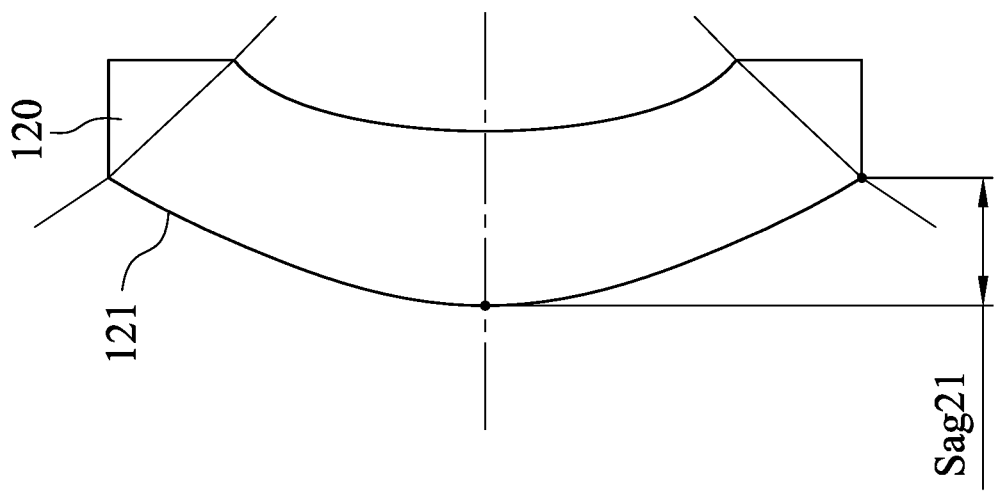
FIG. 28 shows a schematic view of the parameter Sag21 of the optical imaging module of the image capturing apparatus according to FIG. 1.

FIG. 27 shows a schematic view of the parameter Sag11 of the optical imaging module of the image capturing apparatus according to FIG. 1, and FIG. 28 shows a schematic view of the parameter Sag21 of the optical imaging module of the image capturing apparatus according to FIG. 1. In FIG. 27 and FIG. 28, when a displacement in parallel with the optical axis from an axial vertex on the object-side surface 111 of the first lens element 110 to a maximum effective radius position on the object-side surface 111 of the first lens element 110 is Sag11, and a displacement in parallel with the optical axis from an axial vertex on the object-side surface 121 of the second lens element 120 to a maximum effective radius position on the object-side surface 121 of the second lens element 120 is Sag21, the following condition is satisfied: |Sag11/Sag21|=1.21.

In the optical imaging module according to the 1st embodiment, when an axial distance between the object-side surface 111 of the first lens element 110 and the image surface 180 is TL, and the focal length of the optical imaging module is f, the following condition is satisfied: TL/f=2.75.

In the optical imaging module according to the 1st embodiment, when the half of the maximum field of view of the optical imaging module is HFOV, the following condition is satisfied: tan(HFOV)=1.73.

In the optical imaging module according to the 1st embodiment, when an axial distance between the aperture stop 100 and the image-side surface 162 of the sixth lens element 160 is SD, and an axial distance between the object-side surface 111 of the first lens element 110 and the image-side surface 162 of the sixth lens element 160 is TD, the following condition is satisfied: SD/TD=0.69.

In the optical imaging module according to the 1st embodiment, when the axial distance between the object-side surface 111 of the first lens element 110 and the image surface 180 is TL, and a maximum image height of the optical imaging module is ImgH, the following condition is satisfied: TL/ImgH=1.98.

In the optical imaging module according to the 1st embodiment, when a distortion percentage on the maximum image height of the optical imaging module is DST1.0, and the maximum field of view of the optical imaging module is FOV, the following conditions are satisfied: |DST1.0|=20.55%; and |DST1.0/FOV|=0.17 (%/degrees).

Figure 29:
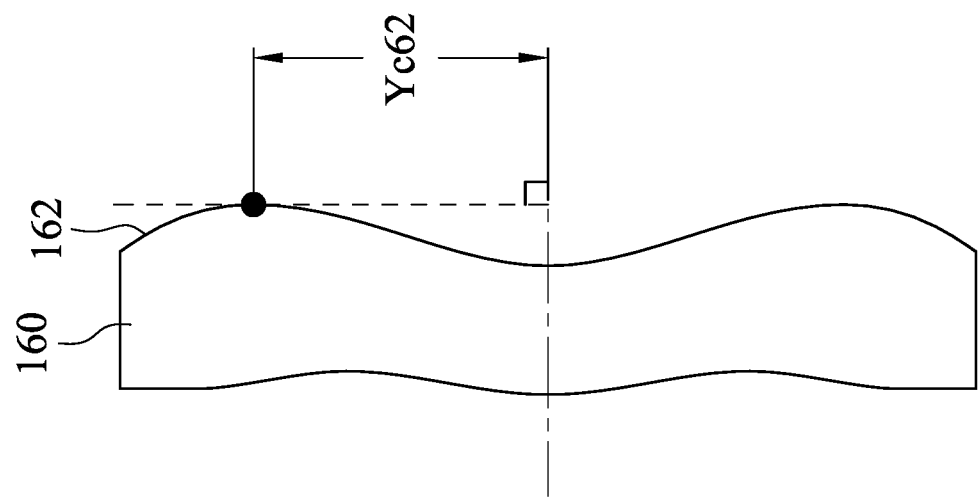
FIG. 29 shows a schematic view of the parameter Yc62 of the optical imaging module of the image capturing apparatus according to FIG. 1.

FIG. 29 shows a schematic view of the parameter Yc62 of the optical imaging module of the image capturing apparatus according to FIG. 1. In FIG. 29, a vertical distance between a critical point in an off-axial region on the image-side surface 162 of the sixth lens element 160 and the optical axis is Yc62, and the focal length of the optical imaging module is f, the following condition is satisfied: Yc62/f=0.80.

The detailed optical data of the 1st embodiment are shown in TABLE 1 and the aspheric surface data are shown in TABLE 2 below.

TABLE 1

1st Embodiment
f = 1.61 mm, Fno = 2.39, HFOV = 60.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | −6.441 | ASP | 0.254 | Plastic | 1.545 | 56.1 | −1.64 |
| 2 |  | 1.052 | ASP | 0.247 |  |  |  |  |
| 3 | Lens 2 | 0.854 | ASP | 0.349 | Plastic | 1.545 | 56.1 | 3.07 |
| 4 |  | 1.493 | ASP | 0.229 |  |  |  |  |
| 5 | Ape. Stop | Plano |  | 0.008 |  |  |  |  |
| 6 | Lens 3 | 7.178 | ASP | 0.484 | Plastic | 1.545 | 56.1 | 1.86 |
| 7 |  | −1.152 | ASP | 0.185 |  |  |  |  |
| 8 | Lens 4 | 8.712 | ASP | 0.690 | Plastic | 1.545 | 56.1 | 1.66 |
| 9 |  | −0.984 | ASP | 0.115 |  |  |  |  |
| 10 | Lens 5 | −0.478 | ASP | 0.270 | Plastic | 1.660 | 20.4 | −2.80 |
| 11 |  | −0.789 | ASP | 0.137 |  |  |  |  |
| 12 | Lens 6 | 1.556 | ASP | 0.567 | Plastic | 1.544 | 56.0 | −14.38 |
| 13 |  | 1.131 | ASP | 0.400 |  |  |  |  |
| 14 | IR-cut filter | Plano |  | 0.210 | Glass | 1.517 | 64.2 | — |
| 15 |  | Plano |  | 0.287 |  |  |  |  |
| 16 | Image | Plano |  | — |  |  |  |  |

Reference wavelength is 587.6 nm (d-line).

TABLE 2

Aspheric Coefficients

| Surface # | 1 | 2 | 3 | 4 | 6 | 7 |
|---|---|---|---|---|---|---|
| k= | −7.2762E+01 | −5.6621E−01 | −2.5917E+00 | −2.7941E+00 | −9.0000E+01 | −4.4951E−01 |
| A4= | 1.5042E−01 | −2.8286E−01 | 8.9951E−03 | 6.8404E−01 | −1.4519E−01 | −2.9950E−01 |
| A6= | −9.5882E−02 | 6.4607E−01 | −5.7625E−01 | −4.7337E+00 | 2.2194E+00 | −1.1504E+00 |
| A8= | 6.4636E−02 | −1.6175E+00 | 2.1089E+00 | 5.1400E+01 | −2.1146E+01 | 5.8215E+00 |
| A10= | −2.6770E−02 | 3.5260E+00 | −6.6160E+00 | −2.3150E+02 | 9.2850E+01 | −1.9101E+01 |
| A12= | 5.4752E−03 | −4.5091E+00 | 1.3736E+01 | 4.7710E+02 | −1.4624E+02 | 2.2004E+01 |
| A14= | | 2.4679E+00 | −1.0330E+01 | | | |

| Surface # | 8 | 9 | 10 | 11 | 12 | 13 |
|---|---|---|---|---|---|---|
| k= | 3.0000E+00 | −3.6194E−01 | −1.1150E+00 | −5.5943E+00 | −5.5582E+00 | −9.1742E−01 |
| A4= | −1.9155E−01 | 3.4130E−01 | 1.6283E+00 | −1.6164E−01 | −2.1533E−01 | −3.4056E−01 |
| A6= | 6.2920E−02 | −2.7653E+00 | −5.7375E+00 | 1.6865E+00 | 1.2706E+00 | 2.0961E−01 |
| A8= | −1.1861E+00 | 1.0527E+01 | 1.7552E+01 | −3.5995E+00 | −9.8292E−02 | −1.2095E−01 |
| A10= | 5.6874E+00 | −2.0496E+01 | −3.4943E+01 | 3.8842E+00 | 6.3963E−02 | 5.0206E−02 |
| A12= | −1.4291E+01 | 1.8455E+01 | 3.5541E+01 | −2.2813E+00 | −2.2033E−02 | −1.3626E−02 |
| A14= | 1.1630E+01 | −5.9493E+00 | −1.3895E+01 | 6.9057E−01 | 3.7004E−03 | 2.0945E−03 |
| A16= | | | | −8.4397E−02 | −2.4478E−04 | −1.3495E−04 |

In TABLE 1, the curvature radius, the thickness and the focal length are shown in millimeters (mm). Surface numbers 0-16 represent the surfaces sequentially arranged from the object-side to the image-side along the optical axis. In TABLE 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

In addition, numbers of inflection points of the object-side surfaces and the image-side surfaces of the first lens element 110 (Lens 1), the fourth lens element 140 (Lens 4), the fifth lens element 150 (Lens 5), and the image-side surface 162 of the sixth lens element 160 (Lens 6) in the 1st embodiment are listed below, wherein each the number is calculated for the inflection points from an axial vertex to a maximum effective radius position on the corresponding surface.

| 1st Embodiment-Number of Inflection Points | | | | |
|---|---|---|---|---|
| | Lens 1 | Lens 4 | Lens 5 | Lens 6 |
| Object-side surface | 1 | 1 | 2 | |
| Image-side surface | 0 | 1 | 2 | 1 |

2nd Embodiment

Figure 3:
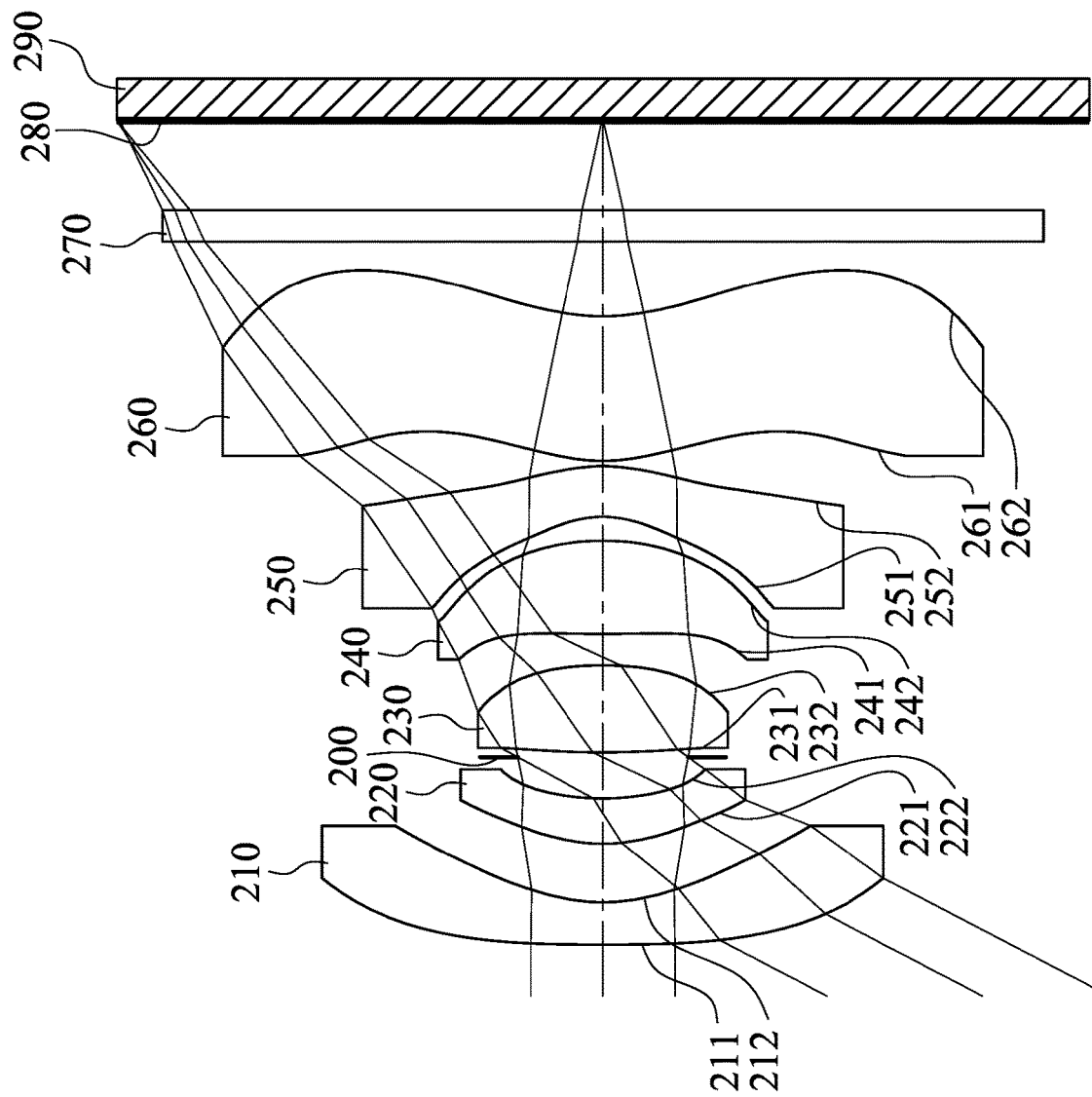
FIG. 3 is a schematic view of an image capturing apparatus according to the 2nd embodiment of the present disclosure.
Figure 4:
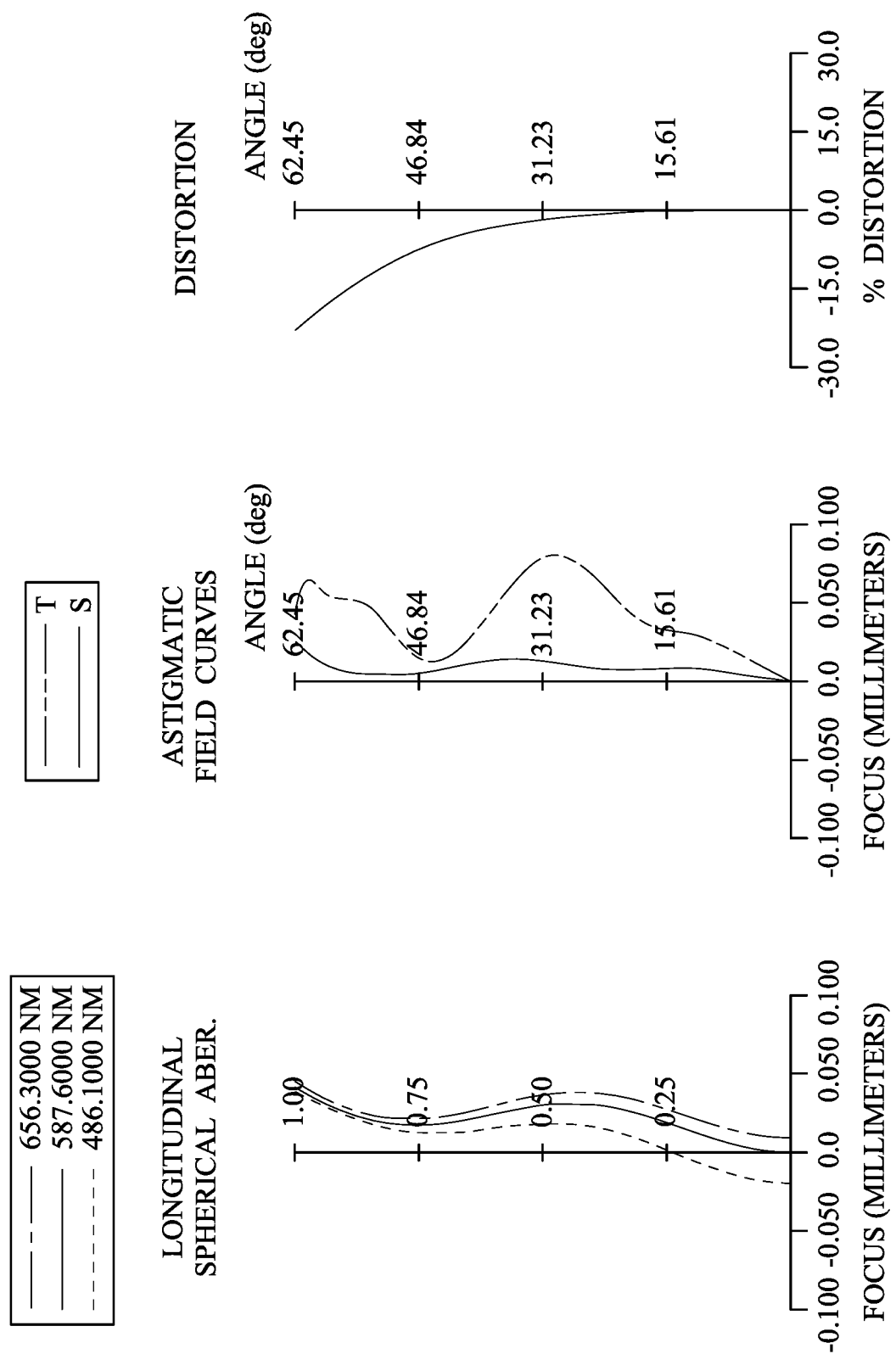
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows, in order from left to right, spherical aberration curves, astigmatic field curves and a distortion curve of the image capturing apparatus according to the 2nd embodiment. In FIG. 3, the image capturing apparatus includes the optical imaging module (its reference numeral is omitted), a driving unit (not shown herein) and an image sensor 290, wherein the driving unit is for driving the optical imaging module. The optical imaging module includes, in order from an object side to an image side, a first lens element 210, a second lens element 220, an aperture stop 200, a third lens element 230, a fourth lens element 240, a fifth lens element 250, a sixth lens element 260, an IR-cut filter 270 and an image surface 280. The image sensor 290 is disposed on the image surface 280 of the optical imaging module. The optical imaging module includes six lens elements (210, 220, 230, 240, 250 and 260) without additional one or more lens elements inserted between the first lens element 210 and the sixth lens element 260.

The first lens element 210 with negative refractive power has an object-side surface 211 being convex and an image-side surface 212 being concave. The first lens element 210 is made of a plastic material, and has the object-side surface 211 and the image-side surface 212 being both aspheric.

The second lens element 220 with positive refractive power has an object-side surface 221 being convex and an image-side surface 222 being concave. The second lens element 220 is made of a plastic material, and has the object-side surface 221 and the image-side surface 222 being both aspheric.

The third lens element 230 with positive refractive power has an object-side surface 231 being convex and an image-side surface 232 being to convex. The third lens element 230 is made of a plastic material, and has the object-side surface 231 and the image-side surface 232 being both aspheric.

The fourth lens element 240 with positive refractive power has an object-side surface 241 being convex and an image-side surface 242 being convex. The fourth lens element 240 is made of a plastic material, and has the object-side surface 241 and the image-side surface 242 being both aspheric.

The fifth lens element 250 with negative refractive power has an object-side surface 251 being concave and an image-side surface 252 being convex. The fifth lens element 250 is made of a plastic material, and has the object-side surface 251 and the image-side surface 252 being both aspheric.

The sixth lens element 260 with positive refractive power has an object-side surface 261 being convex and an image-side surface 262 being concave. The sixth lens element 260 is made of a plastic material, and has the object-side surface 261 and the image-side surface 262 being both aspheric.

The IR-cut filter 270 is made of a glass material and located between the sixth lens element 260 and the image surface 280, and will not affect the focal length of the optical imaging module.

The detailed optical data of the 2nd embodiment are shown in TABLE 3 and the aspheric surface data are shown in TABLE 4 below.

TABLE 3

2nd Embodiment
f = 2.18 mm, Fno = 2.27, HFOV = 62.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 19.740 | ASP | 0.283 | Plastic | 1.545 | 56.0 | −2.70 |
| 2 | | 1.361 | ASP | 0.390 | | | | |
| 3 | Lens 2 | 1.178 | ASP | 0.302 | Plastic | 1.584 | 28.2 | 4.99 |
| 4 | | 1.791 | ASP | 0.275 | | | | |
| 5 | Ape. Stop | Plano | | 0.031 | | | | |
| 6 | Lens 3 | 5.990 | ASP | 0.580 | Plastic | 1.544 | 55.9 | 3.17 |
| 7 | | −2.341 | ASP | 0.207 | | | | |
| 8 | Lens 4 | 7.530 | ASP | 0.624 | Plastic | 1.544 | 55.9 | 2.85 |
| 9 | | −1.896 | ASP | 0.160 | | | | |
| 10 | Lens 5 | −0.701 | ASP | 0.337 | Plastic | 1.660 | 20.4 | −3.43 |
| 11 | | −1.211 | ASP | 0.035 | | | | |
| 12 | Lens 6 | 1.285 | ASP | 0.960 | Plastic | 1.544 | 55.9 | 6.47 |
| 13 | | 1.491 | ASP | 0.500 | | | | |
| 14 | IR-cut filter | Plano | | 0.210 | Glass | 1.517 | 64.2 | — |
| 15 | | Plano | | 0.596 | | | | |
| 16 | Image | Plano | | — | | | | |

Reference wavelength is 587.6 nm (d-line).

TABLE 4

Aspheric Coefficients

| Surface # | 1 | 2 | 3 | 4 | 6 | 7 |
|---|---|---|---|---|---|---|
| k= | 5.6277E+01 | −1.1840E+00 | −1.4116E−02 | −8.3110E−01 | −2.4188E+01 | |
| A4= | 4.6616E−02 | −5.4686E−02 | −1.9414E−01 | 1.7454E−01 | −3.5833E−03 | −2.5539E−01 |
| A6= | −1.4478E−02 | 3.2743E−02 | 1.2527E−01 | −4.7424E−01 | −5.2504E−02 | −8.8931E−02 |
| A8= | 3.8977E−03 | −1.1677E−01 | −1.4764E+00 | 2.2029E+00 | −3.1565E−02 | 1.5519E−01 |
| A10= | −3.6892E−04 | 1.3513E−01 | 3.5484E+00 | −3.8268E+00 | 1.1014E−01 | −3.9636E−01 |
| A12= | | −6.2109E−02 | −3.3429E+00 | 5.6175E+00 | | 4.6743E−02 |
| A14= | | 1.0200E−02 | 1.1122E+00 | | | 1.7192E−01 |

| Surface # | 8 | 9 | 10 | 11 | 12 | 13 |
|---|---|---|---|---|---|---|
| k= | | 1.5482E−01 | −9.9492E−01 | −8.1927E−01 | −1.0684E+00 | −8.2017E−01 |
| A4= | −2.8539E−01 | −4.8074E−01 | 5.8116E−01 | 4.2245E−01 | −3.1879E−01 | −1.6686E−01 |
| A6= | 4.0793E−01 | 1.7094E+00 | 4.3180E−01 | −1.5610E−01 | 1.7605E−01 | 5.4896E−02 |
| A8= | −1.3645E+00 | −3.7200E+00 | −2.8489E+00 | −7.1777E−02 | −7.5444E−02 | −1.5006E−02 |
| A10= | 2.3389E+00 | 4.2732E+00 | 4.5782E+00 | 8.2503E−02 | 2.0110E−02 | 2.5508E−03 |
| A12= | −2.1252E+00 | −2.6115E+00 | −4.0004E+00 | −2.5402E−02 | −2.7859E−03 | −2.4824E−04 |
| A14= | 6.8493E−01 | 6.7817E−01 | 1.8703E+00 | 2.6396E−03 | 1.5282E−04 | 1.0342E−05 |
| A16= | 7.0363E−02 | | −3.5607E−01 | | | |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f (mm) | 2.18 | $|f/f1| + |f/f2|$ | 1.25 |
| Fno | 2.27 | (f/f3) − (f/f4) | −0.08 |
| HFOV (deg.) | 62.5 | f1/f5 | 0.79 |
| Nmax | 1.660 | f4/f1 | −1.06 |
| V5/V6 | 0.36 | Y11/Y62 | 0.74 |
| T12/T23 | 1.27 | |Sag11/Sag21| | 1.51 |
| T56/T23 | 0.11 | TL/f | 2.52 |

-continued

| 2nd Embodiment | | | |
|---|---|---|---|
| T56/CT6 | 0.04 | tan(HFOV) | 1.92 |
| f/CT6 | 2.27 | SD/TD | 0.70 |
| CT1/CT6 | 0.29 | TL/ImgH | 1.70 |
| (T12 + T56)/(T23 + T34 + T45) | 0.63 | |DST1.0| (%) | 22.95 |
| (R5 + R6)/(R5 − R6) | 0.44 | |DST1.0/FOV| (%/deg.) | 0.18 |
| (|R11| + |R12|)/CT6 | 2.89 | Yc62/f | 0.73 |
| |f1/f2| | 0.54 | | |

In addition, numbers of inflection points of the object-side surfaces and the image-side surfaces of the first lens element 210 (Lens 1), the fourth lens element 240 (Lens 4), the fifth lens element 250 (Lens 5), and the image-side surface 262 of the sixth lens element 260 (Lens 6) in the 2nd embodiment are listed below, wherein each the number is calculated for the inflection points from an axial vertex to a maximum effective radius position on the corresponding surface.

| 2nd Embodiment-Number of Inflection Points | | | | |
|---|---|---|---|---|
| | Lens 1 | Lens 4 | Lens 5 | Lens 6 |
| Object-side surface | 0 | 1 | 1 | |
| Image-side surface | 0 | 1 | 4 | 1 |

3rd Embodiment

Figure 5:
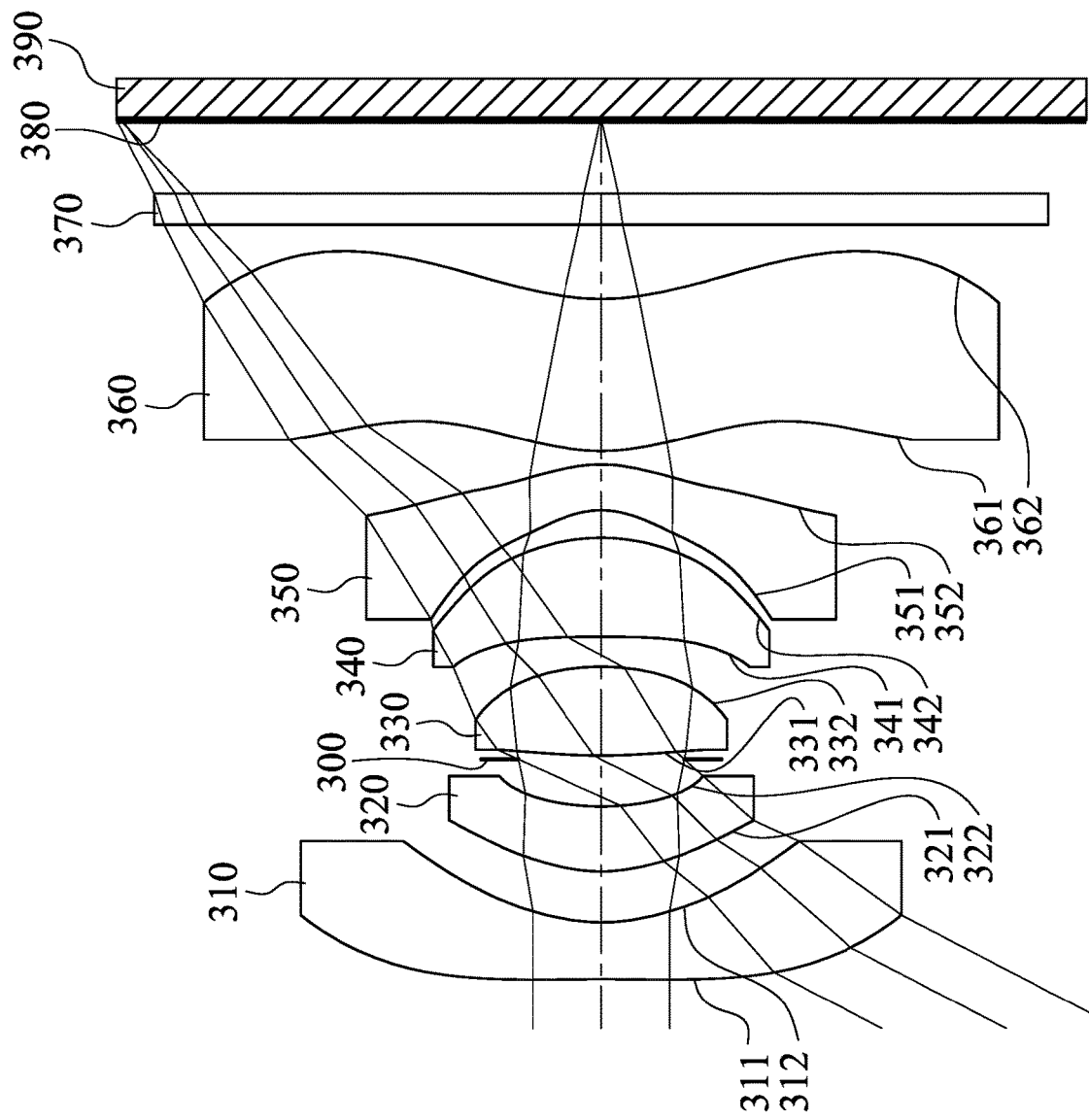
FIG. 5 is a schematic view of an image capturing apparatus according to the 3rd embodiment of the present disclosure.
Figure 6:
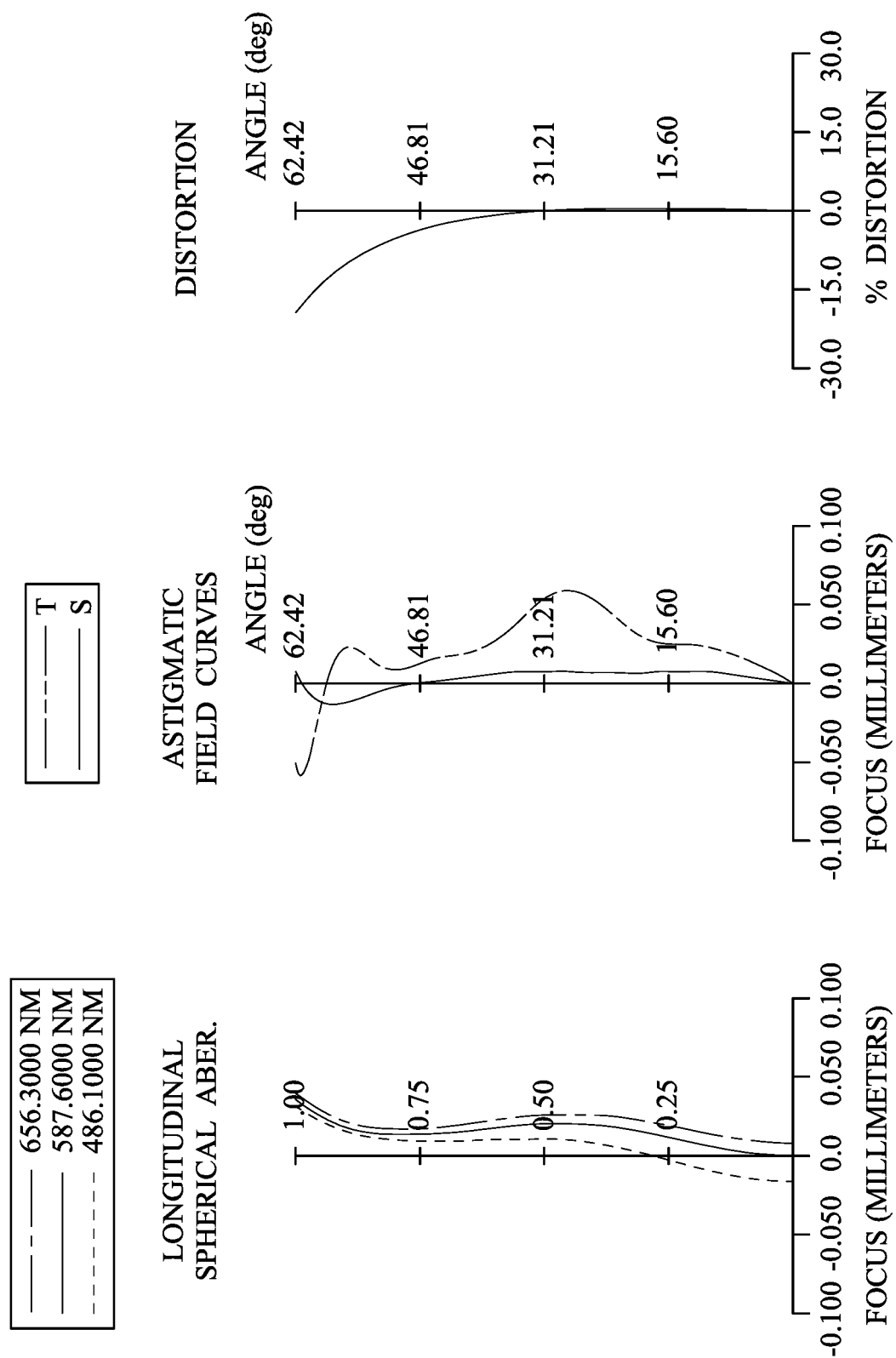
FIG. 6 shows spherical aberration curves, astigmatic field curves and a distortion curve of the image capturing apparatus according to the 3rd embodiment.

FIG. 5 is a schematic view of an image capturing apparatus according to the 3rd embodiment of the present disclosure. FIG. 6 shows, in order from left right, spherical aberration curves, astigmatic field curves and a distortion curve of the image capturing apparatus according to the 3rd embodiment. In FIG. 5, the image capturing apparatus includes the optical imaging module (its reference numeral is omitted), a driving unit (not shown herein) and an image sensor 390, wherein the driving unit is for driving the optical imaging module. The optical imaging module includes, in order from an object side to an image side, a first lens element 310, a second lens element 320, an aperture stop 300, a third lens element 330, a fourth lens element 340, a fifth lens element 350, a sixth lens element 360, an IR-cut filter 370 and an image surface 380. The image sensor 390 is disposed on the image surface 380 of the optical imaging module. The optical imaging module includes six lens elements (310, 320, 330, 340, 350 and 360) without additional one or more lens elements inserted between the first lens element 310 and the sixth lens element 360.

The first lens element 310 with negative refractive power has an object-side surface 311 being concave and an image-side surface 312 being concave. The first lens element 310 is made of a plastic material, and has the object-side surface 311 and the image-side surface 312 being both aspheric.

The second lens element 320 with positive refractive power has an object-side surface 321 being convex and an image-side surface 322 being concave. The second lens element 320 is made of a plastic material, and has the object-side surface 321 and the image-side surface 322 being both aspheric.

The third lens element 330 with positive refractive power has an object-side surface 331 being convex and an image-side surface 332 being convex. The third lens element 330 is made of a plastic material, and has the object-side surface 331 and the image-side surface 332 being both aspheric.

The fourth lens element 340 with positive refractive power has an object-side surface 341 being concave and an image-side surface 342 being convex. The fourth lens element 340 is made of a plastic material, and has the object-side surface 341 and the image-side surface 342 being both aspheric.

The fifth lens element 350 with negative refractive power has an object-side surface 351 being concave and an image-side surface 352 being convex. The fifth lens element 350 is made of a plastic material, and has the object-side surface 351 and the image-side surface 352 being both aspheric.

The sixth lens element 360 with positive refractive power has an object-side surface 361 being convex and an image-side surface 362 being concave. The sixth lens element 360 is made of a plastic material, and has the object-side surface 361 and the image-side surface 362 being both aspheric.

The IR-cut filter 370 is made of a glass material and located between the sixth lens element 360 and the image surface 380, and will not affect the focal length of the optical imaging module.

The detailed optical data of the 3rd embodiment are shown in TABLE 5 and the aspheric surface data are shown in TABLE 6 below.

TABLE 5

3rd Embodiment
f = 2.09 mm, Fno = 2.26, HFOV = 62.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −19.467 | ASP | 0.385 | Plastic | 1.545 | 56.1 | −2.37 |
| 2 | | 1.391 | ASP | 0.343 | | | | |
| 3 | Lens 2 | 1.201 | ASP | 0.439 | Plastic | 1.584 | 28.2 | 4.73 |
| 4 | | 1.838 | ASP | 0.317 | | | | |
| 5 | Ape. Stop | Plano | | 0.026 | | | | |
| 6 | Lens 3 | 4.875 | ASP | 0.603 | Plastic | 1.544 | 56.0 | 2.42 |
| 7 | | −1.728 | ASP | 0.201 | | | | |
| 8 | Lens 4 | −16.243 | ASP | 0.669 | Plastic | 1.544 | 56.0 | 2.68 |
| 9 | | −1.355 | ASP | 0.187 | | | | |
| 10 | Lens 5 | −0.564 | ASP | 0.308 | Plastic | 1.660 | 20.4 | −2.79 |
| 11 | | −0.989 | ASP | 0.090 | | | | |
| 12 | Lens 6 | 1.399 | ASP | 1.031 | Plastic | 1.544 | 56.0 | 6.27 |
| 13 | | 1.756 | ASP | 0.500 | | | | |
| 14 | IR-cut filter | Plano | | 0.210 | Glass | 1.517 | 64.2 | — |
| 15 | | Plano | | 0.500 | | | | |
| 16 | Image | Plano | | — | | | | |

Reference wavelength is 587.6 nm (d-line).

TABLE 6

Aspheric Coefficients

| Surface # | 1 | 2 | 3 | 4 | 6 | 7 |
|---|---|---|---|---|---|---|
| k= | 1.6644E+01 | −6.6937E−01 | −2.3818E+00 | −1.3393E+00 | −9.3319E+00 | −1.0738E+00 |
| A4= | 5.8538E−02 | −1.2557E−01 | −4.1228E−02 | 1.4691E−01 | −3.1486E−02 | −2.0160E−01 |
| A6= | −1.4722E−02 | 9.0619E−02 | −6.4563E−02 | −1.3857E−01 | 1.9287E−01 | −9.6846E−02 |
| A8= | 3.6619E−03 | −1.6047E−02 | 2.5945E−01 | 2.0076E+00 | −1.1346E+00 | 5.0528E−02 |
| A10= | −5.8089E−04 | −1.3425E−02 | −2.0742E−01 | −4.3882E+00 | 2.4830E+00 | 1.1139E−01 |
| A12= | 4.4394E−05 | 4.2669E−03 | 3.7289E−02 | 5.5418E+00 | −2.1585E+00 | −3.2041E−01 |

| Surface # | 8 | 9 | 10 | 11 | 12 | 13 |
|---|---|---|---|---|---|---|
| k= | −5.0231E+01 | −4.4605E−01 | −1.0181E+00 | −1.0582E+00 | −7.3258E−01 | −1.0051E+00 |
| A4= | −2.2278E−01 | −1.5696E−01 | 1.2336E+00 | 6.3310E−01 | −2.7993E−01 | −1.0580E−01 |
| A6= | 2.8997E−01 | 1.1343E+00 | −1.1820E+00 | −5.0727E−01 | 1.4646E−01 | 2.7574E−02 |
| A8= | −8.9989E−01 | −2.9626E+00 | −9.0750E−02 | 1.8318E−01 | −6.7544E−02 | −5.7768E−03 |
| A10= | 1.5697E+00 | 3.1994E+00 | 7.0970E−02 | −1.2987E−02 | 1.9228E−02 | 7.3155E−04 |
| A12= | −1.3123E+00 | −1.5506E+00 | −3.9390E−01 | −7.7105E−03 | −2.8303E−03 | −4.8484E−05 |
| A14= | 4.0299E−01 | 2.7818E−01 | 7.1517E−02 | 1.3749E−03 | 1.6408E−04 | 1.2445E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from TABLE 5 and TABLE 6 as the following values and satisfy the following conditions:

| 3rd Embodiment | | | |
|---|---|---|---|
| f (mm) | 2.09 | $|f/f1| + |f/f2|$ | 1.32 |
| Fno | 2.26 | (f/f3) − (f/f4) | 0.08 |
| HFOV (deg.) | 62.4 | f1/f5 | 0.85 |
| Nmax | 1.660 | f4/f1 | −1.13 |
| V5/V6 | 0.36 | Y11/Y62 | 0.76 |
| T12/T23 | 1.00 | $|Sag11/Sag21|$ | 1.26 |
| T56/T23 | 0.26 | TL/f | 2.78 |
| T56/CT6 | 0.09 | tan(HFOV) | 1.91 |
| f/CT6 | 2.03 | SD/TD | 0.68 |
| CT1/CT6 | 0.37 | TL/ImgH | 1.80 |
| (T12 + T56)/(T23 + T34 + T45) | 0.59 | $|DST1.0|$ (%) | 19.37 |
| (R5 + R6)/(R5 − R6) | 0.48 | $|DST1.0/FOV|$ (%/deg.) | 0.16 |
| ($|R11| + |R12|$)/CT6 | 3.06 | Yc62/f | 0.84 |
| $|f1/f2|$ | 0.50 | | |

In addition, numbers of inflection points of the object-side surfaces and the image-side surfaces of the first lens element 310 (Lens 1), the fourth lens element 340 (Lens 4), the fifth lens element 350 (Lens 5), and the image-side surface 362 of the sixth lens element 360 (Lens 6) in the 3rd embodiment are listed below, wherein each the number is calculated for the inflection points from an axial vertex to a maximum effective radius position on the corresponding surface.

| 3rd Embodiment-Number of Inflection Points | | | | |
|---|---|---|---|---|
|  | Lens 1 | Lens 4 | Lens 5 | Lens 6 |
| Object-side surface | 1 | 0 | 0 |  |
| Image-side surface | 2 | 0 | 4 | 1 |

4th Embodiment

Figure 7:
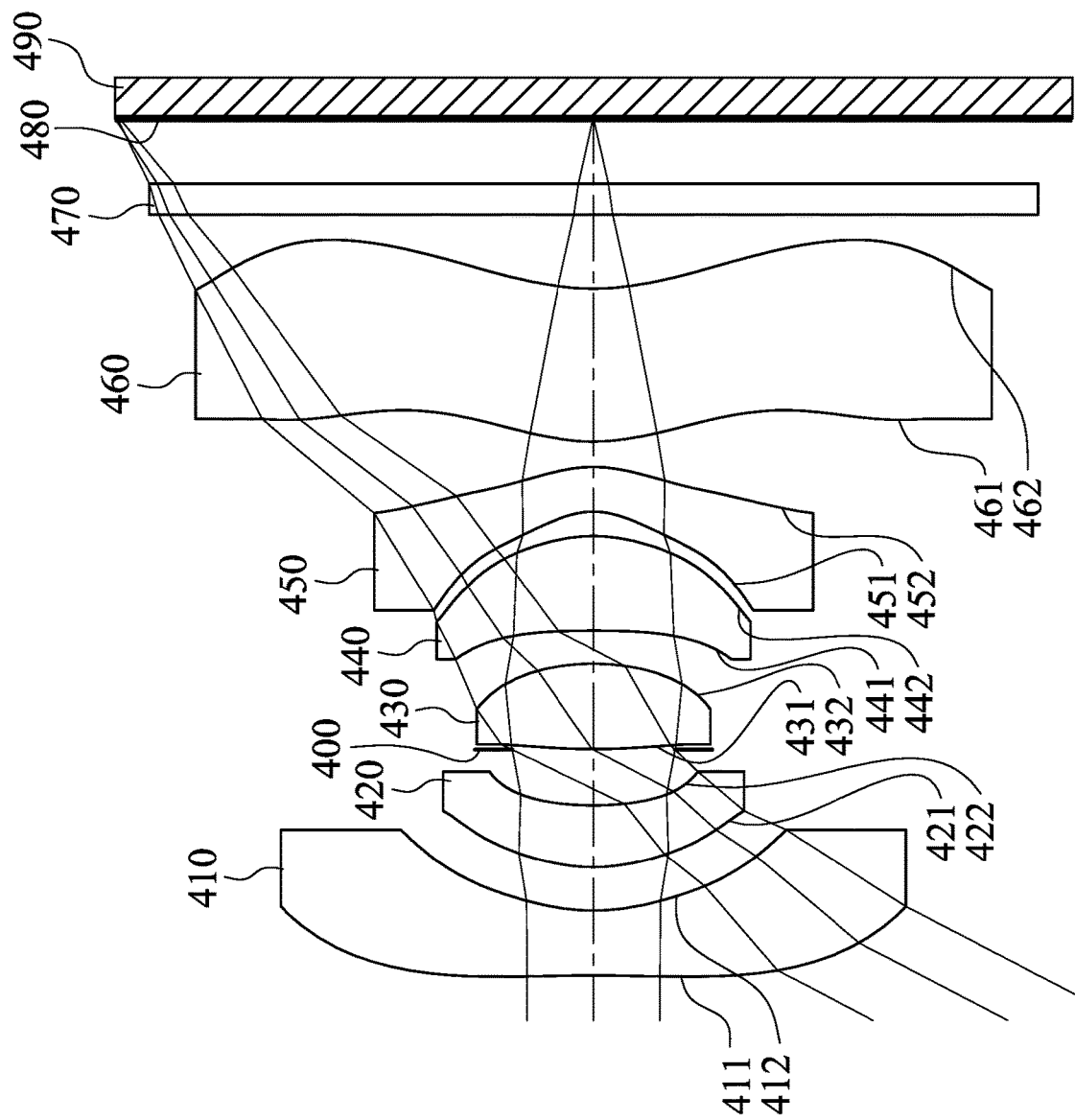
FIG. 7 is a schematic view of an image capturing apparatus according to the 4th embodiment of the present disclosure.
Figure 8:
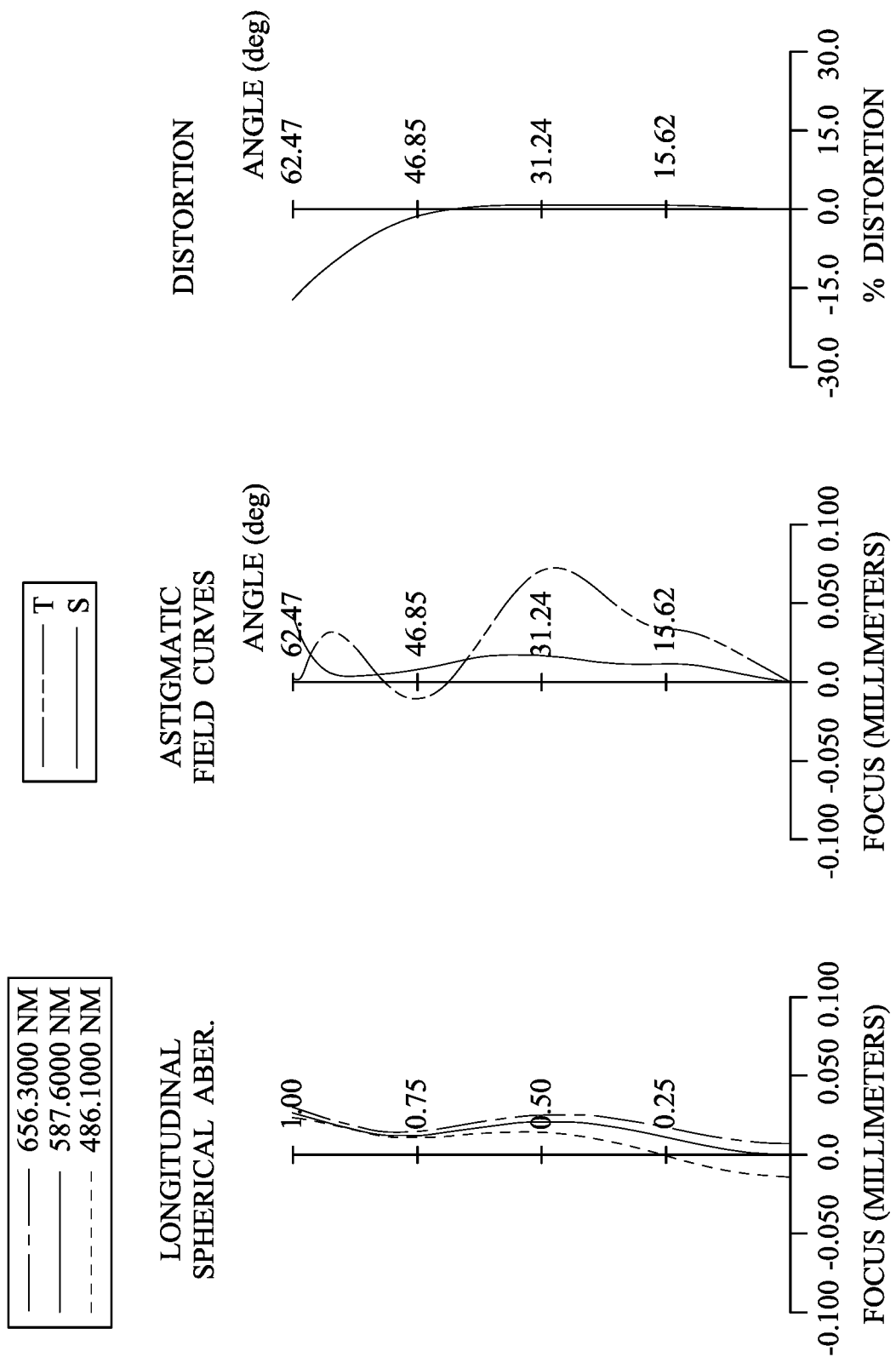
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows, in order from left right, spherical aberration curves, astigmatic field curves and a distortion curve of the image capturing apparatus according to the 4th embodiment. In FIG. 7, the image capturing apparatus includes the optical imaging module (its reference numeral is omitted), a driving unit (not shown herein) and an image sensor 490, wherein the driving unit is for driving the optical imaging module. The optical imaging module includes, in order from an object side to an image side, a first lens element 410, a second lens element 420, an aperture stop 400, a third lens element 430, a fourth lens element 440, a fifth lens element 450, a sixth lens element 460, an IR-cut filter 470 and an image surface 480. The image sensor 490 is disposed on the image surface 480 of the optical imaging module. The optical imaging module includes six lens elements (410, 420, 430, 440, 450 and 460) without additional one or more lens elements inserted between the first lens element 410 and the sixth lens element 460.

The first lens element 410 with negative refractive power has an object-side surface 411 being concave and an image-side surface 412 being concave. The first lens element 410 is made of a plastic material, and has the object-side surface 411 and the image-side surface 412 being both aspheric.

The second lens element 420 with positive refractive power has an object-side surface 421 being convex and an image-side surface 422 being concave. The second lens element 420 is made of a plastic material, and has the object-side surface 421 and the image-side surface 422 being both aspheric.

The third lens element 430 with positive refractive power has an object-side surface 431 being convex and an image-side surface 432 being convex. The third lens element 430 is made of a plastic material, and has the object-side surface 431 and the image-side surface 432 being both aspheric. The fourth lens element 440 with positive refractive power has an object-side surface 441 being concave and an image-side surface 442 being convex. The fourth lens element 440 is made of a plastic material, and has the object-side surface 441 and the image-side surface 442 being both aspheric.

The fifth lens element 450 with negative refractive power has an object-side surface 451 being concave and an image-side surface 452 being convex. The fifth lens element 450 is made of a plastic material, and has the object-side surface 451 and the image-side surface 452 being both aspheric.

The sixth lens element 460 with positive refractive power has an object-side surface 461 being convex and an image-side surface 462 being concave. The sixth lens element 460 is made of a plastic material, and has the object-side surface 461 and the image-side surface 462 being both aspheric.

The IR-cut filter 470 is made of a glass material and located between the sixth lens element 460 and the image surface 480, and will not affect the focal length of the optical imaging module.

The detailed optical data of the 4th embodiment are shown in TABLE 7 and the aspheric surface data are shown in TABLE 8 below.

TABLE 7

4th Embodiment
f = 2.03 mm, Fno = 2.26, HFOV = 62.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −11.033 | ASP | 0.437 | Plastic | 1.545 | 56.1 | −2.31 |
| 2 | | 1.438 | ASP | 0.294 | | | | |
| 3 | Lens 2 | 1.234 | ASP | 0.419 | Plastic | 1.584 | 28.2 | 4.53 |
| 4 | | 2.020 | ASP | 0.378 | | | | |
| 5 | Ape. Stop | Plano | | 0.005 | | | | |
| 6 | Lens 3 | 4.874 | ASP | 0.575 | Plastic | 1.544 | 56.0 | 2.35 |
| 7 | | −1.659 | ASP | 0.224 | | | | |
| 8 | Lens 4 | −8.454 | ASP | 0.642 | Plastic | 1.544 | 56.0 | 2.51 |
| 9 | | −1.207 | ASP | 0.165 | | | | |
| 10 | Lens 5 | −0.541 | ASP | 0.302 | Plastic | 1.660 | 20.4 | −2.68 |
| 11 | | −0.952 | ASP | 0.172 | | | | |
| 12 | Lens 6 | 1.403 | ASP | 1.037 | Plastic | 1.544 | 56.0 | 6.29 |
| 13 | | 1.759 | ASP | 0.500 | | | | |
| 14 | IR-cut filter | Plano | | 0.210 | Glass | 1.517 | 64.2 | — |
| 15 | | Plano | | 0.440 | | | | |
| 16 | Image | Plano | | — | | | | |

Reference wavelength is 587.6 nm (d-line).

TABLE 8

Aspheric Coefficients

| Surface # | 1 | 2 | 3 | 4 | 6 | 7 |
|---|---|---|---|---|---|---|
| k= | −8.0586E−01 | −6.8197E−01 | −1.8665E+00 | −3.1239E−01 | −1.8919E+01 | −1.0782E−01 |
| A4= | 6.0767E−02 | −1.8668E−01 | −1.2231E−01 | 2.1357E−01 | 9.8535E−03 | −1.8513E−01 |
| A6= | −1.7037E−02 | 1.7613E−01 | 9.5596E−02 | −7.2555E−01 | −1.6774E−01 | 2.6465E−02 |
| A8= | 4.5125E−03 | −7.7048E−02 | 2.5056E−01 | 5.5988E+00 | 7.0381E−01 | −3.7936E−01 |
| A10= | −7.0316E−04 | 2.9967E−02 | −1.7343E−01 | −1.2312E+01 | −2.4630E+00 | 8.6945E−01 |
| A12= | 5.4062E−05 | −8.0419E−03 | −3.6854E−02 | 1.1478E+01 | 2.0611E+00 | −1.1611E+00 |

| Surface # | 8 | 9 | 10 | 11 | 12 | 13 |
|---|---|---|---|---|---|---|
| k= | −9.0000E+01 | −4.7654E−01 | −1.0289E+00 | −1.1152E+00 | −7.0703E−01 | −1.3215E+00 |
| A4= | −2.5632E−01 | −1.3866E−01 | 1.2966E+00 | 6.4955E−01 | −2.7511E−01 | −1.0389E−01 |
| A6= | 2.1224E−01 | 1.2454E+00 | −1.0609E+00 | −4.9352E−01 | 1.4487E−01 | 3.4848E−02 |
| A8= | −2.6678E−01 | −3.3237E+00 | −9.7385E−01 | 1.0723E−01 | −7.0485E−02 | −9.8815E−03 |
| A10= | −5.7888E−02 | 3.5526E+00 | 2.5480E+00 | 7.6851E−02 | 2.2780E−02 | 2.0009E−03 |
| A12= | 1.0398E+00 | −1.4539E+00 | −2.3570E+00 | −5.6787E−02 | −4.3133E−03 | −2.7813E−04 |
| A14= | −1.7667E+00 | −1.2393E−01 | 1.0896E+00 | 1.4481E−02 | 4.3387E−04 | 2.2936E−05 |
| A16= | 9.1694E−01 | 1.9360E−01 | −1.9375E−01 | −1.3895E−03 | −1.8117E−05 | −8.0435E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from TABLE 7 and TABLE 8 as the following values and satisfy the following conditions:

| 4th Embodiment | | | |
|---|---|---|---|
| f (mm) | 2.03 | $|f/f1| + |f/f2|$ | 1.33 |
| Fno | 2.26 | $(f/f3) − (f/f4)$ | 0.06 |
| HFOV (deg.) | 62.5 | f1/f5 | 0.86 |
| Nmax | 1.660 | f4/f1 | −1.09 |
| V5/V6 | 0.36 | Y11/Y62 | 0.76 |
| T12/T23 | 0.77 | $|Sag11/Sag21|$ | 1.13 |
| T56/T23 | 0.45 | TL/f | 2.85 |

-continued

| 4th Embodiment | | | |
|---|---|---|---|
| T56/CT6 | 0.17 | tan(HFOV) | 1.92 |
| f/CT6 | 1.96 | SD/TD | 0.67 |
| CT1/CT6 | 0.42 | TL/ImgH | 1.79 |
| (T12 + T56)/(T23 + T34 + T45) | 0.60 | $|DST1.0|$ (%) | 17.32 |
| (R5 + R6)/(R5 − R6) | 0.49 | $|DST1.0/FOV|$ (%/deg.) | 0.14 |
| (|R11| + |R12|)/CT6 | 3.05 | Yc62/f | 0.87 |
| $|f1/f2|$ | 0.51 | | |

In addition, numbers of inflection points of the object-side surfaces and the image-side surfaces of the first lens element 410 (Lens 1), the fourth lens element 440 (Lens 4), the fifth lens element 450 (Lens 5), and the image-side surface 462 of the sixth lens element 460 (Lens 6) in the 4th embodiment are listed below, wherein each the number is calculated for the inflection points from an axial vertex to a maximum effective radius position on the corresponding surface.

| 4th Embodiment-Number of Inflection Points | | | | |
|---|---|---|---|---|
| | Lens 1 | Lens 4 | Lens 5 | Lens 6 |
| Object-side surface | 1 | 1 | 1 | |
| Image-side surface | 1 | 1 | 3 | 2 |

5th Embodiment

Figure 9:
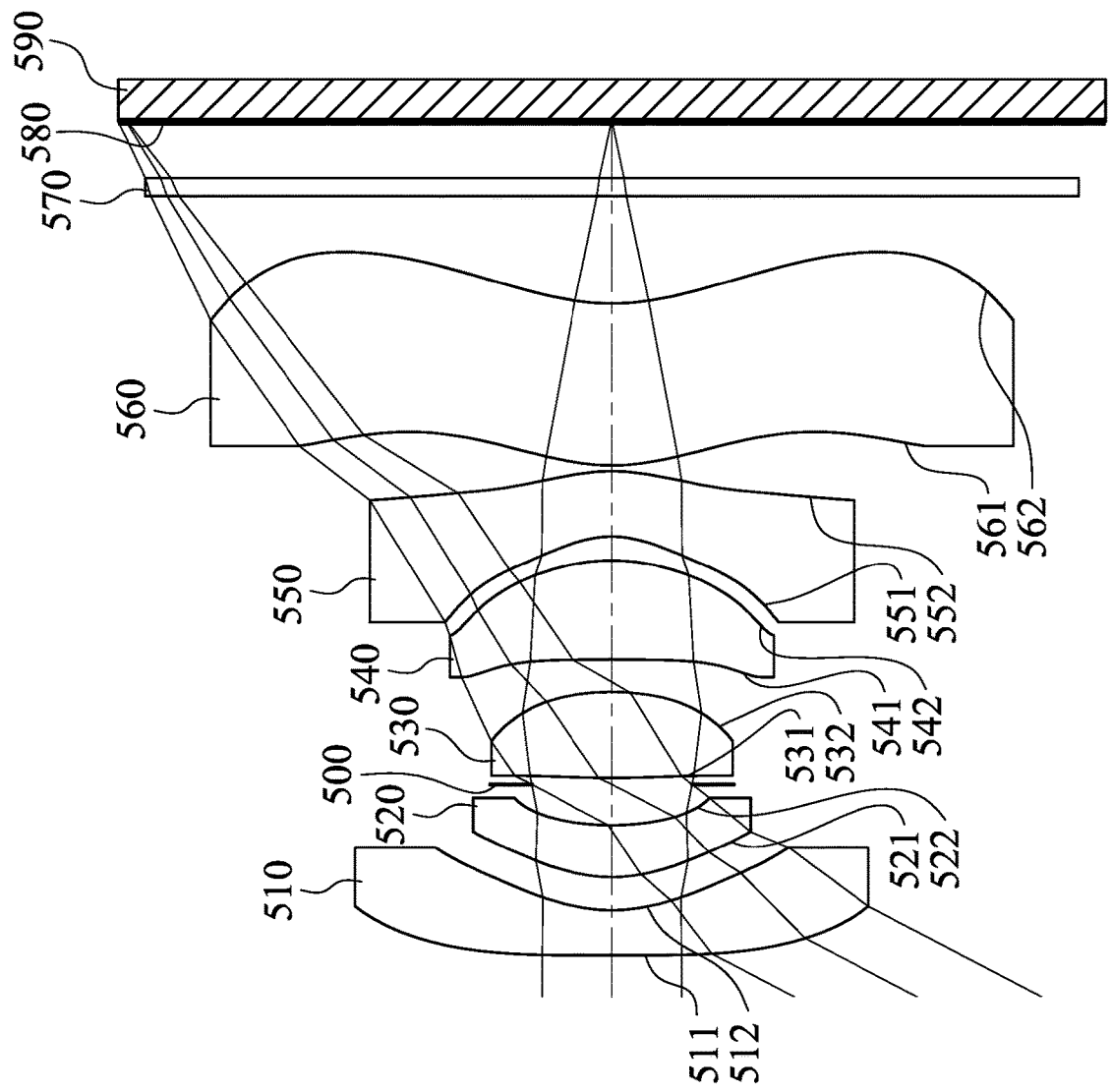
FIG. 9 is a schematic view of an image capturing apparatus according to the 5th embodiment of the present disclosure.
Figure 10:
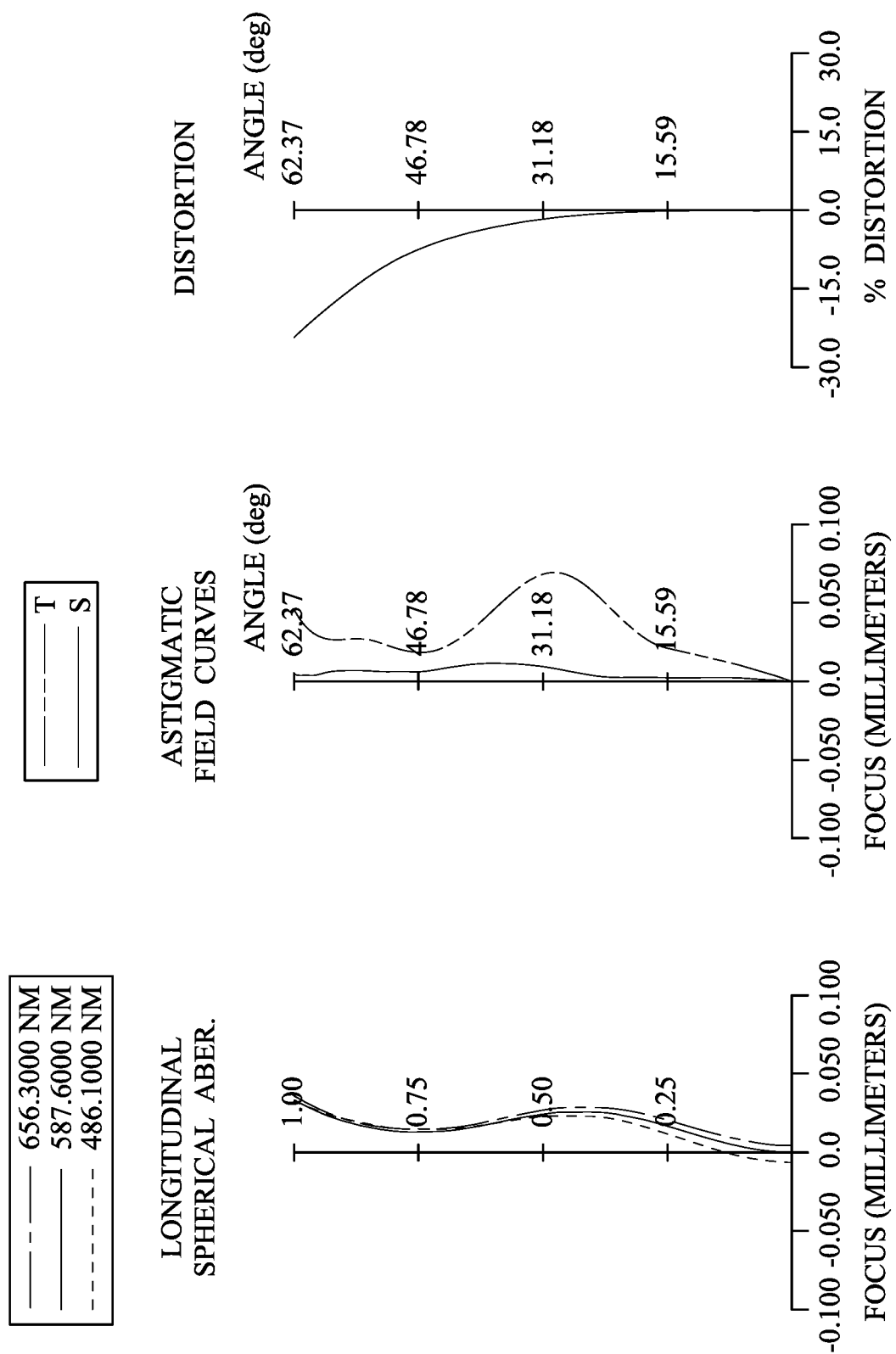
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows, in order from left to right, spherical aberration curves, astigmatic field curves and a distortion curve of the image capturing apparatus according to the 5th embodiment. In FIG. 9, the image capturing apparatus includes the optical imaging module (its reference numeral is omitted), a driving unit (not shown herein) and an image sensor 590, wherein the driving unit is for driving the optical imaging module. The optical imaging module includes, in order from an object side to an image side, a first lens element 510, a second lens element 520, an aperture stop 500, a third lens element 530, a fourth lens element 540, a fifth lens element 550, a sixth lens element 560, an IR-cut filter 570 and an image surface 580. The image sensor 590 is disposed on the image surface 580 of the optical imaging module. The optical imaging module includes six lens elements (510, 520, 530, 540, 550 and 560) without additional one or more lens elements inserted between the first lens element 510 and the sixth lens element 560.

The first lens element 510 with negative refractive power has an object-side surface 511 being concave and an image-side surface 512 being concave. The first lens element 510 is made of a plastic material, and has the object-side surface 511 and the image-side surface 512 being both aspheric.

The second lens element 520 with positive refractive power has an object-side surface 521 being convex and an image-side surface 522 being concave. The second lens element 520 is made of a plastic material, and has the object-side surface 521 and the image-side surface 522 being both aspheric.

The third lens element 530 with positive refractive power has an object-side surface 531 being convex and an image-side surface 532 being convex. The third lens element 530 is made of a plastic material, and has the object-side surface 531 and the image-side surface 532 being both aspheric.

The fourth lens element 540 with positive refractive power has an object-side surface 541 being convex and an image-side surface 542 being convex. The fourth lens element 540 is made of a plastic material, and has the object-side surface 541 and the image-side surface 542 being both aspheric.

The fifth lens element 550 with negative refractive power has an object-side surface 551 being concave and an image-side surface 552 being convex. The fifth lens element 550 is made of a plastic material, and has the object-side surface 551 and the image-side surface 552 being both aspheric.

The sixth lens element 560 with positive refractive power has an object-side surface 561 being convex and an image-side surface 562 being concave. The sixth lens element 560 is made of a plastic material, and has the object-side surface 561 and the image-side surface 562 being both aspheric.

The IR-cut filter 570 is made of a glass material and located between the sixth lens element 560 and the image surface 580, and will not affect the focal length of the optical imaging module.

The detailed optical data of the 5th embodiment are shown in TABLE 9 and the aspheric surface data are shown in TABLE 10 below.

TABLE 9

5th Embodiment
f = 2.02 mm, Fno = 2.40, HFOV = 62.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −127.360 | ASP | 0.270 | Plastic | 1.536 | 54.5 | −1.90 |
| 2 | | 1.030 | ASP | 0.201 | | | | |
| 3 | Lens 2 | 0.954 | ASP | 0.316 | Plastic | 1.577 | 35.9 | 3.25 |
| 4 | | 1.708 | ASP | 0.247 | | | | |
| 5 | Ape. Stop | Plano | | 0.041 | | | | |
| 6 | Lens 3 | 7.144 | ASP | 0.518 | Plastic | 1.545 | 55.9 | 2.38 |
| 7 | | −1.543 | ASP | 0.195 | | | | |
| 8 | Lens 4 | 35.946 | ASP | 0.600 | Plastic | 1.545 | 55.9 | 2.27 |
| 9 | | −1.276 | ASP | 0.146 | | | | |
| 10 | Lens 5 | −0.620 | ASP | 0.394 | Plastic | 1.660 | 20.4 | −2.46 |
| 11 | | −1.257 | ASP | 0.035 | | | | |
| 12 | Lens 6 | 1.266 | ASP | 0.980 | Plastic | 1.545 | 55.9 | 6.08 |
| 13 | | 1.490 | ASP | 0.650 | | | | |
| 14 | IR-cut filter | Plano | | 0.110 | Glass | 1.517 | 64.2 | — |
| 15 | | Plano | | 0.339 | | | | |
| 16 | Image | Plano | | — | | | | |

Reference wavelength is 587.6 nm (d-line).

TABLE 10

Aspheric Coefficients

| Surface # | 1 | 2 | 3 | 4 | 6 | 7 |
|---|---|---|---|---|---|---|
| k= | −9.0000E+01 | −1.3427E+00 | −2.6252E−01 | 6.3719E−01 | −9.0000E+01 | 1.1261E+00 |
| A4= | 8.7767E−02 | −1.7435E−01 | −3.1739E−01 | 3.4764E−01 | −2.8953E−02 | −2.7727E−01 |
| A6= | −3.5674E−02 | 1.6392E−01 | 2.1066E−01 | −1.4040E+00 | −5.8797E−02 | 9.7311E−03 |
| A8= | 1.1128E−02 | −5.6799E−01 | −2.6464E+00 | 9.2560E+00 | −5.5317E−01 | −1.5762E−01 |
| A10= | −9.8522E−04 | 9.2350E−01 | 7.1919E+00 | −2.5580E+01 | 1.0492E+00 | −4.4047E−02 |
| A12= | | −5.7941E−01 | −7.1721E+00 | 4.0351E+01 | | −1.1794E+00 |
| A14= | | 1.2282E−01 | 2.2561E+00 | | | 1.6212E+00 |

| Surface # | 8 | 9 | 10 | 11 | 12 | 13 |
|---|---|---|---|---|---|---|
| k= | −9.0000E+01 | −1.0353E+00 | −1.0160E+00 | −9.9817E−01 | −1.3401E+00 | −1.0216E+00 |
| A4= | −3.4805E−01 | −4.0436E−01 | 9.3882E−01 | 4.7926E−01 | −3.2229E−01 | −1.6135E−01 |
| A6= | 8.3036E−01 | 2.5960E+00 | 5.0664E−01 | −2.2514E−01 | 2.0173E−01 | 5.6214E−02 |
| A8= | −4.0038E+00 | −7.9601E+00 | −6.0476E+00 | −7.3276E−02 | −8.9161E−02 | −1.4814E−02 |
| A10= | 1.2911E+01 | 1.2299E+01 | 1.2985E+01 | 1.1626E−01 | 2.3964E−02 | 2.4267E−03 |
| A12= | −2.4123E+01 | −1.0173E+01 | −1.4942E+01 | −4.1874E−02 | −3.3650E−03 | −2.3412E−04 |
| A14= | 2.3025E+01 | 3.5790E+00 | 9.0414E+00 | 5.0027E−03 | 1.8770E−04 | 9.9925E−06 |
| A16= | −8.4336E+00 | | −2.1959E+00 | | | |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from TABLE 9 and TABLE 10 as the following values and satisfy the following conditions:

| 5th Embodiment | | | |
|---|---|---|---|
| f (mm) | 2.02 | |f/f1| + |f/f2| | 1.68 |
| Fno | 2.40 | (f/f3) − (f/f4) | −0.04 |
| HFOV (deg.) | 62.4 | f1/f5 | 0.77 |
| Nmax | 1.660 | f4/f1 | −1.19 |
| V5/V6 | 0.36 | Y11/Y62 | 0.64 |
| T12/T23 | 0.70 | |Sag11/Sag21| | 1.07 |
| T56/T23 | 0.12 | TL/f | 2.50 |
| T56/CT6 | 0.04 | tan(HFOV) | 1.91 |
| f/CT6 | 2.06 | SD/TD | 0.74 |
| CT1/CT6 | 0.28 | TL/ImgH | 1.72 |
| (T12 + T56)/(T23 + T34 + T45) | 0.38 | |DST1.0| (%) | 24.25 |
| (R5 + R6)/(R5 − R6) | 0.64 | |DST1.0/FOV| (%/deg.) | 0.19 |
| (|R11| + |R12|)/CT6 | 2.81 | Yc62/f | 0.80 |
| |f1/f2| | 0.59 | | |

In addition, numbers of inflection points of the object-side surfaces and the image-side surfaces of the first lens element 510 (Lens 1), the fourth lens element 540 (Lens 4), the fifth lens element 550 (Lens 5), and the image-side surface 562 of the sixth lens element 560 (Lens 6) in the 5th embodiment are listed below, wherein each the number is calculated for the inflection points from an axial vertex to a maximum effective radius position on the corresponding surface.

| 5th Embodiment-Number of Inflection Points | | | | |
|---|---|---|---|---|
| | Lens 1 | Lens 4 | Lens 5 | Lens 6 |
| Object-side surface | 1 | 2 | 1 | |
| Image-side surface | 1 | 1 | 4 | 1 |

6th Embodiment

Figure 11:
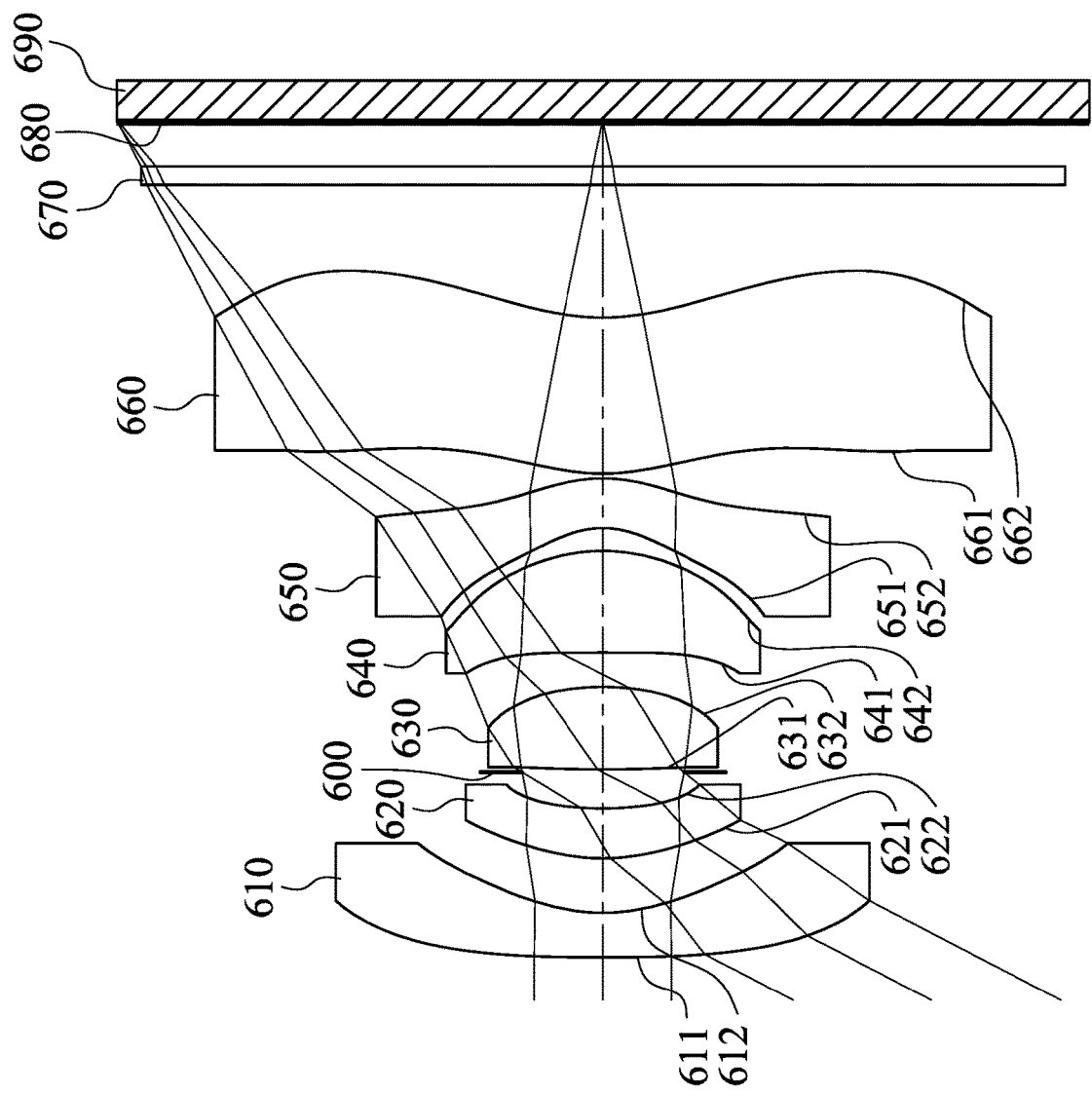
FIG. 11 is a schematic view of an image capturing apparatus according to the 6th embodiment of the present disclosure.
Figure 12:
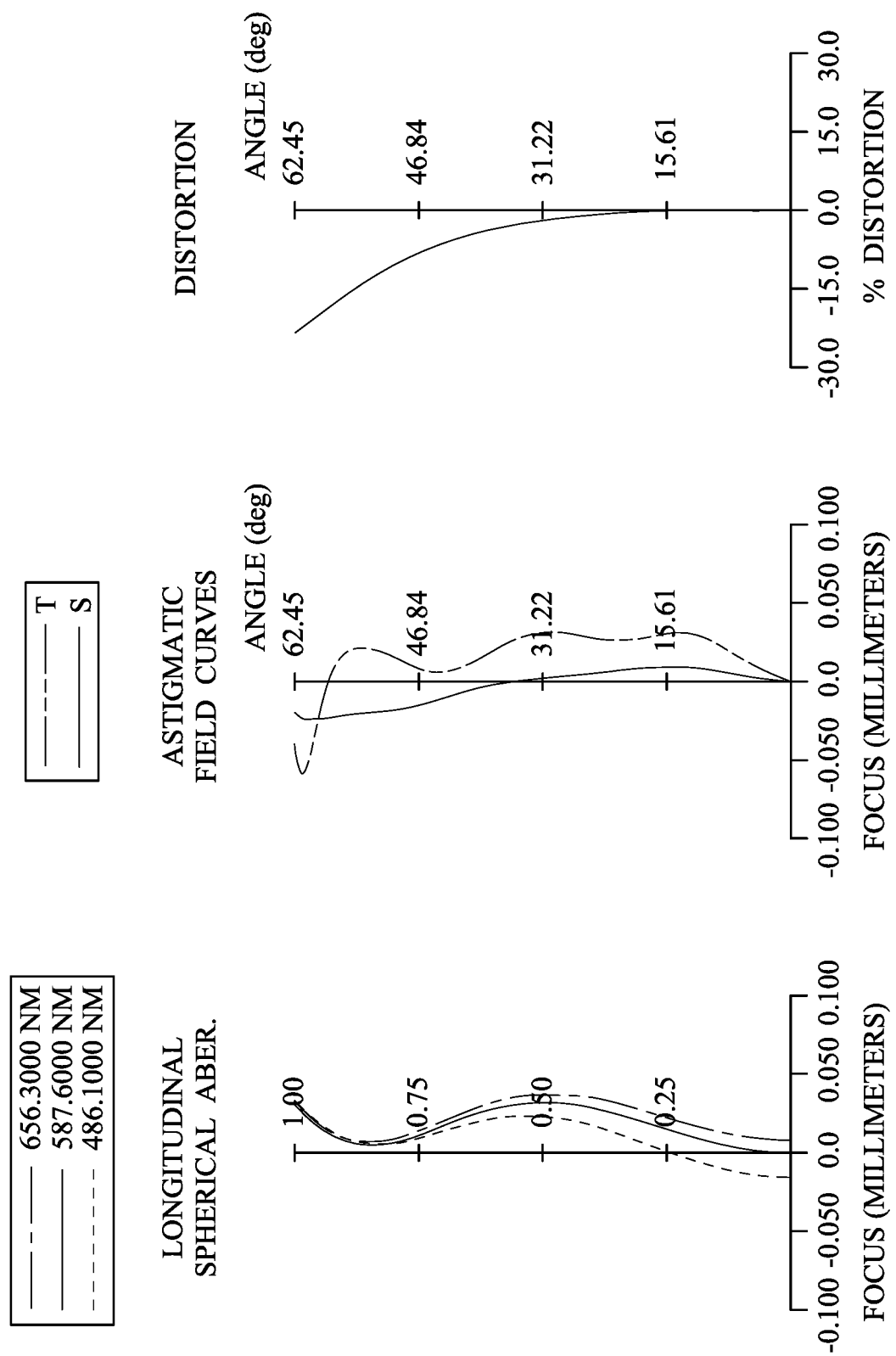
FIG. 12 shows spherical aberration curves, astigmatic field curves and a distortion curve of the image capturing apparatus according to the 6th embodiment.

FIG. 11 is a schematic view of an image capturing apparatus according to the 6th embodiment of the present disclosure. FIG. 12 shows, in order from left to right, spherical aberration curves, astigmatic field curves and a distortion curve of the image capturing apparatus according to the 6th embodiment. In FIG. 11, the image capturing apparatus includes the optical imaging module (its reference numeral is omitted), a driving unit (not shown herein) and an image sensor 690, wherein the driving unit is for driving the optical imaging module. The optical imaging module includes, in order from an object side to an image side, a first lens element 610, a second lens element 620, an aperture stop 600, a third lens element 630, a fourth lens element 640, a fifth lens element 650, a sixth lens element 660, an IR-cut filter 670 and an image surface 680. The image sensor 690 is disposed on the image surface 680 of the optical imaging module. The optical imaging module includes six lens elements (610, 620, 630, 640, 650 and 660) without additional one or more lens elements inserted between the first lens element 610 and the sixth lens element 660.

The first lens element 610 with negative refractive power has an object-side surface 611 being convex and an image-side surface 612 being concave. The first lens element 610 is made of a plastic material, and has the object-side surface 611 and the image-side surface 612 being both aspheric.

The second lens element 620 with positive refractive power has an object-side surface 621 being convex and an image-side surface 622 being concave. The second lens element 620 is made of a plastic material, and has the object-side surface 621 and the image-side surface 622 being both aspheric.

The third lens element 630 with positive refractive power has an object-side surface 631 being convex and an image-side surface 632 being convex. The third lens element 630 is made of a plastic material, and has the object-side surface 631 and the image-side surface 632 being both aspheric.

The fourth lens element 640 with positive refractive power has an object-side surface 641 being concave and an image-side surface 642 being convex. The fourth lens element 640 is made of a plastic material, and has the object-side surface 641 and the image-side surface 642 being both aspheric.

The fifth lens element 650 with negative refractive power has an object-side surface 651 being concave and an image-side surface 652 being convex. The fifth lens element 650 is made of a plastic material, and has the object-side surface 651 and the image-side surface 652 being both aspheric.

The sixth lens element 660 with positive refractive power has an object-side surface 661 being convex and an image-side surface 662 being concave. The sixth lens element 660 is made of a plastic material, and has the object-side surface 661 and the image-side surface 662 being both aspheric.

The IR-cut filter 670 is made of a glass material and located between the sixth lens element 660 and the image surface 680, and will not affect the focal length of the optical imaging module.

The detailed optical data of the 6th embodiment are shown in TABLE 11 and the aspheric surface data are shown in TABLE 12 below.

TABLE 11

6th Embodiment
f = 1.99 mm, Fno = 2.40, HFOV = 62.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 16.931 | ASP | 0.269 | Plastic | 1.545 | 56.1 | −2.40 |
| 2 | | 1.206 | ASP | 0.327 | | | | |
| 3 | Lens 2 | 1.240 | ASP | 0.301 | Plastic | 1.584 | 28.2 | 4.86 |
| 4 | | 2.004 | ASP | 0.219 | | | | |
| 5 | Ape. Stop | Plano | | 0.016 | | | | |
| 6 | Lens 3 | 7.753 | ASP | 0.501 | Plastic | 1.544 | 56.0 | 2.57 |
| 7 | | −1.670 | ASP | 0.207 | | | | |
| 8 | Lens 4 | −200.000 | ASP | 0.611 | Plastic | 1.544 | 56.0 | 2.33 |
| 9 | | −1.259 | ASP | 0.138 | | | | |
| 10 | Lens 5 | −0.562 | ASP | 0.300 | Plastic | 1.660 | 20.4 | −3.05 |
| 11 | | −0.945 | ASP | 0.030 | | | | |
| 12 | Lens 6 | 1.343 | ASP | 0.942 | Plastic | 1.544 | 56.0 | 8.57 |
| 13 | | 1.420 | ASP | 0.800 | | | | |
| 14 | IR-cut filter | Plano | | 0.110 | Glass | 1.517 | 64.2 | — |
| 15 | | Plano | | 0.272 | | | | |
| 16 | Image | Plano | | — | | | | |

Reference wavelength is 587.6 nm (d-line).

TABLE 12

Aspheric Coefficients

| | Surface # | | | | | |
|---|---|---|---|---|---|---|
| | 1 | 2 | 3 | 4 | 6 | 7 |
| k= | 9.1022E+01 | −1.1624E+00 | 3.8003E−01 | −5.9464E−01 | −3.1430E+01 | −1.5409E+00 |
| A4= | 4.9756E−02 | −7.3370E−02 | −2.3960E−01 | 1.7690E−01 | −6.1030E−02 | −2.9616E−01 |
| A6= | −1.8005E−02 | 1.7509E−02 | 5.2292E−02 | 6.8314E−01 | 3.8204E−01 | −2.4223E−01 |
| A8= | 5.6100E−03 | −1.6793E−01 | −1.0820E+00 | −2.8460E+00 | −1.9601E+00 | −7.9491E−01 |
| A10= | −3.4983E−04 | 2.3641E−01 | 3.0264E+00 | 1.0886E+01 | 2.7367E+00 | 4.7683E+00 |
| A12= | | −8.1374E−02 | −2.2460E+00 | | | −1.1810E+01 |
| A14= | | | | | | 8.6847E+00 |

| | Surface # | | | | | |
|---|---|---|---|---|---|---|
| | 8 | 9 | 10 | 11 | 12 | 13 |
| k= | 1.0000E+01 | −6.2324E−01 | −1.0448E+00 | −1.4200E+00 | −1.0478E+00 | −6.8752E−01 |
| A4= | −2.5336E−01 | −5.2496E−01 | 6.5147E−01 | 3.9547E−01 | −3.9571E−01 | −2.1858E−01 |
| A6= | 4.5275E−01 | 1.9703E+00 | 1.7684E+00 | 2.9793E−01 | 2.8479E−01 | 9.1868E−02 |
| A8= | −2.5205E+00 | −1.7983E+00 | −7.1240E+00 | −1.0555E+00 | −1.5733E−01 | −3.5277E−02 |
| A10= | 6.4695E+00 | −6.8819E+00 | 9.5730E+00 | 1.0576E+00 | 6.0490E−02 | 9.4240E−03 |
| A12= | −8.7497E+00 | 1.8822E+01 | −6.0964E+00 | −5.4008E−01 | −1.4335E−02 | −1.6965E−03 |
| A14= | 4.7003E+00 | −1.7986E+01 | 1.4795E+00 | 1.4277E−01 | 1.8575E−03 | 1.7984E−04 |
| A16= | | 6.3397E+00 | 4.2566E−02 | −1.5575E−02 | −1.0037E−04 | −8.3998E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from TABLE 11 and TABLE 12 as the following values and satisfy the following conditions:

| 6th Embodiment | |
|---|---|
| f (mm) | 1.99 |
| Fno | 2.40 |
| HFOV (deg.) | 62.4 |
| Nmax | 1.660 |
| V5/V6 | 0.36 |
| T12/T23 | 1.39 |
| T56/T23 | 0.13 |
| T56/CT6 | 0.03 |
| f/CT6 | 2.11 |
| CT1/CT6 | 0.29 |
| (T12 + T56)/(T23 + T34 + T45) | 0.62 |
| (R5 + R6)/(R5 − R6) | 0.65 |
| (|R11| + |R12|)/CT6 | 2.93 |
| |f1/f2| | 0.49 |
| |f/f1| + |f/f2| | 1.24 |
| (f/f3) − (f/f4) | −0.08 |
| f1/f5 | 0.79 |
| f4/f1 | −0.97 |
| Y11/Y62 | 0.67 |
| |Sag11/Sag21| | 1.42 |
| TL/f | 2.53 |
| tan(HFOV) | 1.92 |
| SD/TD | 0.71 |
| TL/ImgH | 1.72 |
| |DST1.0| (%) | 23.39 |
| |DST1.0/FOV| (%/deg.) | 0.19 |
| Yc62/f | 0.77 |

In addition, numbers of inflection points of the object-side surfaces and the image-side surfaces of the first lens element 610 (Lens 1), the fourth lens element 640 (Lens 4), the fifth lens element 650 (Lens 5), and the image-side surface 662 of the sixth lens element 660 (Lens 6) in the 6th embodiment are listed below, wherein each the number is calculated for the inflection points from an axial vertex to a maximum effective radius position on the corresponding surface.

| 6th Embodiment-Number of Inflection Points | | | | |
|---|---|---|---|---|
| | Lens 1 | Lens 4 | Lens 5 | Lens 6 |
| Object-side surface | 0 | 1 | 0 | |
| Image-side surface | 0 | 1 | 2 | 2 |

7th Embodiment

Figure 13:
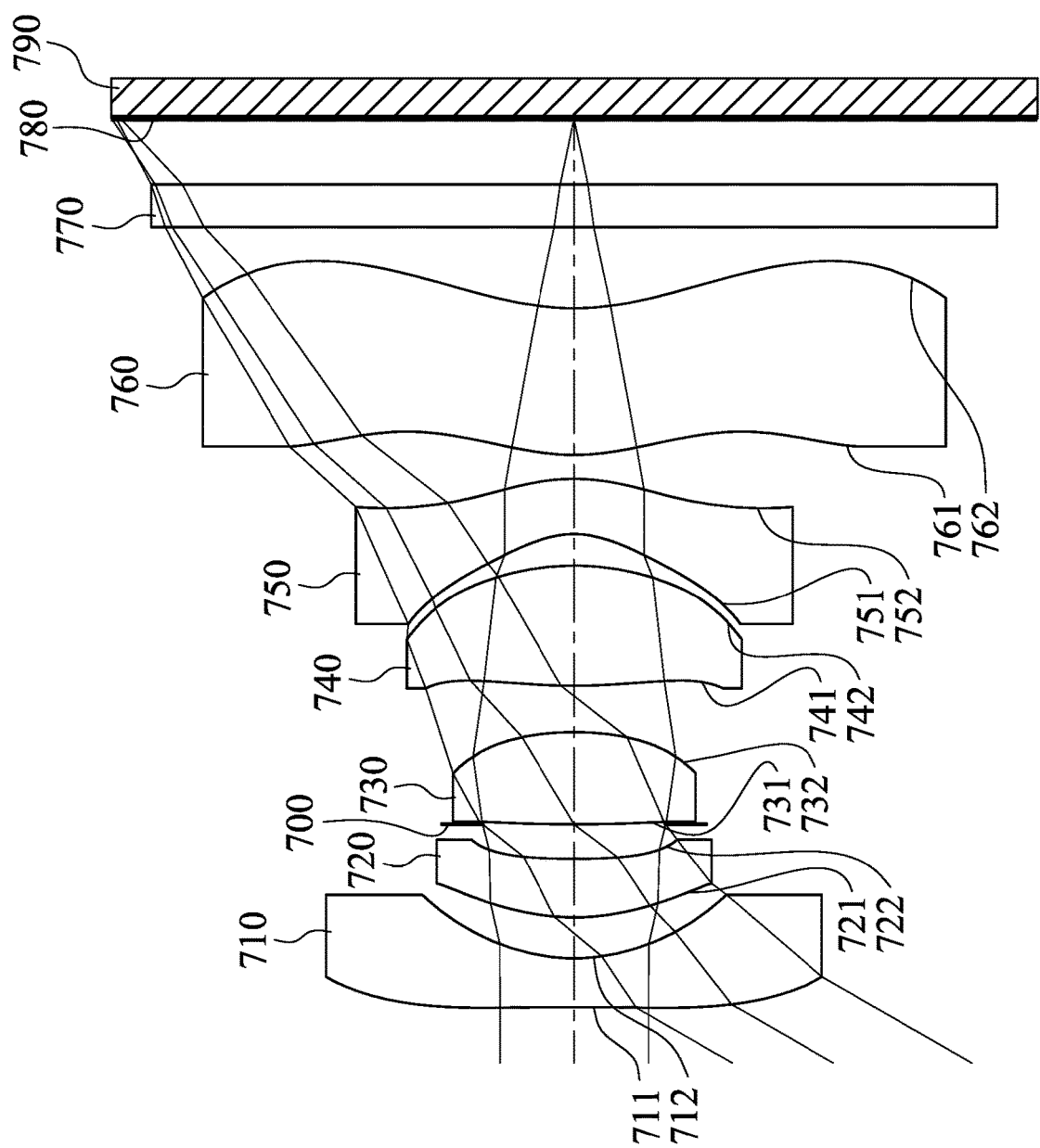
FIG. 13 is a schematic view of an image capturing apparatus according to the 7th embodiment of the present disclosure.
Figure 14:
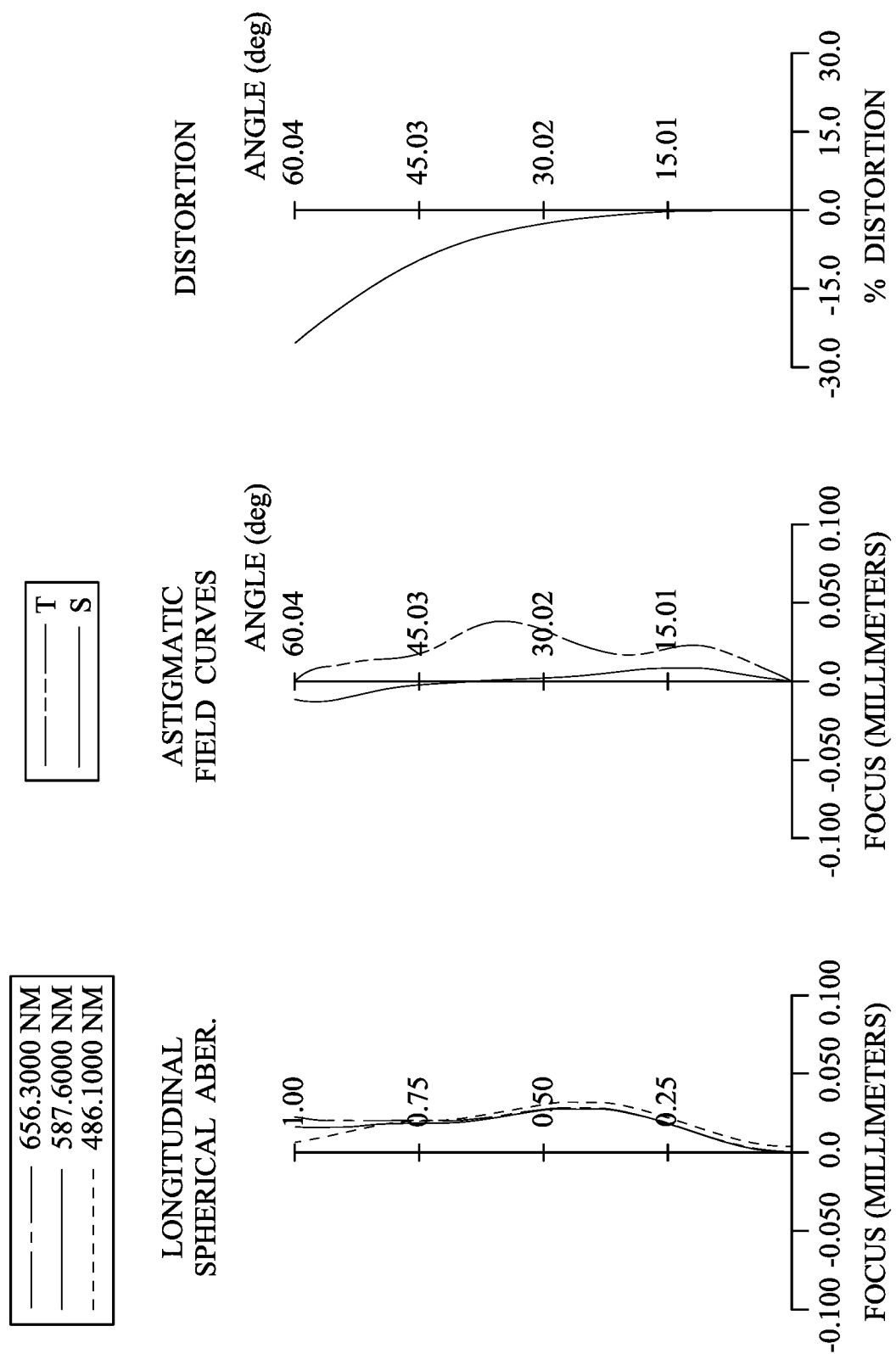
FIG. 14 shows spherical aberration curves, astigmatic field curves and a distortion curve of the image capturing apparatus according to the 7th embodiment.

FIG. 13 is a schematic view of an image capturing apparatus according to the 7th embodiment of the present disclosure. FIG. 14 shows, in order from left to right, spherical aberration curves, astigmatic field curves and a distortion curve of the image capturing apparatus according to the 7th embodiment. In FIG. 13, the image capturing apparatus includes the optical imaging module (its reference numeral is omitted), a driving unit (not shown herein) and an image sensor 790, wherein the driving unit is for driving the optical imaging module. The optical imaging module includes, in order from an object side to an image side, a first lens element 710, a second lens element 720, an aperture stop 700, a third lens element 730, a fourth lens element 740, a fifth lens element 750, a sixth lens element 760, an IR-cut filter 770 and an image surface 780. The image sensor 790 is disposed on the image surface 780 of the optical imaging module. The optical imaging module includes six lens elements (710, 720, 730, 740, 750 and 760) without additional one or more lens elements inserted between the first lens element 710 and the sixth lens element 760.

The first lens element 710 with negative refractive power has an object-side surface 711 being concave and an image-side surface 712 being concave. The first lens element 710 is made of a plastic material, and has the object-side surface 711 and the image-side surface 712 being both aspheric.

The second lens element 720 with positive refractive power has an object-side surface 721 being convex and an image-side surface 722 being concave. The second lens element 720 is made of a plastic material, and has the object-side surface 721 and the image-side surface 722 being both aspheric.

The third lens element 730 with positive refractive power has an object-side surface 731 being convex and an image-side surface 732 being convex. The third lens element 730 is made of a plastic material, and has the object-side surface 731 and the image-side surface 732 being both aspheric.

The fourth lens element 740 with positive refractive power has an object-side surface 741 being convex and an image-side surface 742 being convex. The fourth lens element 740 is made of a plastic material, and has the object-side surface 741 and the image-side surface 742 being both aspheric.

The fifth lens element 750 with negative refractive power has an object-side surface 751 being concave and an image-side surface 752 being convex. The fifth lens element 750 is made of a plastic material, and has the object-side surface 751 and the image-side surface 752 being both aspheric.

The sixth lens element 760 with positive refractive power has an object-side surface 761 being convex and an image-side surface 762 being concave. The sixth lens element 760 is made of a plastic material, and has the object-side surface 761 and the image-side surface 762 being both aspheric.

The IR-cut filter 770 is made of a glass material and located between the sixth lens element 760 and the image surface 780, and will not affect the focal length of the optical imaging module.

The detailed optical data of the 7th embodiment are shown in TABLE 13 and the aspheric surface data are shown in TABLE 14 below.

TABLE 13

7th Embodiment
f = 1.75 mm, Fno = 2.39, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −12.624 | ASP | 0.240 | Plastic | 1.545 | 56.1 | −1.63 |
| 2 | | 0.963 | ASP | 0.202 | | | | |
| 3 | Lens 2 | 1.155 | ASP | 0.290 | Plastic | 1.545 | 56.1 | 3.03 |

TABLE 13-continued

7th Embodiment
f = 1.75 mm, Fno = 2.39, HFOV = 60.0 deg.

| Surface # | | Curvature Radius | | Thickness | Material | Index | Abbe # | Focal Length |
|---|---|---|---|---|---|---|---|---|
| 4 | | 3.506 | ASP | 0.171 | | | | |
| 5 | Ape. Stop | Plano | | 0.000 | | | | |
| 6 | Lens 3 | 8.272 | ASP | 0.454 | Plastic | 1.545 | 56.1 | 2.40 |
| 7 | | -1.525 | ASP | 0.228 | | | | |
| 8 | Lens 4 | 2.777 | ASP | 0.596 | Plastic | 1.545 | 56.1 | 1.62 |
| 9 | | -1.191 | ASP | 0.155 | | | | |
| 10 | Lens 5 | -0.461 | ASP | 0.272 | Plastic | 1.660 | 20.4 | -1.72 |
| 11 | | -0.958 | ASP | 0.118 | | | | |
| 12 | Lens 6 | 1.095 | ASP | 0.725 | Plastic | 1.544 | 56.0 | 5.69 |
| 13 | | 1.299 | ASP | 0.400 | | | | |
| 14 | IR-cut filter | Plano | | 0.210 | Glass | 1.517 | 64.2 | — |
| 15 | | Plano | | 0.327 | | | | |
| 16 | Image | Plano | | — | | | | |

Reference wavelength is 587.6 nm (d-line).

TABLE 14

Aspheric Coefficients

| Surface # | 1 | 2 | 3 | 4 | 6 | 7 |
|---|---|---|---|---|---|---|
| k= | -9.0000E+01 | -2.4132E-01 | -2.6710E+00 | -5.2919E+00 | -3.2490E+01 | 3.8256E-01 |
| A4= | 1.1343E-01 | -1.2988E-01 | -4.1376E-02 | 5.7073E-01 | -1.3132E-02 | -5.0760E-01 |
| A6= | -3.5947E-02 | -2.6304E-01 | -1.2725E-01 | -2.0368E+00 | 9.6455E-01 | -1.3126E-01 |
| A8= | 2.9725E-02 | 2.5156E+00 | 1.2733E+00 | 2.6926E+01 | -8.7732E+00 | 6.5426E-01 |
| A10= | -3.4081E-02 | -6.4151E+00 | -8.4294E-01 | -1.0896E+02 | 3.0125E+01 | -5.5322E+00 |
| A12= | 2.3485E-02 | 7.8657E+00 | -3.5876E+00 | 2.0943E+02 | -3.4162E+01 | 6.3673E+00 |
| A14= | -5.3708E-03 | -4.2297E+00 | 1.3408E+00 | | | |

| Surface # | 8 | 9 | 10 | 11 | 12 | 13 |
|---|---|---|---|---|---|---|
| k= | -3.5439E+01 | -6.2317E-02 | -1.2903E+00 | -7.7021E+00 | -6.9410E+00 | -9.7438E-01 |
| A4= | -9.0599E-02 | 2.6427E-01 | 1.9392E+00 | -2.1420E-01 | -3.1406E-01 | -2.7918E-01 |
| A6= | -6.7275E-01 | -1.2368E+00 | -6.3427E+00 | 2.0037E+00 | 3.9492E-01 | 1.6040E-01 |
| A8= | 2.8134E+00 | 6.5258E+00 | 1.9236E+01 | -4.5501E+00 | -5.0763E-01 | -8.4316E-02 |
| A10= | -8.9099E+00 | -2.2101E+01 | -4.5143E+01 | 5.3933E+00 | 4.0116E-01 | 3.0645E-02 |
| A12= | 1.3023E+01 | 3.1534E+01 | 5.5918E+01 | -3.5976E+00 | -1.6915E-01 | -7.1565E-03 |
| A14 = | -7.6776E+00 | -1.5938E+01 | -2.7037E+01 | 1.2810E+00 | 3.6008E-02 | 9.4808E-04 |
| A16= | | | | -1.9081E-01 | -3.0699E-03 | -5.2662E-05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from TABLE 13 and TABLE 14 as the following values and satisfy the following conditions:

| 7th Embodiment | |
|---|---|
| f (mm) | 1.75 |
| Fno | 2.39 |
| HFOV (deg.) | 60.0 |
| Nmax | 1.660 |
| V5/V6 | 0.36 |
| T12/T23 | 1.18 |
| T56/T23 | 0.69 |
| T56/CT6 | 0.16 |
| f/CT6 | 2.42 |
| CT1/CT6 | 0.33 |
| (T12 + T56)/(T23 + T34 + T45) | 0.58 |
| (R5 + R6)/(R5 − R6) | 0.69 |
| (|R11| + |R12|)/CT6 | 3.30 |
| |f1/f2| | 0.54 |
| |f/f1| + |f/f2| | 1.65 |
| (f/f3) − (f/f4) | −0.36 |
| f1/f5 | 0.95 |
| f4/f1 | −0.99 |
| Y11/Y62 | 0.66 |
| |Sag11/Sag21| | 0.83 |
| TL/f | 2.50 |
| tan(HFOV) | 1.73 |
| SD/TD | 0.74 |
| TL/ImgH | 1.92 |
| |DST1.0| (%) | 25.33 |
| |DST1.0/FOV| (%/deg.) | 0.21 |
| Yc62/f | 0.72 |

In addition, numbers of inflection points of the object-side surfaces and the image-side surfaces of the first lens element 710 (Lens 1), the fourth lens element 740 (Lens 4), the fifth lens element 750 (Lens 5), and the image-side surface 762 of the sixth lens element 760 (Lens 6) in the 7th embodiment are listed below, wherein each the number is calculated for the inflection points from an axial vertex to a maximum effective radius position on the corresponding surface.

| 7th Embodiment-Number of Inflection Points | | | | |
|---|---|---|---|---|
| | Lens 1 | Lens 4 | Lens 5 | Lens 6 |
| Object-side surface | 1 | 1 | 0 | |
| Image-side surface | 0 | 0 | 1 | 1 |

8th Embodiment

Figure 15:
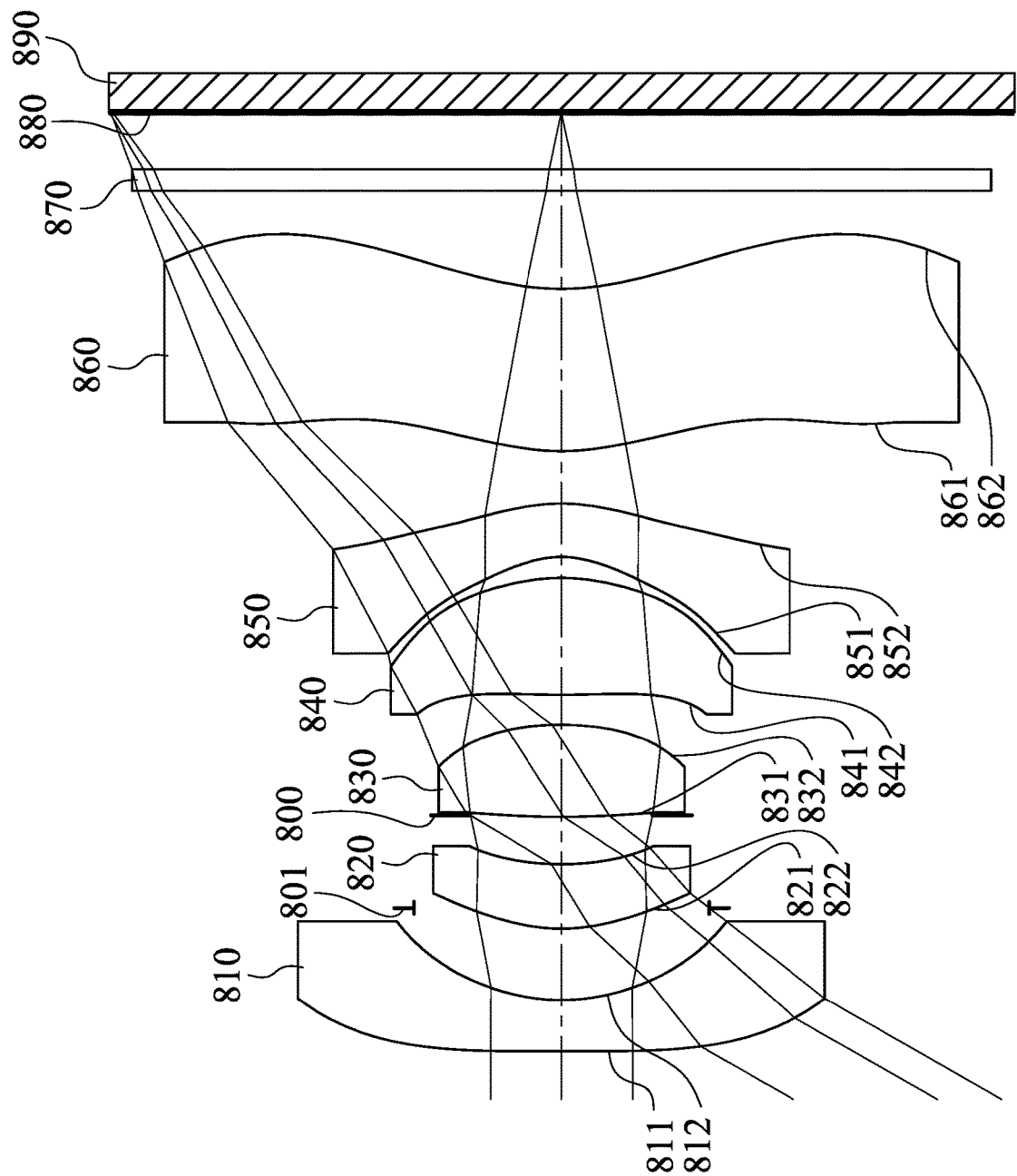
FIG. 15 is a schematic view of an image capturing apparatus according to the 8th embodiment of the present disclosure.
Figure 16:
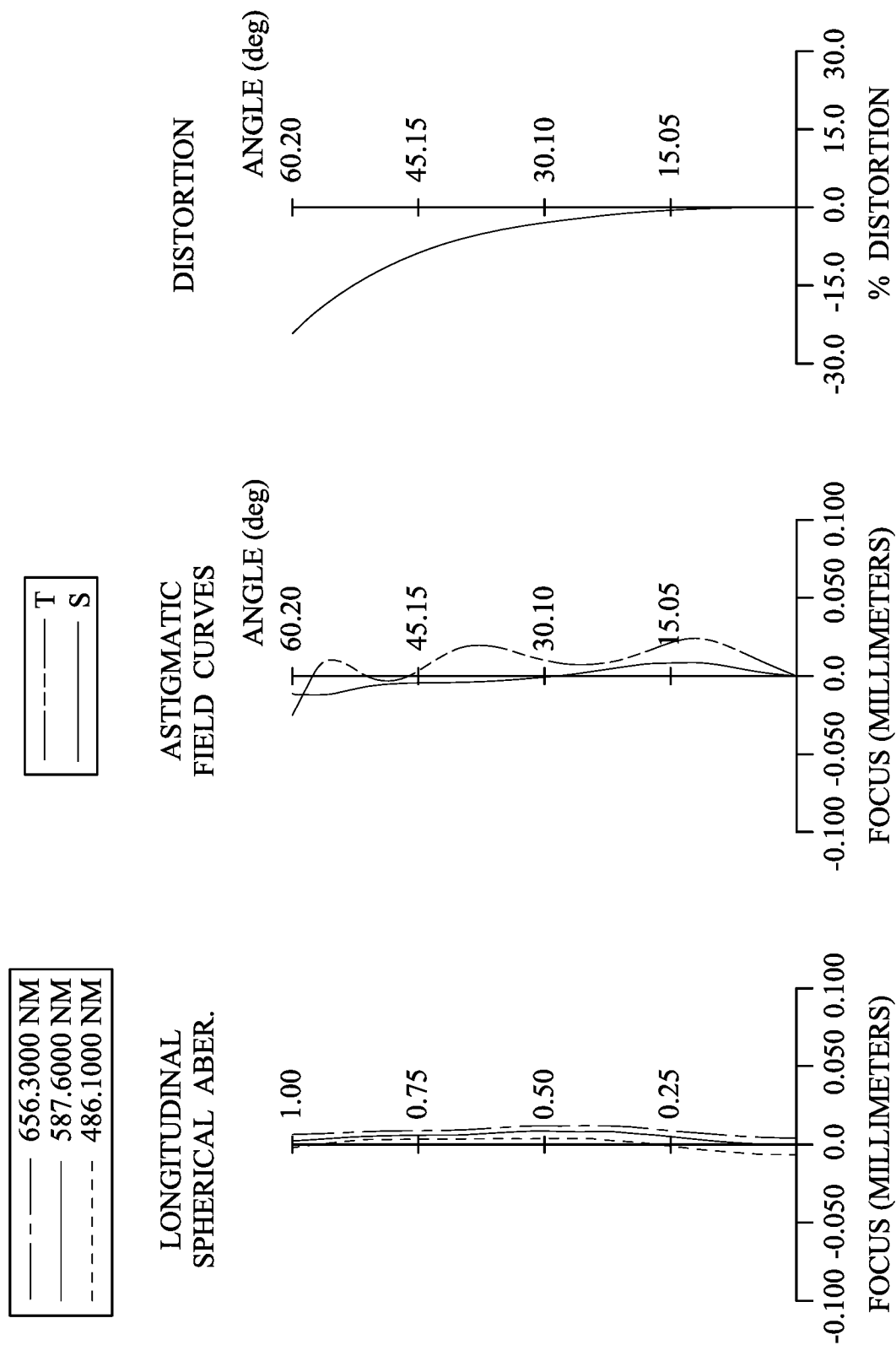
FIG. 16 shows spherical aberration curves, astigmatic field curves and a distortion curve of the image capturing apparatus according to the 8th embodiment.

FIG. 15 is a schematic view of an image capturing apparatus according to the 8th embodiment of the present disclosure. FIG. 16 shows, in order from left to right, spherical aberration curves, astigmatic field curves and a distortion curve of the image capturing apparatus according to the 8th embodiment. In FIG. 15, the image capturing apparatus includes the optical imaging module (its reference numeral is omitted), a driving unit (not shown herein) and an image sensor 890, wherein the driving unit is for driving the optical imaging module. The optical imaging module includes, in order from an object side to an image side, a first lens element 810, a stop 801, a second lens element 820, an aperture stop 800, a third lens element 830, a fourth lens element 840, a fifth lens element 850, a sixth lens element 860, an IR-cut filter 870 and an image surface 880. The image sensor 890 is disposed on the image surface 880 of the optical imaging module. The optical imaging module includes six lens elements (810, 820, 830, 840, 850 and 860) without additional one or more lens elements inserted between the first lens element 810 and the sixth lens element 860.

The first lens element 810 with negative refractive power has an object-side surface 811 being concave and an image-side surface 812 being concave. The first lens element 810 is made of a plastic material, and has the object-side surface 811 and the image-side surface 812 being both aspheric.

The second lens element 820 with positive refractive power has an object-side surface 821 being convex and an image-side surface 822 being concave. The second lens element 820 is made of a plastic material, and has the object-side surface 821 and the image-side surface 822 being both aspheric.

The third lens element 830 with positive refractive power has an object-side surface 831 being convex and an image-side surface 832 being convex. The third lens element 830 is made of a plastic material, and has the object-side surface 831 and the image-side surface 832 being both aspheric.

The fourth lens element 840 with positive refractive power has an object-side surface 841 being convex and an image-side surface 842 being convex. The fourth lens element 840 is made of a plastic material, and has the object-side surface 841 and the image-side surface 842 being both aspheric.

The fifth lens element 850 with negative refractive power has an object-side surface 851 being concave and an image-side surface 852 being convex. The fifth lens element 850 is made of a plastic material, and has the object-side surface 851 and the image-side surface 852 being both aspheric.

The sixth lens element 860 with positive refractive power has an object-side surface 861 being convex and an image-side surface 862 being concave. The sixth lens element 860 is made of a plastic material, and has the object-side surface 861 and the image-side surface 862 being both aspheric.

The IR-cut filter 870 is made of a glass material and located between the sixth lens element 860 and the image surface 880, and will not affect the focal length of the optical imaging module.

The detailed optical data of the 8th embodiment are shown in TABLE 15 and the aspheric surface data are shown in TABLE 16 below.

TABLE 15

8th Embodiment
f = 1.74 mm, Fno = 2.40, HFOV = 60.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −200.000 | ASP | 0.263 | Plastic | 1.545 | 56.1 | −1.92 |
| 2 | | 1.052 | ASP | 0.468 | | | | |
| 3 | Stop | Plano | | −0.105 | | | | |
| 4 | Lens 2 | 0.990 | ASP | 0.327 | Plastic | 1.584 | 28.2 | 4.38 |
| 5 | | 1.419 | ASP | 0.248 | | | | |
| 6 | Ape. Stop | Plano | | −0.008 | | | | |
| 7 | Lens 3 | 4.522 | ASP | 0.470 | Plastic | 1.545 | 56.1 | 2.27 |
| 8 | | −1.640 | ASP | 0.154 | | | | |
| 9 | Lens 4 | 5.111 | ASP | 0.592 | Plastic | 1.545 | 56.1 | 1.70 |
| 10 | | −1.084 | ASP | 0.107 | | | | |
| 11 | Lens 5 | −0.523 | ASP | 0.271 | Plastic | 1.660 | 20.4 | −2.12 |
| 12 | | −1.007 | ASP | 0.269 | | | | |
| 13 | Lens 6 | 1.264 | ASP | 0.824 | Plastic | 1.544 | 56.0 | 8.64 |
| 14 | | 1.331 | ASP | 0.500 | | | | |
| 15 | IR-cut filter | Plano | | 0.110 | Glass | 1.517 | 64.2 | — |
| 16 | | Plano | | 0.290 | | | | |
| 17 | Image | Plano | | — | | | | |

Reference wavelength is 587.6 nm (d-line).
Effective radius of Surface 3 (Stop) is 0.750 mm.

TABLE 16

Aspheric Coefficients

| Surface # | 1 | 2 | 4 | 5 | 7 | 8 |
|---|---|---|---|---|---|---|
| k= | −4.5000E+01 | 8.5974E−02 | −1.2632E+00 | −2.5223E+01 | −4.6718E+01 | 7.0345E−03 |
| A4= | 1.2786E−01 | −7.6534E−02 | −1.5712E+00 | 1.2321E+00 | −1.3727E−02 | −6.5908E−01 |
| A6= | −6.9746E−02 | −3.7181E−01 | −2.4560E−01 | −6.1114E+00 | 1.7191E−01 | 6.7266E−01 |
| A8= | 5.6253E−02 | 2.1214E+00 | 5.7991E−01 | 3.3964E+01 | −2.2111E+00 | −1.6860E+00 |
| A10= | −3.0947E−02 | −5.3550E+00 | 8.8239E−01 | −1.0067E+02 | 7.7604E+00 | 5.7576E−01 |
| A12= | 1.0877E−02 | 7.2050E+00 | −2.3102E+00 | 1.4953E+02 | −7.6453E+00 | 5.9802E−01 |
| A14= | −1.7500E−03 | −3.9000E+00 | | | | |

| Surface # | 9 | 10 | 11 | 12 | 13 | 14 |
|---|---|---|---|---|---|---|
| k= | −2.5818E+01 | −1.0458E+00 | −1.2922E+00 | −7.9927E+00 | −2.7647E+00 | −6.7508E−01 |
| A4= | −5.1080E−01 | 2.3786E−01 | 1.5412E+00 | −1.1497E−01 | −3.4006E−01 | −2.6766E−01 |
| A6= | −7.9304E−03 | −1.1160E+00 | −4.2827E+00 | 1.1913E+00 | 3.6701E−01 | 1.4929E−01 |
| A8= | 1.7879E+00 | 4.1145E+00 | 1.1120E+01 | −2.6942E+00 | −3.1573E−01 | −7.8417E−02 |
| A10= | −6.1541E+00 | −1.3464E+01 | −2.5472E+01 | 2.8710E+00 | 1.7068E−01 | 2.7235E−02 |
| A12= | 7.8265E+00 | 1.8282E+01 | 3.0068E+01 | −1.5945E+00 | −5.2156E−02 | −6.0454E−03 |
| A14= | −4.4620E+00 | −8.4487E+00 | −1.3076E+01 | 4.4821E−01 | 8.3338E−03 | 7.7582E−04 |
| A16= | | | | −5.1930E−02 | −5.4489E−04 | −4.3836E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from TABLE 15 and TABLE 16 as the following values and satisfy the following conditions:

| 8th Embodiment | |
|---|---|
| f (mm) | 1.74 |
| Fno | 2.40 |
| HFOV (deg.) | 60.2 |
| Nmax | 1.660 |
| V5/V6 | 0.36 |
| T12/T23 | 1.51 |
| T56/T23 | 1.12 |
| T56/CT6 | 0.33 |
| f/CT6 | 2.11 |
| CT1/CT6 | 0.32 |
| (T12 + T56)/(T23 + T34 + T45) | 1.26 |
| (R5 + R6)/(R5 − R6) | 0.47 |
| (|R11| + |R12|)/CT6 | 3.15 |
| |f1/f2| | 0.44 |
| |f/f1| + |f/f2| | 1.30 |
| (f/f3) − (f/f4) | −0.26 |
| f1/f5 | 0.90 |
| f4/f1 | −0.88 |
| Y11/Y62 | 0.66 |
| |Sag11/Sag21| | 1.50 |
| TL/f | 2.75 |
| tan(HFOV) | 1.75 |
| SD/TD | 0.69 |
| TL/ImgH | 2.08 |
| |DST1.0| (%) | 24.25 |
| |DST1.0/FOV| (%/deg.) | 0.20 |
| Yc62/f | 0.82 |

In addition, numbers of inflection points of the object-side surfaces and the image-side surfaces of the first lens element 810 (Lens 1), the fourth lens element 840 (Lens 4), the fifth lens element 850 (Lens 5), and the image-side surface 862 of the sixth lens element 860 (Lens 6) in the 8th embodiment are listed below, wherein each the number is calculated for the inflection points from an axial vertex to a maximum effective radius position on the corresponding surface.

| 8th Embodiment-Number of Inflection Points | | | | |
|---|---|---|---|---|
| | Lens 1 | Lens 4 | Lens 5 | Lens 6 |
| Object-side surface | 1 | 1 | 0 | |
| Image-side surface | 0 | 0 | 4 | 1 |

9th Embodiment

Figure 17:
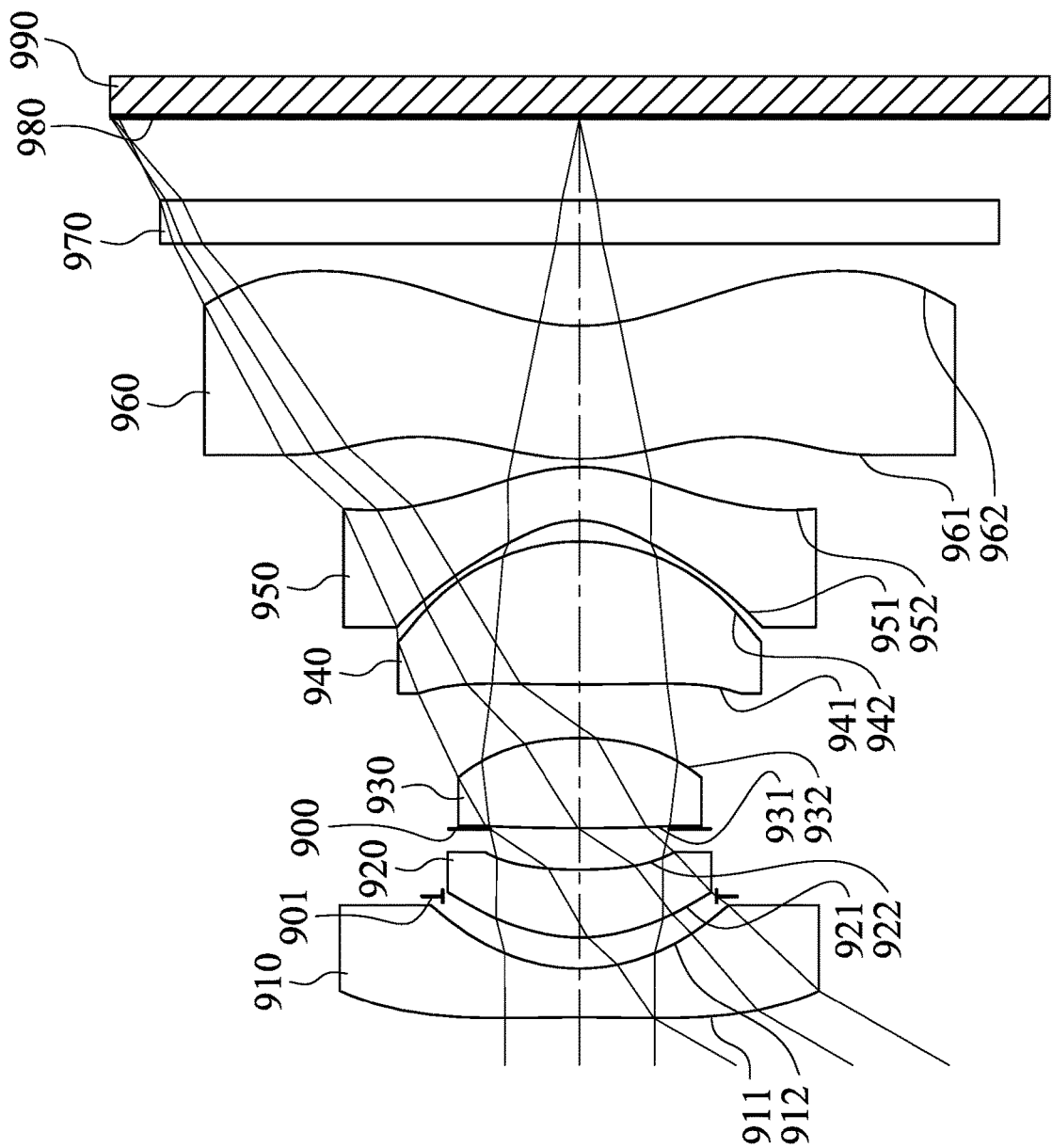
FIG. 17 is a schematic view of an image capturing apparatus according to the 9th embodiment of the present disclosure.
Figure 18:
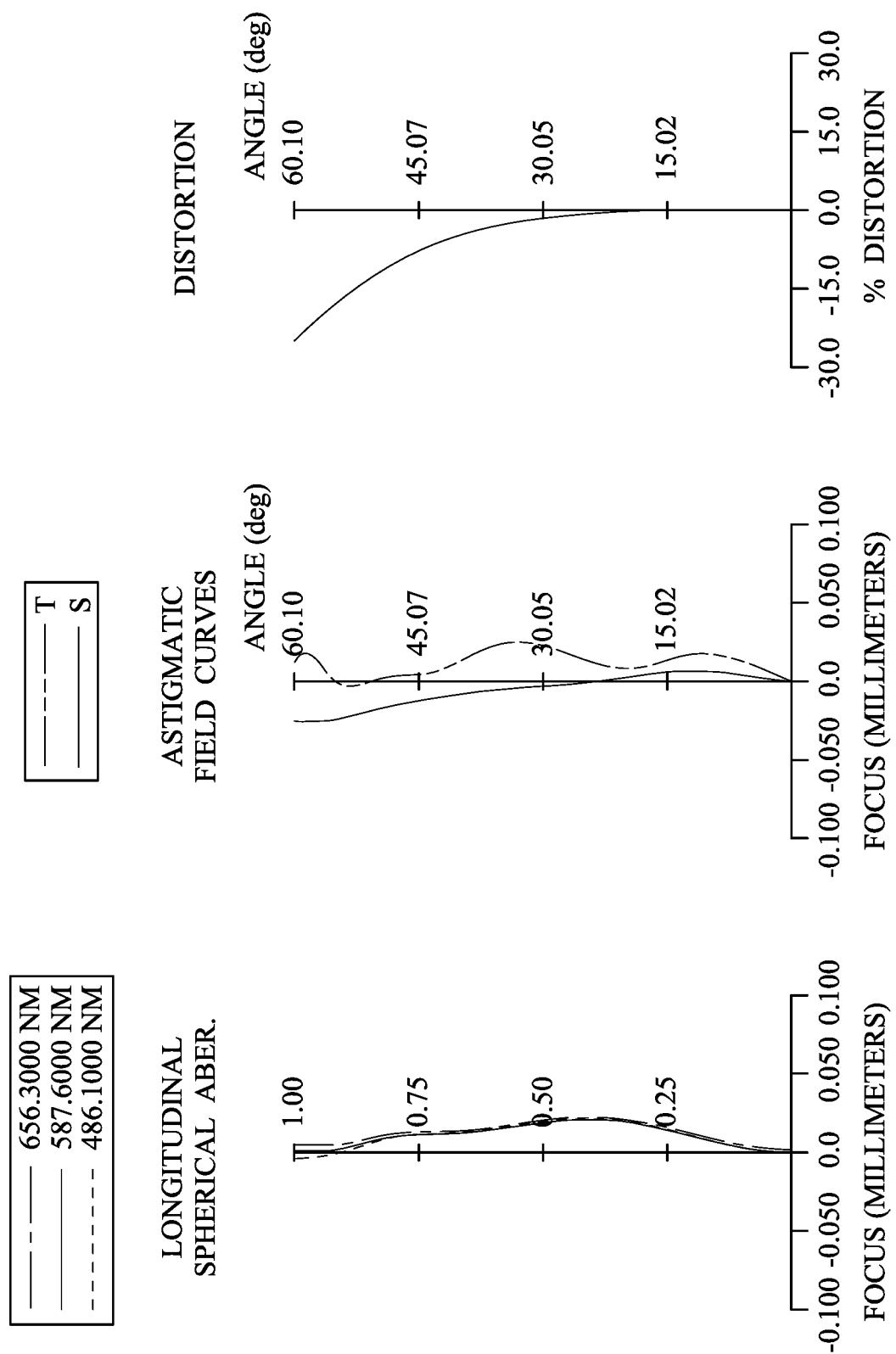
FIG. 18 shows spherical aberration curves, astigmatic field curves and a distortion curve of the image capturing apparatus according to the 9th embodiment.

FIG. 17 is a schematic view of an image capturing apparatus according to the 9th embodiment of the present disclosure. FIG. 18 shows, in order from left to right, spherical aberration curves, astigmatic field curves and a distortion curve of the image capturing apparatus according to the 9th embodiment. In FIG. 17, the image capturing apparatus includes the optical imaging module (its reference numeral is omitted), a driving unit (not shown herein) and an image sensor 990, wherein the driving unit is for driving the optical imaging module. The optical imaging module includes, in order from an object side to an image side, a first lens element 910, a stop 901, a second lens element 920, an aperture stop 900, a third lens element 930, a fourth lens element 940, a fifth lens element 950, a sixth lens element 960, an IR-cut filter 970 and an image surface 980. The image sensor 990 is disposed on the image surface 980 of the optical imaging module. The optical imaging module includes six lens elements (910, 920, 930, 940, 950 and 960) without additional one or more lens elements inserted between the first lens element 910 and the sixth lens element 960.

The first lens element 910 with negative refractive power has an object-side surface 911 being concave and an image-side surface 912 being concave. The first lens element 910 is made of a plastic material, and has the object-side surface 911 and the image-side surface 912 being both aspheric.

The second lens element 920 with positive refractive power has an object-side surface 921 being convex and an image-side surface 922 being concave. The second lens element 920 is made of a plastic material, and has the object-side surface 921 and the image-side surface 922 being both aspheric.

The third lens element 930 with positive refractive power has an object-side surface 931 being convex and an image-side surface 932 being convex. The third lens element 930 is made of a plastic material, and has the object-side surface 931 and the image-side surface 932 being both aspheric.

The fourth lens element 940 with positive refractive power has an object-side surface 941 being convex and an image-side surface 942 being convex. The fourth lens element 940 is made of a plastic material, and has the object-side surface 941 and the image-side surface 942 being both aspheric.

The fifth lens element 950 with negative refractive power has an object-side surface 951 being concave and an image-side surface 952 being convex. The fifth lens element 950 is made of a plastic material, and has the object-side surface 951 and the image-side surface 952 being both aspheric.

The sixth lens element 960 with positive refractive power has an object-side surface 961 being convex and an image-side surface 962 being concave. The sixth lens element 960 is made of a plastic material, and has the object-side surface 961 and the image-side surface 962 being both aspheric.

The IR-cut filter 970 is made of a glass material and located between the sixth lens element 960 and the image surface 980, and will not affect the focal length of the optical imaging module.

The detailed optical data of the 9th embodiment are shown in TABLE 17 and the aspheric surface data are shown in TABLE 18 below.

TABLE 17

9th Embodiment
f = 1.75 mm, Fno = 2.39, HFOV = 60.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −10.000 | ASP | 0.240 | Plastic | 1.545 | 56.1 | −1.46 |
| 2 | | 0.869 | ASP | 0.352 | | | | |
| 3 | Stop | Plano | | −0.200 | | | | |
| 4 | Lens 2 | 0.853 | ASP | 0.329 | Plastic | 1.545 | 56.1 | 2.38 |
| 5 | | 2.144 | ASP | 0.198 | | | | |
| 6 | Ape. Stop | Plano | | 0.005 | | | | |
| 7 | Lens 3 | 11.545 | ASP | 0.438 | Plastic | 1.545 | 56.1 | 2.07 |
| 8 | | −1.233 | ASP | 0.262 | | | | |
| 9 | Lens 4 | 11.826 | ASP | 0.696 | Plastic | 1.545 | 56.1 | 1.69 |
| 10 | | −0.979 | ASP | 0.102 | | | | |
| 11 | Lens 5 | −0.457 | ASP | 0.260 | Plastic | 1.660 | 20.4 | −2.10 |
| 12 | | −0.835 | ASP | 0.040 | | | | |
| 13 | Lens 6 | 1.055 | ASP | 0.649 | Plastic | 1.544 | 56.0 | 10.01 |
| 14 | | 1.026 | ASP | 0.400 | | | | |
| 15 | IR-cut filter | Plano | | 0.210 | Glass | 1.517 | 64.2 | — |
| 16 | | Plano | | 0.410 | | | | |
| 17 | Image | Plano | | — | | | | |

Reference wavelength is 587.6 nm (d-line).
Effective radius of Surface 3 (Stop) is 0.667 mm.

TABLE 18

Aspheric Coefficients

| Surface # | | | | | |
|---|---|---|---|---|---|
| 1 | 2 | 4 | 5 | 7 | 8 |

| | 1 | 2 | 4 | 5 | 7 | 8 |
|---|---|---|---|---|---|---|
| k= | −3.7478E+01 | −4.2167E−01 | −1.7971E+00 | −7.5623E−01 | −8.5974E+01 | −7.9980E−01 |
| A4= | 1.8218E−01 | −2.5322E−01 | −5.7320E−02 | 5.9214E−01 | −6.4831E−02 | −2.9708E−01 |
| A6= | −1.1001E−01 | 1.6432E−01 | −3.1174E−01 | −1.8592E+00 | 1.3406E+00 | −7.7662E−01 |
| A8= | 5.2519E−02 | 2.6390E+00 | 5.3019E−01 | 2.6821E+01 | −1.1298E+01 | 4.8078E+00 |
| A10= | −9.2259E−03 | −1.1826E+01 | −2.2225E+01 | −1.1670E+02 | 4.6227E+01 | −2.1727E+01 |
| A12= | −6.8320E−04 | 2.3382E+01 | 5.1345E+01 | 2.5687E+02 | −5.1638E+01 | 3.4132E+01 |
| A14= | | −1.8730E+01 | −5.3788E+01 | | | |

| | 9 | 10 | 11 | 12 | 13 | 14 |
|---|---|---|---|---|---|---|
| k= | −3.6563E+01 | −3.5850E−01 | −1.1858E+00 | −4.9460E+00 | −5.8244E+00 | −9.6355E−01 |
| A4= | −8.3329E−02 | −1.5105E−01 | 1.6467E+00 | −9.2507E−02 | −3.9541E−01 | −4.2964E−01 |
| A6= | −3.4374E−01 | 9.2879E−01 | −4.3701E+00 | 1.2301E+00 | 4.6946E−01 | 2.9910E−01 |
| A8= | 1.4534E+00 | −1.7864E+00 | 1.0363E+01 | −2.6507E+00 | −5.7846E−01 | −1.7614E−01 |
| A10= | −3.2782E+00 | 1.5955E−01 | −2.0117E+01 | 2.8608E+00 | 4.6871E−01 | 7.1940E−02 |
| A12= | 1.5903E+00 | 1.6368E+00 | 2.1519E+01 | −1.6218E+00 | −2.0508E−01 | −1.8771E−02 |
| A14= | 1.1673E+00 | −6.8443E−01 | −8.9499E+00 | 4.3948E−01 | 4.5193E−02 | 2.7587E−03 |
| A16= | | | | −4.0673E−02 | −3.9709E−03 | −1.7071E−04 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from TABLE 17 and TABLE 18 as the following values and satisfy the following conditions:

| 9th Embodiment | |
|---|---|
| f (mm) | 1.75 |
| Fno | 2.39 |
| HFOV (deg.) | 60.1 |
| Nmax | 1.660 |
| V5/V6 | 0.36 |
| T12/T23 | 0.75 |
| T56/T23 | 0.20 |
| T56/CT6 | 0.06 |
| f/CT6 | 2.69 |
| CT1/CT6 | 0.37 |
| (T12 + T56)/(T23 + T34 + T45) | 0.34 |
| (R5 + R6)/(R5 − R6) | 0.81 |
| (|R11| + |R12|)/CT6 | 3.21 |
| |f1/f2| | 0.61 |
| |f/f1| + |f/f2| | 1.93 |
| (f/f3) − (f/f4) | −0.19 |
| f1/f5 | 0.69 |
| f4/f1 | −1.16 |
| Y11/Y62 | 0.64 |
| |Sag11/Sag21| | 0.60 |
| TL/f | 2.52 |
| tan(HFOV) | 1.74 |
| SD/TD | 0.73 |
| TL/ImgH | 1.92 |
| |DST1.0| (%) | 24.89 |
| |DST1.0/FOV| (%/deg.) | 0.21 |
| Yc62/f | 0.72 |

In addition, numbers of inflection points of the object-side surfaces and the image-side surfaces of the first lens element 910 (Lens 1), the fourth lens element 940 (Lens 4), the fifth lens element 950 (Lens 5), and the image-side surface 962 of the sixth lens element 960 (Lens 6) in the 9th embodiment are listed below, wherein each the number is calculated for the inflection points from an axial vertex to a maximum effective radius position on the corresponding surface.

| 9th Embodiment-Number of Inflection Points | | | | |
|---|---|---|---|---|
| | Lens 1 | Lens 4 | Lens 5 | Lens 6 |
| Object-side surface | 1 | 2 | 0 | |
| Image-side surface | 1 | 1 | 1 | 1 |

10th Embodiment

Figure 19:
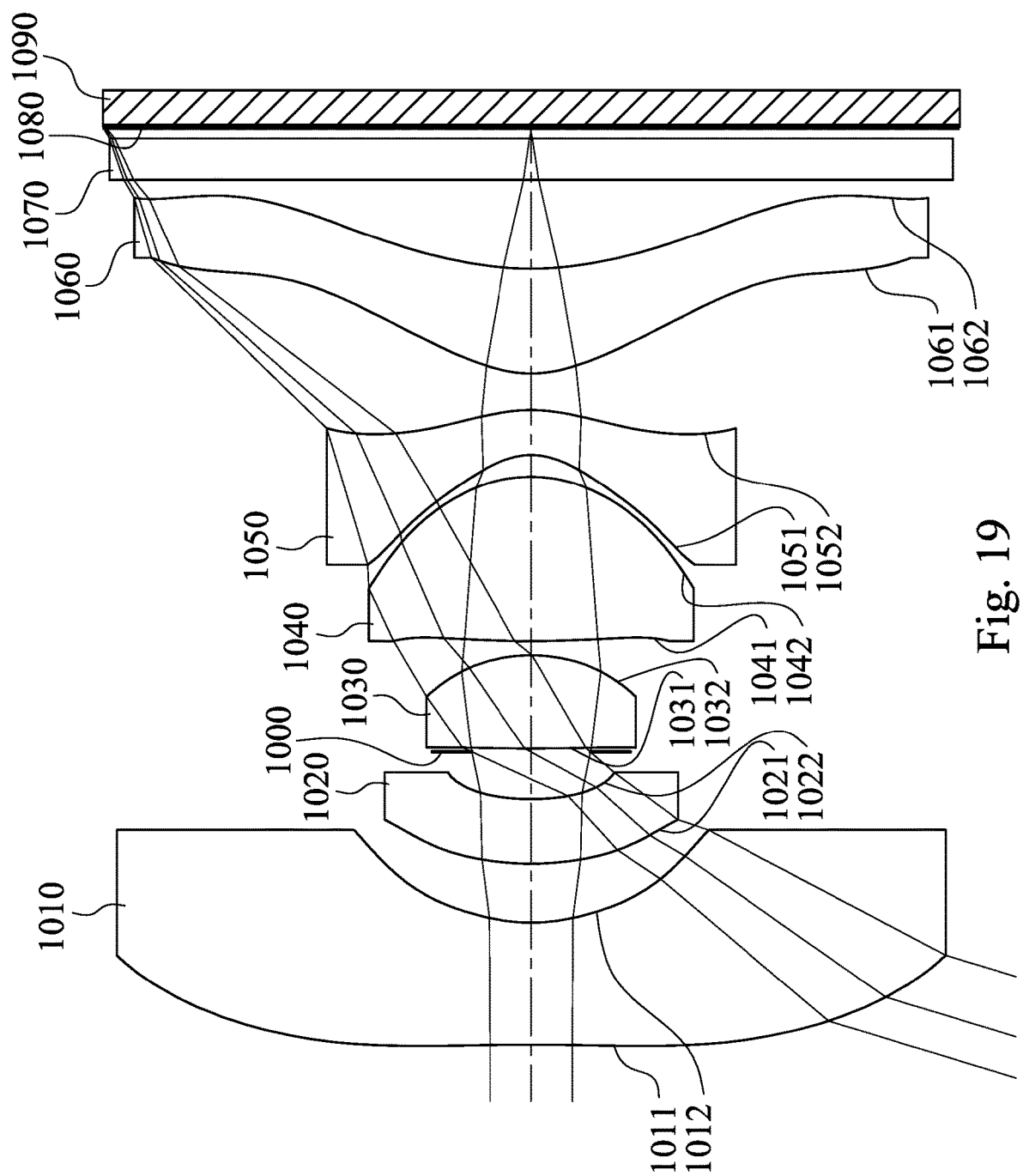
FIG. 19 is a schematic view of an image capturing apparatus according to the 10th embodiment of the present disclosure.
Figure 20:
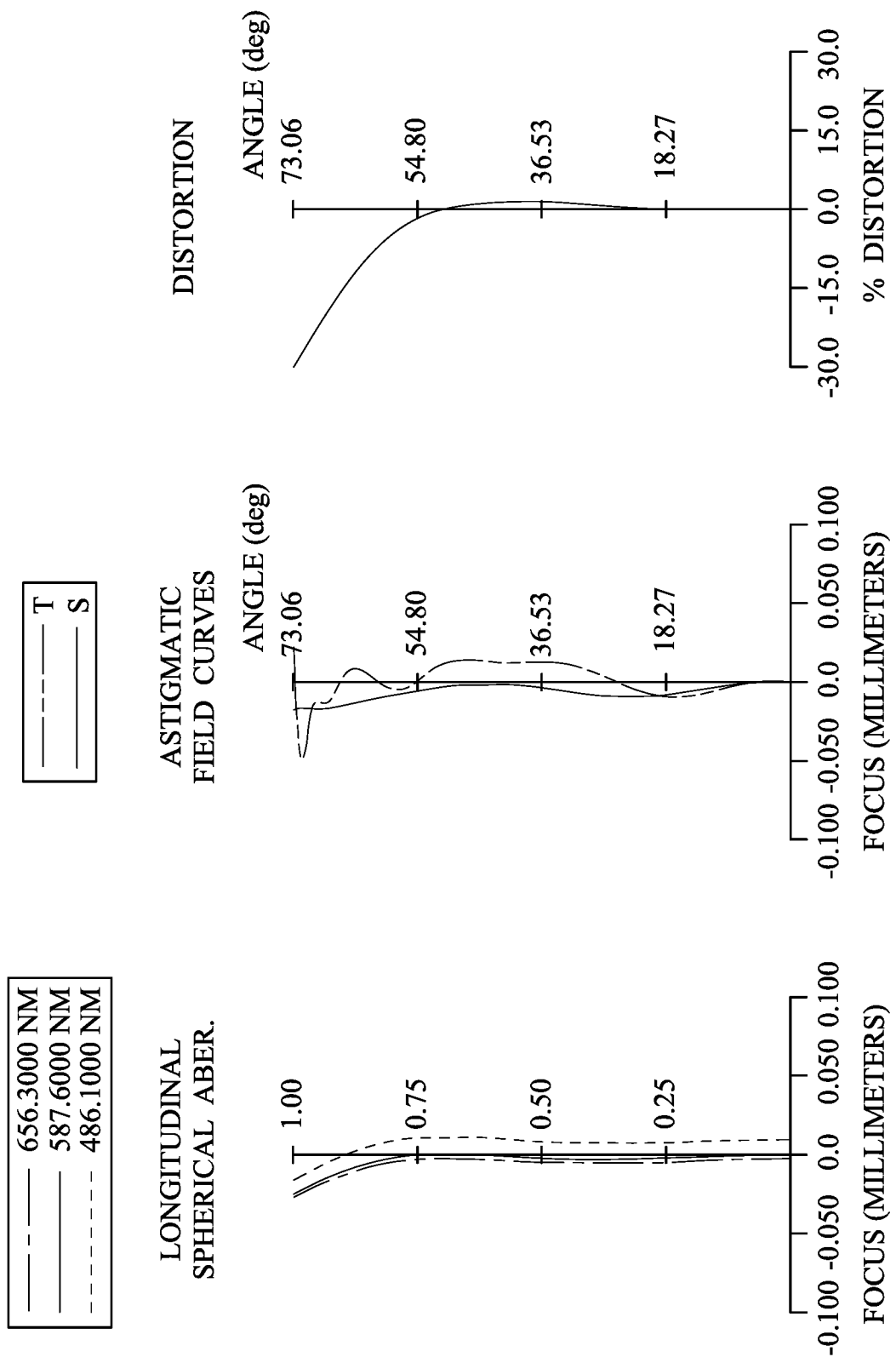
FIG. 20 shows spherical aberration curves, astigmatic field curves and a distortion curve of the image capturing apparatus according to the 10th embodiment.

FIG. 19 is a schematic view of an image capturing apparatus according to the 10th embodiment of the present disclosure. FIG. 20 shows, in order from left to right, spherical aberration curves, astigmatic field curves and a distortion curve of the image capturing apparatus according to the 10th embodiment. In FIG. 19, the image capturing apparatus includes the optical imaging module (its reference numeral is omitted), a driving unit (not shown herein) and an image sensor 1090, wherein the driving unit is for driving the optical imaging module. The optical imaging module includes, in order from an object side to an image side, a first lens element 1010, a second lens element 1020, an aperture stop 1000, a third lens element 1030, a fourth lens element 1040, a fifth lens element 1050, a sixth lens element 1060, an IR-cut filter 1070 and an image surface 1080. The image sensor 1090 is disposed on the image surface 1080 of the optical imaging module. The optical imaging module includes six lens elements (1010, 1020, 1030, 1040, 1050 and 1060) without additional one or To more lens elements inserted between the first lens element 1010 and the sixth lens element 1060.

The first lens element 1010 with negative refractive power has an object-side surface 1011 being concave and an image-side surface 1012 being concave. The first lens element 1010 is made of a plastic material, and has the object-side surface 1011 and the image-side surface 1012 being both aspheric.

The second lens element 1020 with negative refractive power has an object-side surface 1021 being convex and an image-side surface 1022 being concave. The second lens element 1020 is made of a plastic material, and has the object-side surface 1021 and the image-side surface 1022 being both aspheric.

The third lens element 1030 with positive refractive power has an object-side surface 1031 being convex and an image-side surface 1032 being convex. The third lens element 1030 is made of a plastic material, and has the object-side surface 1031 and the image-side surface 1032 being both aspheric.

The fourth lens element 1040 with positive refractive power has an object-side surface 1041 being convex and an image-side surface 1042 being convex. The fourth lens element 1040 is made of a plastic material, and has the object-side surface 1041 and the image-side surface 1042 being both aspheric.

The fifth lens element 1050 with negative refractive power has an object-side surface 1051 being concave and an image-side surface 1052 being convex. The fifth lens element 1050 is made of a plastic material, and has the object-side surface 1051 and the image-side surface 1052 being both aspheric.

The sixth lens element 1060 with positive refractive power has an object-side surface 1061 being convex and an image-side surface 1062 being concave. The sixth lens element 1060 is made of a plastic material, and has the object-side surface 1061 and the image-side surface 1062 being both aspheric.

The IR-cut filter 1070 is made of a glass material and located between the sixth lens element 1060 and the image surface 1080, and will not affect the focal length of the optical imaging module.

The detailed optical data of the 10th embodiment are shown in TABLE 19 and the aspheric surface data are shown in TABLE 20 below.

TABLE 19

10th Embodiment
f = 0.94 mm, Fno = 2.25, HFOV = 73.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −12.139 | ASP | 0.619 | Plastic | 1.559 | 40.4 | −1.55 |
| 2 | | 0.950 | ASP | 0.298 | | | | |
| 3 | Lens 2 | 1.449 | ASP | 0.326 | Plastic | 1.545 | 56.1 | −65.47 |
| 4 | | 1.282 | ASP | 0.238 | | | | |
| 5 | Ape. Stop | Plano | | 0.017 | | | | |
| 6 | Lens 3 | 10.526 | ASP | 0.474 | Plastic | 1.545 | 56.1 | 1.50 |
| 7 | | −0.871 | ASP | 0.071 | | | | |
| 8 | Lens 4 | 3.639 | ASP | 0.832 | Plastic | 1.545 | 56.1 | 1.24 |
| 9 | | −0.763 | ASP | 0.111 | | | | |
| 10 | Lens 5 | −0.345 | ASP | 0.227 | Plastic | 1.671 | 19.5 | −1.06 |
| 11 | | −0.843 | ASP | 0.185 | | | | |
| 12 | Lens 6 | 0.636 | ASP | 0.529 | Plastic | 1.544 | 56.0 | 1.60 |
| 13 | | 1.669 | ASP | 0.450 | | | | |
| 14 | IR-cut filter | Plano | | 0.210 | Glass | 1.517 | 64.2 | — |
| 15 | | Plano | | 0.059 | | | | |
| 16 | Image | Plano | | — | | | | |

Reference wavelength is 587.6 nm (d-line).

TABLE 20

Aspheric Coefficients

| | Surface # | | | | | |
|---|---|---|---|---|---|---|
| | 1 | 2 | 3 | 4 | 6 | 7 |
| k= | −5.6920E+01 | −2.8496E−01 | −2.0337E+00 | 7.9209E+00 | 8.1025E+01 | −4.5452E−03 |
| A4= | 6.8937E−02 | −5.6290E−01 | −3.7030E−01 | 5.0745E−01 | −1.3215E−01 | −8.7810E−01 |
| A6= | −2.0597E−02 | 1.5792E+00 | 4.1770E+00 | 2.7334E+00 | 1.5160E−01 | 6.3977E+00 |
| A8= | 3.3124E−03 | −2.1857E+00 | −1.1970E+01 | −1.8551E+01 | 3.5915E+00 | −4.0467E+01 |
| A10= | 1.7549E−04 | 2.6673E+00 | 1.8069E+01 | 6.7127E+00 | 7.1040E+00 | 1.2410E+02 |
| A12= | −1.2882E−04 | −2.6262E+00 | −1.6656E+01 | 1.8411E+02 | −9.3060E+01 | −1.3768E+02 |
| A14= | 1.3069E−05 | 9.6681E−01 | 7.0898E+00 | | | |

| | Surface # | | | | | |
|---|---|---|---|---|---|---|
| | 8 | 9 | 10 | 11 | 12 | 13 |
| k= | −1.1751E+01 | −4.0435E−01 | −1.2174E+00 | −7.3215E+00 | −2.4736E+00 | −7.6509E−01 |
| A4= | −6.1606E−01 | −1.0406E+00 | 1.9018E+00 | −1.2981E−02 | −2.6944E−01 | −1.3305E−01 |
| A6= | 3.8951E+00 | 8.4722E+00 | −1.9498E+00 | 2.0743E+00 | 3.9944E−01 | 1.5033E−01 |
| A8= | −1.5589E+01 | −3.0645E+01 | −6.7029E+00 | −6.3540E+00 | −3.7406E−01 | −1.3901E−01 |
| A10= | 3.3851E+01 | 5.7445E+01 | 1.5340E+01 | 9.6606E+00 | 1.8981E−01 | 6.6716E−02 |
| A12= | −4.2445E+01 | −5.5138E+01 | −8.3924E+00 | −8.2455E+00 | −5.2869E−02 | −1.7740E−02 |
| A14= | 2.3242E+01 | 2.1906E+01 | −2.6443E−03 | 3.8138E+00 | 7.7121E−03 | 2.5046E−03 |
| A16= | | | | −7.5050E−01 | −4.6265E−04 | −1.4587E−04 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again. It is noted that the image-side surface 1062 of the sixth lens element 1060 includes two critical points in an off-axial region thereof, thereby two values of parameter Yc62/f from left to right in the following table respectively refer to the corresponding values from an optical axis to a maximum effective radius position.

Moreover, these parameters can be calculated from TABLE 19 and TABLE 20 as the following values and satisfy the following conditions:

| 10th Embodiment | |
|---|---|
| f (mm) | 0.94 |
| Fno | 2.25 |
| HFOV (deg.) | 73.1 |
| Nmax | 1.671 |
| V5/V6 | 0.35 |
| T12/T23 | 1.17 |
| T56/T23 | 0.73 |
| T56/CT6 | 0.35 |
| f/CT6 | 1.78 |
| CT1/CT6 | 1.17 |
| (T12 + T56)/(T23 + T34 + T45) | 1.11 |
| (R5 + R6)/(R5 − R6) | 0.85 |
| (|R11| + |R12|)/CT6 | 4.36 |
| |f1/f2| | 0.02 |
| |f/f1| + |f/f2| | 0.62 |
| (f/f3) − (f/f4) | −0.13 |

-continued

| 10th Embodiment | | |
| --- | --- | --- |
| f1/f5 | | 1.46 |
| f4/f1 | | −0.80 |
| Y11/Y62 | | 1.04 |
| |Sag11/Sag21| | | 2.04 |
| TL/f | | 4.95 |
| tan(HFOV) | | 3.28 |
| SD/TD | | 0.62 |
| TL/ImgH | | 2.15 |
| |DST1.0| (%) | | 30.02 |
| |DST1.0/FOV| (%/deg.) | | 0.21 |
| Yc62/f | 1.71 | 2.05 |

In addition, numbers of inflection points of the object-side surfaces and the image-side surfaces of the first lens element 1010 (Lens 1), the fourth lens element 1040 (Lens 4), the fifth lens element 1050 (Lens 5), and the image-side surface 1062 of the sixth lens element 1060 (Lens 6) in the 10th embodiment are listed below, wherein each the number is calculated for the inflection points from an axial vertex to the maximum effective radius position on the corresponding surface.

| 10th Embodiment-Number of Inflection Points | | | | |
| --- | --- | --- | --- | --- |
| | Lens 1 | Lens 4 | Lens 5 | Lens 6 |
| Object-side surface | 1 | 1 | 1 | |
| Image-side surface | 1 | 1 | 1 | 2 |

11th Embodiment

Figure 21:
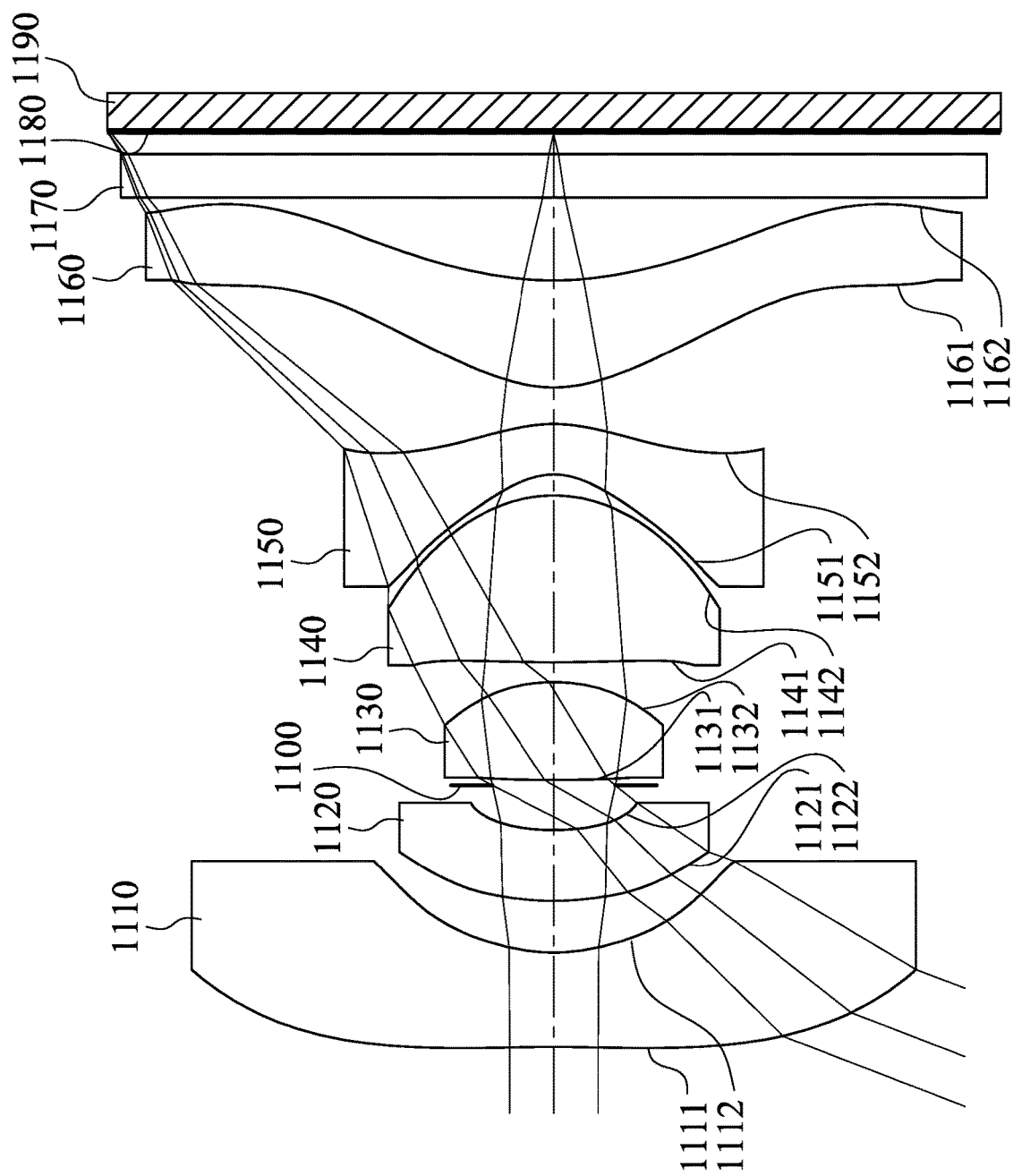
FIG. 21 is a schematic view of an image capturing apparatus according to the 11th embodiment of the present disclosure.
Figure 22:
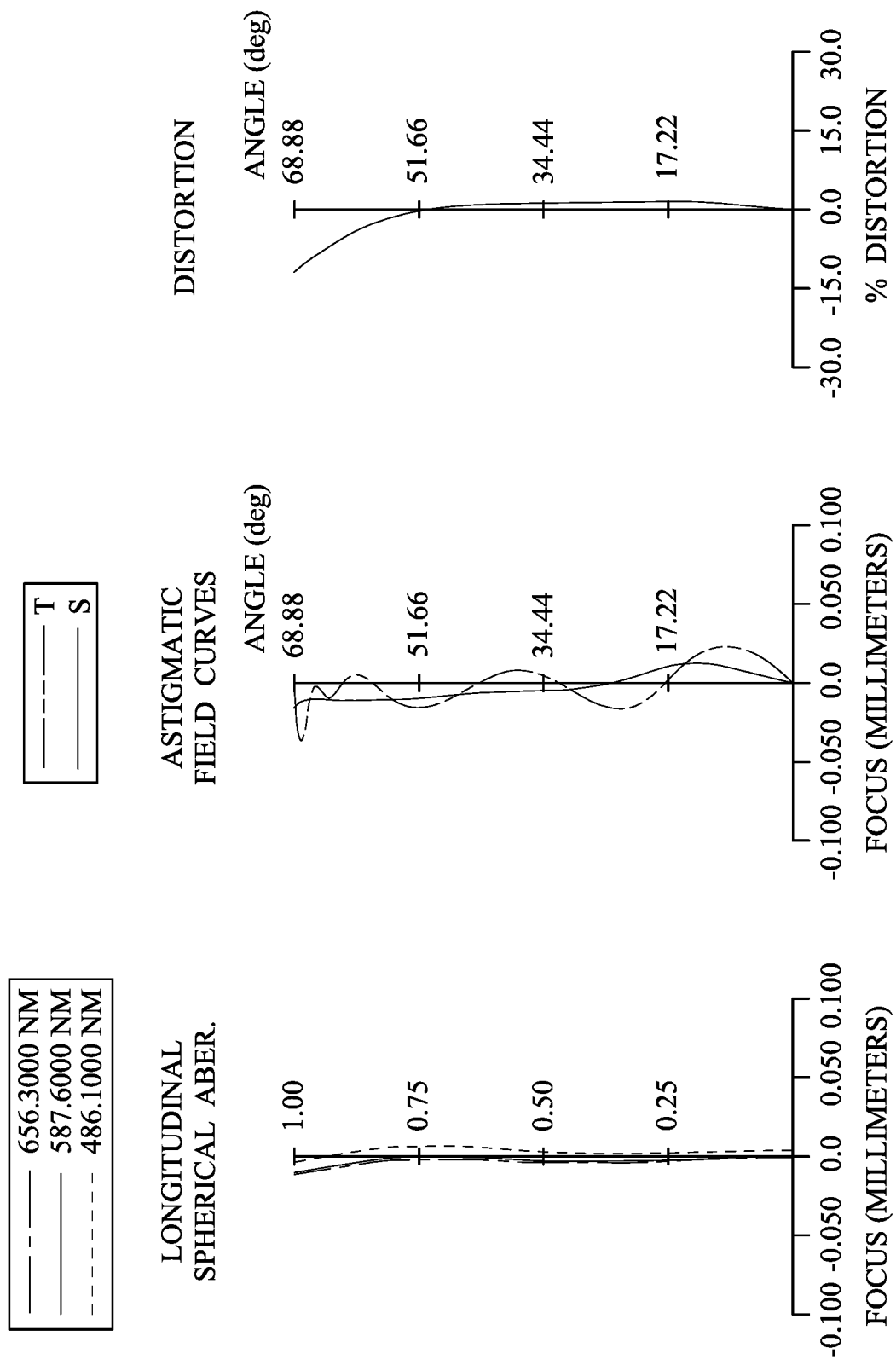
FIG. 22 shows spherical aberration curves, astigmatic field curves and a distortion curve of the image capturing apparatus according to the 11th embodiment.

FIG. 21 is a schematic view of an image capturing apparatus according to the 11th embodiment of the present disclosure. FIG. 22 shows, in order from left to right, spherical aberration curves, astigmatic field curves and a distortion curve of the image capturing apparatus according to the 11th embodiment. In FIG. 21, the image capturing apparatus includes the optical imaging module (its reference numeral is omitted), a driving unit (not shown herein) and an image sensor 1190, wherein the driving unit is for driving the optical imaging module. The optical imaging module includes, in order from an object side to an image side, a first lens element 1110, a second lens element 1120, an aperture stop 1100, a third lens element 1130, a fourth lens element 1140, a fifth lens element 1150, a sixth lens element 1160, an IR-cut filter 1170 and an image surface 1180. The image sensor 1190 is disposed on the image surface 1180 of the optical imaging module. The optical imaging module includes six lens elements (1110, 1120, 1130, 1140, 1150 and 1160) without additional one or more lens elements inserted between the first lens element 1110 and the sixth lens element 1160.

The first lens element 1110 with negative refractive power has an object-side surface 1111 being concave and an image-side surface 1112 being concave. The first lens element 1110 is made of a plastic material, and has the object-side surface 1111 and the image-side surface 1112 being both aspheric.

The second lens element 1120 with negative refractive power has an object-side surface 1121 being convex and an image-side surface 1122 being concave. The second lens element 1120 is made of a plastic material, and has the object-side surface 1121 and the image-side surface 1122 being both aspheric.

The third lens element 1130 with positive refractive power has an object-side surface 1131 being convex and an image-side surface 1132 being convex. The third lens element 1130 is made of a plastic material, and has the object-side surface 1131 and the image-side surface 1132 being both aspheric.

The fourth lens element 1140 with positive refractive power has an object-side surface 1141 being convex and an image-side surface 1142 being convex. The fourth lens element 1140 is made of a plastic material, and has the object-side surface 1141 and the image-side surface 1142 being both aspheric.

The fifth lens element 1150 with negative refractive power has an object-side surface 1151 being concave and an image-side surface 1152 being convex. The fifth lens element 1150 is made of a plastic material, and has the object-side surface 1151 and the image-side surface 1152 being both aspheric.

The sixth lens element 1160 with positive refractive power has an object-side surface 1161 being convex and an image-side surface 1162 being concave. The sixth lens element 1160 is made of a plastic material, and has the object-side surface 1161 and the image-side surface 1162 being both aspheric.

The IR-cut filter 1170 is made of a glass material and located between the sixth lens element 1160 and the image surface 1180, and will not affect the focal length of the optical imaging module.

The detailed optical data of the 11th embodiment are shown in TABLE 21 and the aspheric surface data are shown in TABLE 22 below.

TABLE 21

11th Embodiment
f = 0.95 mm, Fno = 2.20, HFOV = 68.9 deg.

| Surface # | | Curvature Radius | | Thickness | Material | Index | Abbe # | Focal Length |
| --- | --- | --- | --- | --- | --- | --- | --- | --- |
| 0 | Object | Plano | | Infinity | | | | |
| 1 | Lens 1 | −10.906 | ASP | 0.457 | Plastic | 1.545 | 56.1 | −1.59 |
| 2 | | 0.954 | ASP | 0.249 | | | | |
| 3 | Lens 2 | 1.447 | ASP | 0.346 | Plastic | 1.545 | 56.1 | −27.03 |
| 4 | | 1.207 | ASP | 0.216 | | | | |
| 5 | Ape. Stop | Plano | | 0.025 | | | | |
| 6 | Lens 3 | 6.675 | ASP | 0.474 | Plastic | 1.545 | 56.1 | 1.41 |
| 7 | | −0.848 | ASP | 0.095 | | | | |
| 8 | Lens 4 | 4.662 | ASP | 0.809 | Plastic | 1.545 | 56.1 | 1.25 |
| 9 | | −0.749 | ASP | 0.102 | | | | |
| 10 | Lens 5 | −0.343 | ASP | 0.244 | Plastic | 1.671 | 19.5 | −1.24 |

TABLE 21-continued

11th Embodiment
f = 0.95 mm, Fno = 2.20, HFOV = 68.9 deg.

| Surface # | | Curvature Radius | Thickness | Material | Index | Abbe # | Focal Length |
|---|---|---|---|---|---|---|---|
| 11 | | −0.751 ASP | 0.177 | | | | |
| 12 | Lens 6 | 0.694 ASP | 0.520 | Plastic | 1.544 | 56.0 | 1.84 |
| 13 | | 1.662 ASP | 0.400 | | | | |
| 14 | IR-cut filter | Plano | 0.210 | Glass | 1.517 | 64.2 | — |
| 15 | | Plano | 0.110 | | | | |
| 16 | Image | Plano | — | | | | |

Reference wavelength is 587.6 nm (d-line).

TABLE 22

Aspheric Coefficients

| Surface # | | | | | | |
|---|---|---|---|---|---|---|
| | 1 | 2 | 3 | 4 | 6 | 7 |
| k= | −5.3431E+01 | −3.0362E−01 | −1.3136E+00 | 7.7133E+00 | 8.1025E+01 | −9.2160E−02 |
| A4= | 1.0930E−01 | −4.2721E−01 | −1.5101E−01 | 3.8233E−01 | −7.8830E−02 | −8.4904E−01 |
| A6= | −5.4883E−02 | 1.4849E+00 | 1.6536E+00 | 4.7086E+01 | −8.7699E−01 | 5.4337E+00 |
| A8= | 2.4421E−02 | −3.6832E+00 | −1.0047E+00 | −3.0982E+01 | 2.6191E+01 | −3.1347E+01 |
| A10= | −6.8039E−03 | 8.5855E+00 | −6.9860E+00 | 2.0618E+01 | −1.6512E+02 | 9.1030E+01 |
| A12= | 1.0872E−03 | −1.0841E+01 | 1.4281E+01 | 3.5268E+02 | 3.7563E+02 | −9.0639E+01 |
| A14= | −7.0365E−05 | 4.7424E+00 | −8.7094E+00 | | | |

| Surface # | | | | | | |
|---|---|---|---|---|---|---|
| | 8 | 9 | 10 | 11 | 12 | 13 |
| k= | −2.9041E+01 | −4.1111E−01 | −1.2191E+00 | −7.3429E+00 | −2.4310E+00 | −7.6738E−01 |
| A4= | −6.7153E−01 | −1.2588E+00 | 2.0013E+00 | 2.3089E−02 | −2.3709E−01 | −1.5013E−01 |
| A6= | 3.7145E+00 | 9.9355E+00 | −3.1707E+00 | 1.5153E+00 | 3.4731E−01 | 2.1097E−01 |
| A8= | −1.2988E+01 | −3.5583E+01 | −4.5862E−01 | −4.5265E+00 | −3.3442E−01 | −2.1551E−01 |
| A10= | 2.5230E+01 | 6.7426E+01 | 1.4780E−01 | 6.5739E+00 | 1.7427E−01 | 1.1242E−01 |
| A12= | −3.0349E+01 | −6.6232E+01 | 8.9315E+00 | −5.2636E+00 | −5.0291E−02 | −3.1876E−02 |
| A14= | 1.6561E+01 | 2.7051E+01 | −7.5406E+00 | 2.2763E+00 | 7.7009E−03 | 4.6911E−03 |
| A16= | | | | −4.2614E−01 | −4.9090E−04 | −2.7989E−04 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from TABLE 21 and TABLE 22 as the following values and satisfy the following conditions:

| 11th Embodiment | |
|---|---|
| f (mm) | 0.95 |
| Fno | 2.20 |
| HFOV (deg.) | 68.9 |
| Nmax | 1.671 |
| V5/V6 | 0.35 |
| T12/T23 | 1.03 |
| T56/T23 | 0.73 |
| T56/CT6 | 0.34 |
| f/CT6 | 1.82 |
| CT1/CT6 | 0.88 |
| (T12 + T56)/(T23 + T34 + T45) | 0.97 |
| (R5 + R6)/(R5 − R6) | 0.77 |
| (|R11| + |R12|)/CT6 | 4.53 |
| |f1/f2| | 0.06 |
| |f/f1| + |f/f2| | 0.63 |
| (f/f3) − (f/f4) | −0.09 |
| f1/f5 | 1.28 |
| f4/f1 | −0.79 |
| Y11/Y62 | 0.89 |
| |Sag11/Sag21| | 1.57 |
| TL/f | 4.69 |
| tan(HFOV) | 2.59 |
| SD/TD | 0.66 |
| TL/ImgH | 2.05 |
| |DST1.0| (%) | 11.88 |
| |DST1.0/FOV| (%/deg.) | 0.09 |
| Yc62/f | 1.69 |

In addition, numbers of inflection points of the object-side surfaces and the image-side surfaces of the first lens element 1110 (Lens 1), the fourth lens element 1140 (Lens 4), the fifth lens element 1150 (Lens 5), and the image-side surface 1162 of the sixth lens element 1160 (Lens 6) in the 11th embodiment are listed below, wherein each the number is calculated for the inflection points from an axial vertex to a maximum effective radius position on the corresponding surface.

| 11th Embodiment-Number of Inflection Points | | | | |
| --- | --- | --- | --- | --- |
| | Lens 1 | Lens 4 | Lens 5 | Lens 6 |
| Object-side surface | 1 | 1 | 1 | |
| Image-side surface | 1 | 1 | 1 | 2 |

12th Embodiment

Figure 23:
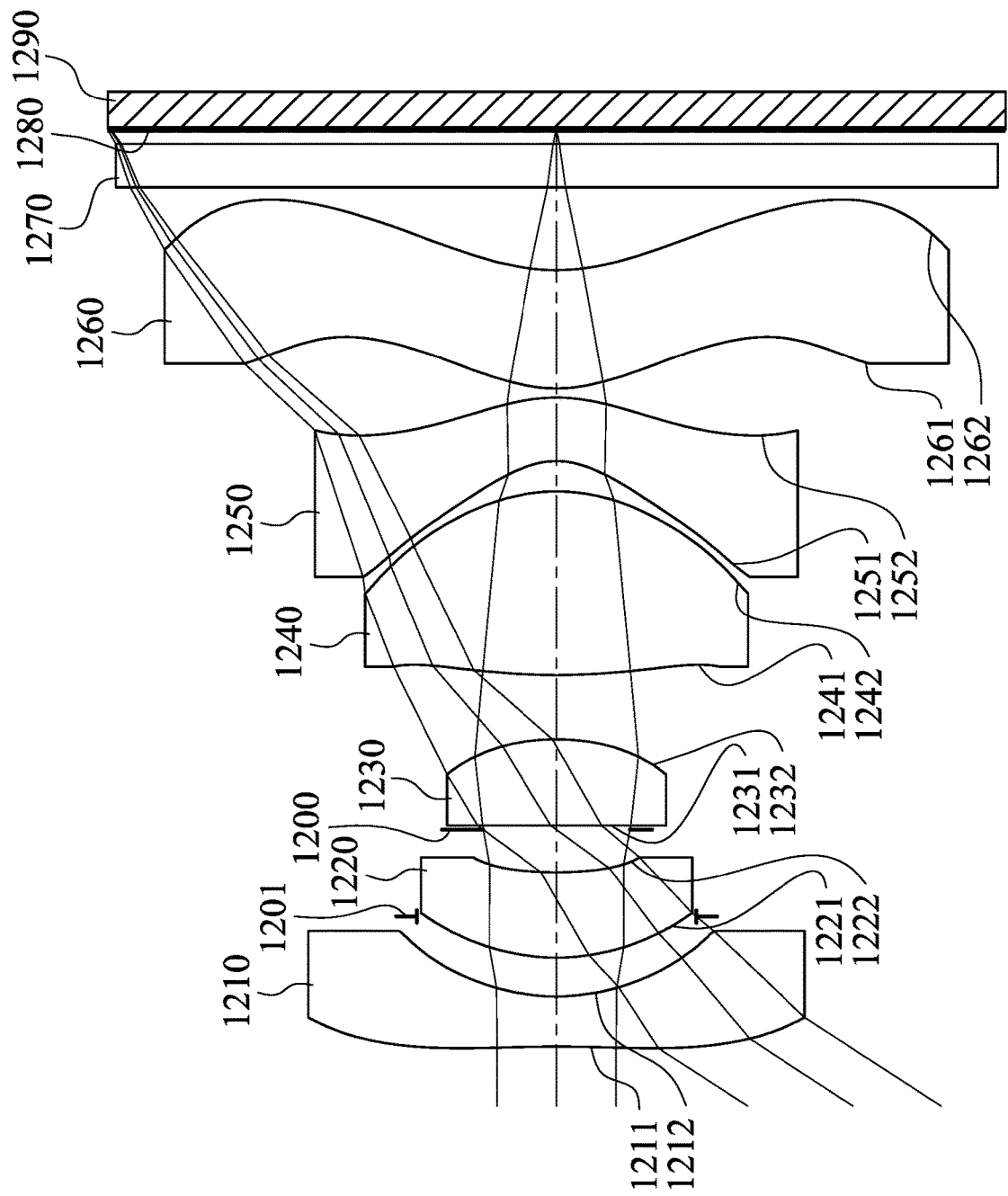
FIG. 23 is a schematic view of an image capturing apparatus according to the 12th embodiment of the present disclosure.
Figure 24:
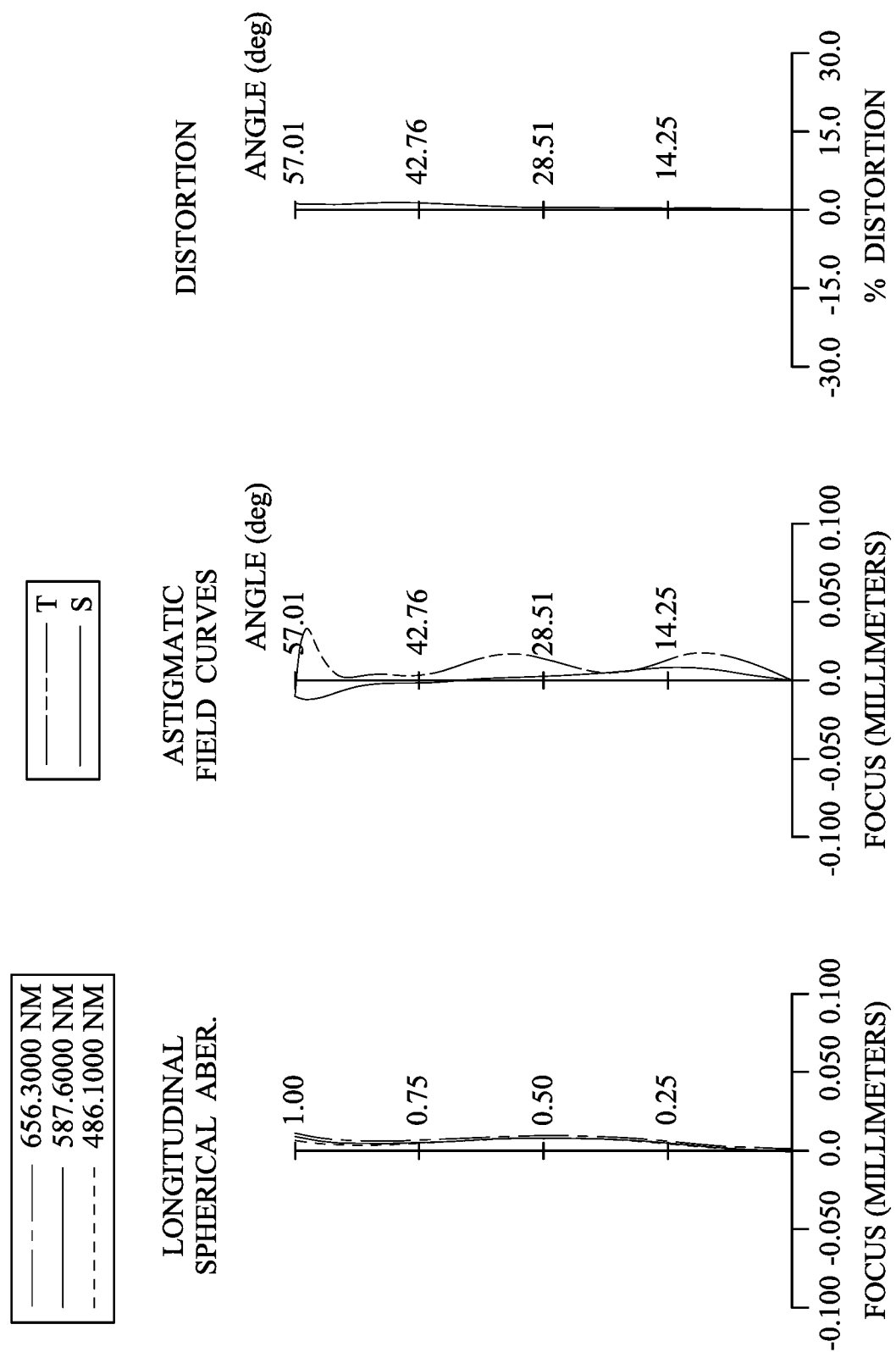
FIG. 24 shows spherical aberration curves, astigmatic field curves and a distortion curve of the image capturing apparatus according to the 12th embodiment.

FIG. 23 is a schematic view of an image capturing apparatus according to the 12th embodiment of the present disclosure. FIG. 24 shows, in order from left to right, spherical aberration curves, astigmatic field curves and a distortion curve of the image capturing apparatus according to the 12th embodiment. In FIG. 23, the image capturing apparatus includes the optical imaging module (its reference numeral is omitted), a driving unit (not shown herein) and an image sensor 1290, wherein the driving unit is for driving the optical imaging module. The optical imaging module includes, in order from an object side to an image side, a first lens element 1210, a stop 1201, a second lens element 1220, an aperture stop 1200, a third lens element 1230, a fourth lens element 1240, a fifth lens element 1250, a sixth lens element 1260, an IR-cut filter 1270 and an image surface 1280. The image sensor 1290 is disposed on the image surface 1280 of the optical imaging module. The optical imaging module includes six lens elements (1210, 1220, 1230, 1240, 1250 and 1260) without additional one or more lens elements inserted between the first lens element 1210 and the sixth lens element 1260.

The first lens element 1210 with negative refractive power has an object-side surface 1211 being concave and an image-side surface 1212 being concave. The first lens element 1210 is made of a plastic material, and has the object-side surface 1211 and the image-side surface 1212 being both aspheric.

The second lens element 1220 with positive refractive power has an object-side surface 1221 being convex and an image-side surface 1222 being concave. The second lens element 1220 is made of a plastic material, and has the object-side surface 1221 and the image-side surface 1222 being both aspheric.

The third lens element 1230 with positive refractive power has an object-side surface 1231 being concave and an image-side surface 1232 being convex. The third lens element 1230 is made of a plastic material, and has the object-side surface 1231 and the image-side surface 1232 being both aspheric.

The fourth lens element 1240 with positive refractive power has an object-side surface 1241 being convex and an image-side surface 1242 being convex. The fourth lens element 1240 is made of a plastic material, and has the object-side surface 1241 and the image-side surface 1242 being both aspheric.

The fifth lens element 1250 with negative refractive power has an object-side surface 1251 being concave and an image-side surface 1252 being convex. The fifth lens element 1250 is made of a plastic material, and has the object-side surface 1251 and the image-side surface 1252 being both aspheric. The sixth lens element 1260 with positive refractive power has an object-side surface 1261 being convex and an image-side surface 1262 being concave. The sixth lens element 1260 is made of a plastic material, and has the object-side surface 1261 and the image-side surface 1262 being both aspheric.

The IR-cut filter 1270 is made of a glass material and located between the sixth lens element 1260 and the image surface 1280, and will not affect the focal length of the optical imaging module.

The detailed optical data of the 12th embodiment are shown in TABLE 23 and the aspheric surface data are shown in TABLE 24 below.

TABLE 23

12th Embodiment
f = 1.38 mm, Fno = 2.39, HFOV = 57.0 deg.

| Surface # | | Curvature Radius | | Thickness | Material | Index | Abbe # | Focal Length |
| --- | --- | --- | --- | --- | --- | --- | --- | --- |
| 0 | Object | Plano | | Infinity | | | | |
| 1 | Lens 1 | −7.074 | ASP | 0.242 | Plastic | 1.545 | 56.1 | −1.56 |
| 2 | | 0.980 | ASP | 0.387 | | | | |
| 3 | Stop | Plano | | −0.200 | | | | |
| 4 | Lens 2 | 0.986 | ASP | 0.415 | Plastic | 1.545 | 56.1 | 3.33 |
| 5 | | 1.837 | ASP | 0.207 | | | | |
| 6 | Ape. Stop | Plano | | 0.020 | | | | |
| 7 | Lens 3 | −58.243 | ASP | 0.416 | Plastic | 1.545 | 56.1 | 2.04 |
| 8 | | −1.095 | ASP | 0.310 | | | | |
| 9 | Lens 4 | 2.774 | ASP | 0.890 | Plastic | 1.545 | 56.1 | 1.43 |
| 10 | | −0.960 | ASP | 0.146 | | | | |
| 11 | Lens 5 | −0.392 | ASP | 0.307 | Plastic | 1.671 | 19.5 | −1.50 |
| 12 | | −0.845 | ASP | 0.045 | | | | |
| 13 | Lens 6 | 0.751 | ASP | 0.573 | Plastic | 1.544 | 56.0 | 3.06 |
| 14 | | 1.000 | ASP | 0.400 | | | | |
| 15 | IR-cut filter | Plano | | 0.210 | Glass | 1.517 | 64.2 | — |
| 16 | | Plano | | 0.070 | | | | |
| 17 | Image | Plano | | — | | | | |

Reference wavelength is 587.6 nm (d-line).
Effective radius of Surface 3 (Stop) is 0.676 mm.

TABLE 24

Aspheric Coefficients

| Surface # | 1 | 2 | 4 | 5 | 7 | 8 |
|---|---|---|---|---|---|---|
| k= | −5.3407E+01 | −3.3661E−01 | −2.5109E+00 | 4.7769E−01 | 9.0000E+01 | −1.8586E−01 |
| A4= | 1.7190E−01 | −2.4223E−01 | 8.9935E−03 | 7.0212E−01 | −2.1196E−02 | −3.4430E−01 |
| A6= | −8.9135E−02 | −2.5285E−01 | −5.2655E−01 | −6.1251E−01 | 9.0829E−01 | −4.9504E−01 |
| A8= | 2.9759E−02 | 5.6222E+00 | 8.1653E+00 | 3.0453E+01 | −7.5641E+00 | 3.1282E+00 |
| A10= | 7.7062E−03 | −2.0785E+01 | −3.3556E+01 | −1.6357E+02 | 4.6950E+01 | −1.7878E+01 |
| A12= | −5.2819E−03 | 3.6419E+01 | 7.3483E+01 | 5.0306E+02 | −9.1351E+01 | 3.0915E+01 |
| A14= | 8.8746E−05 | −2.4593E+01 | −6.7765E+01 | | | |

| Surface # | 9 | 10 | 11 | 12 | 13 | 14 |
|---|---|---|---|---|---|---|
| k= | −8.1204E−01 | −4.5938E−01 | −1.2847E+00 | −5.2066E+00 | −2.8364E+00 | −1.3471E+00 |
| A4= | −2.0571E−01 | −5.2909E−01 | 1.5934E+00 | 6.2672E−02 | −3.2145E−01 | −3.2550E−01 |
| A6= | 5.4543E−01 | 3.2837E+00 | −3.5587E+00 | 5.0163E−01 | 2.5558E−01 | 2.3054E−01 |
| A8= | −2.0218E+00 | −7.6957E+00 | 6.6211E+00 | −8.1444E−01 | −1.6229E−01 | −1.2702E−01 |
| A10= | 4.6414E+00 | 9.4631E+00 | −1.0622E+01 | 4.2664E−01 | 4.0832E−02 | 4.8187E−02 |
| A12= | −6.6730E+00 | −6.5629E+00 | 9.7173E+00 | 6.9747E−02 | 5.6959E−03 | −1.2087E−02 |
| A14= | 3.7273E+00 | 2.1438E+00 | −3.4072E+00 | −1.3301E−01 | −3.9165E−03 | 1.7249E−03 |
| A16= | | | | 3.1694E−02 | 4.2285E−04 | −1.0243E−04 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from TABLE 23 and TABLE 24 as the following values and satisfy the following conditions:

| 12th Embodiment | |
|---|---|
| f (mm) | 1.38 |
| Fno | 2.39 |
| HFOV (deg.) | 57.0 |
| Nmax | 1.671 |
| V5/V6 | 0.35 |
| T12/T23 | 0.82 |
| T56/T23 | 0.20 |
| T56/CT6 | 0.08 |
| f/CT6 | 2.41 |
| CT1/CT6 | 0.42 |
| (T12 + T56)/(T23 + T34 + T45) | 0.34 |
| (R5 + R6)/(R5 − R6) | 1.04 |
| (|R11| + |R12|)/CT6 | 3.06 |
| |f1/f2| | 0.47 |
| |f/f1| + |f/f2| | 1.30 |
| (f/f3) − (f/f4) | −0.29 |
| f1/f5 | 1.04 |
| f4/f1 | −0.91 |
| Y11/Y62 | 0.61 |
| |Sag11/Sag21| | 0.60 |
| TL/f | 3.22 |
| tan(HFOV) | 1.54 |
| SD/TD | 0.72 |
| TL/ImgH | 2.06 |
| |DST1.0| (%) | 1.32 |
| |DST1.0/FOV| (%/deg.) | 0.01 |
| Yc62/f | 1.00 |

In addition, numbers of inflection points of the object-side surfaces and the image-side surfaces of the first lens element 1210 (Lens 1), the fourth lens element 1240 (Lens 4), the fifth lens element 1250 (Lens 5), and the image-side surface 1262 of the sixth lens element 1260 (Lens 6) in the 12th embodiment are listed below, wherein each the number is calculated for the inflection points from an axial vertex to a maximum effective radius position on the corresponding surface.

| 12th Embodiment-Number of Inflection Points | | | | |
|---|---|---|---|---|
| | Lens 1 | Lens 4 | Lens 5 | Lens 6 |
| Object-side surface | 1 | 1 | 1 | |
| Image-side surface | 1 | 1 | 1 | 1 |

13th Embodiment

Figure 30:
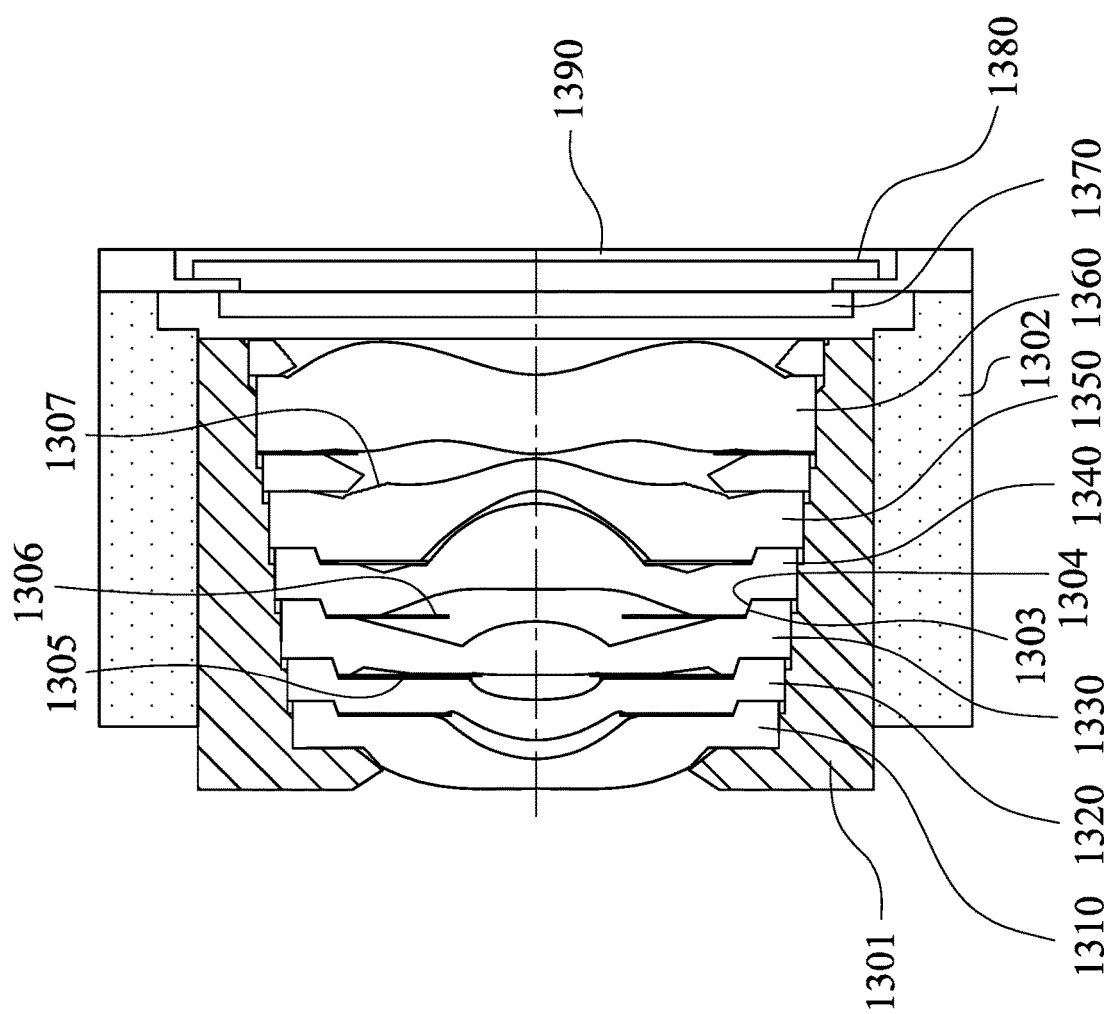
FIG. 30 is a schematic view of an image capturing apparatus according to the 13th embodiment of the present disclosure.

FIG. 30 is a schematic view of an image capturing apparatus according to the 13th embodiment of the present disclosure. In FIG. 30, the image capturing apparatus includes the optical imaging module (its reference numeral is omitted), a driving unit 1302 and an image sensor 1390, wherein the driving unit 1302 is for driving the optical imaging module. The optical imaging module includes, in order from an object side to an image side, a first lens element 1310, a second lens element 1320, a third lens element 1330, a fourth lens element 1340, a fifth lens element 1350, a sixth lens element 1360, a glass panel 1370 and an image surface 1380. The image sensor 1390 is disposed on the image surface 1380 of the optical imaging module. The optical imaging module includes six lens elements (1310, 1320, 1330, 1340, 1350 and 1360), wherein the first lens element 1310, the second lens element 1320, the third lens element 1330, the fourth lens element 1340, the fifth lens element 1350 and the sixth lens element 1360 are disposed in a lens barrel 1301. In addition, the glass panel 1370 can serve as a cover glass, filter or both, and will not affect the focal length of the optical imaging module.

In the 13th embodiment, the image capturing apparatus further includes light blocking elements 1305 and 1306 both acting as stops. The light blocking element 1305 is featured with adjustable luminous flux and disposed between the second lens element 1320 and the third lens element 1330.

The light blocking element 1306 is featured with fixed luminous flux and disposed between the third lens element 1330 and the fourth lens element 1340.

Furthermore, a portion outside of an effective radius of an image-side surface (its reference numeral is omitted) of the third lens element 1330 includes a connecting structure 1303. A portion outside of an effective radius of an object-side surface (its reference numeral is omitted) of the fourth lens element 1340 includes a connecting structure 1304. The connecting structures 1303 and 1304 are joined together for the alignment of the third lens element 1330 and the fourth lens element 1340 with each other.

In addition, a portion outside of an effective radius of an image-side surface (its reference numeral is omitted) of the fifth lens element 1350 includes a microstructure 1307, which can be processed by a treatment, such as sandblasting, laser processing, electrical discharge, coating, a surface microstructure design and so on.

14th Embodiment

Figure 31:
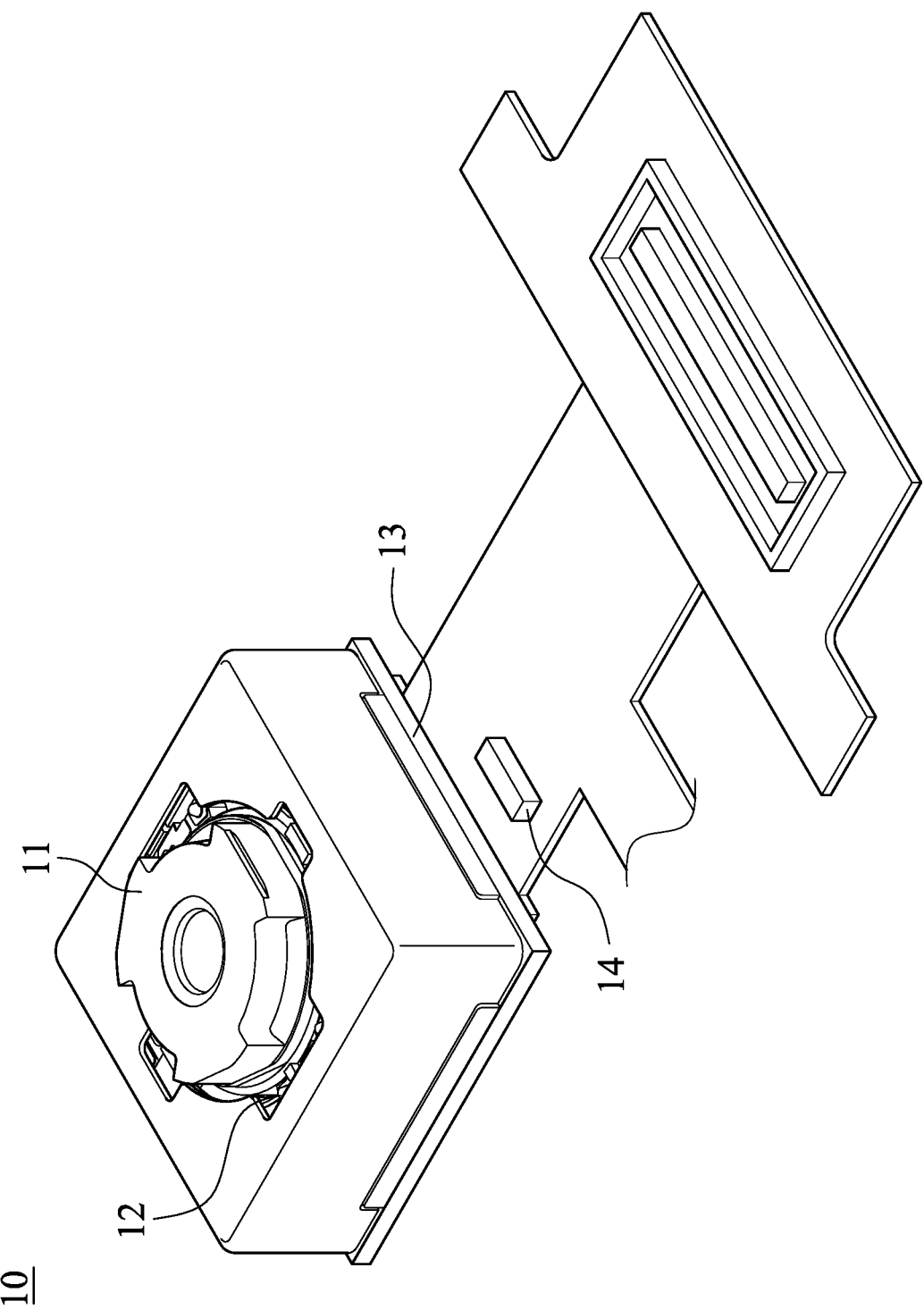
FIG. 31 is a three dimensional schematic view of an image capturing apparatus according to the 14th embodiment of the present disclosure.

FIG. 31 is a three dimensional schematic view of an image capturing apparatus 10 according to the 14th embodiment of the present disclosure. In FIG. 31, the image capturing apparatus 10 of the 14th embodiment is a camera module, the image capturing apparatus 10 includes an imaging lens assembly 11, a driving unit 12 and an image sensor 13, wherein the imaging lens assembly 11 includes the optical imaging module of the 1st embodiment and a lens barrel (not shown in drawings) for carrying the optical imaging module. The image capturing apparatus 10 can focus on an imaged object via the imaging lens assembly 11, perform image focusing by the driving unit 12, and generate an image on the image sensor 13, and the imaging data can be produced.

The image capturing apparatus 10 can include the image sensor 13 located on the image surface of the optical imaging module, such as CMOS and CCD, which has superior photosensitivity and low noise, thus it is favorable for providing realistic images with high definition image quality thereof.

Moreover, the image capturing apparatus 10 can further include an image stabilization module 14, which can be a kinetic energy sensor, such as an accelerometer, a gyroscope, or a Hall effect sensor. In the 14th embodiment, the image stabilization module 14 is a gyroscope, but not limited thereto. The variation of different axial directions of the optical imaging module can be adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

15th Embodiment

Figure 32A:
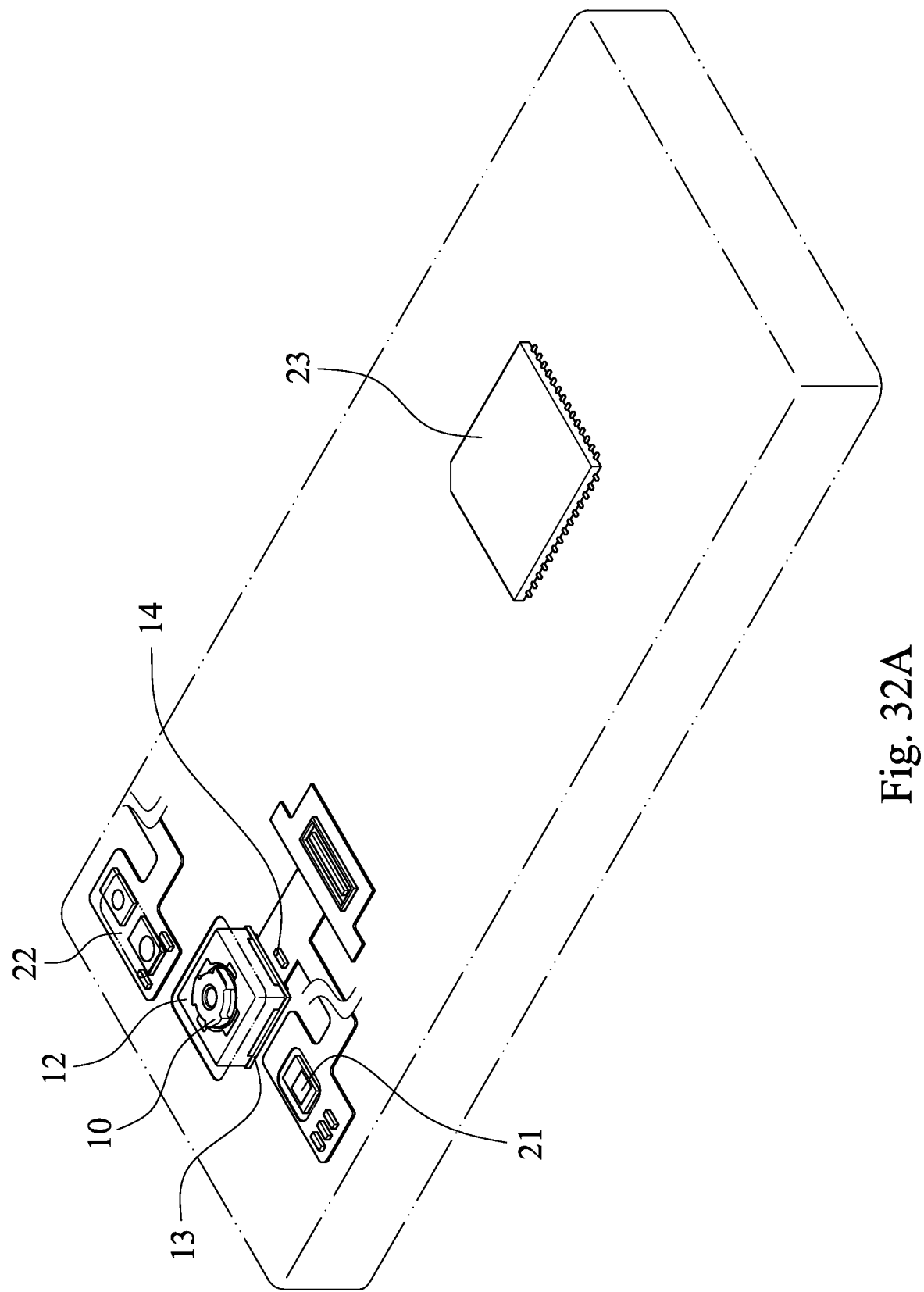
FIG. 32A is a schematic view of one side of an electronic device according to the 15th embodiment of the present disclosure.
Figure 32B:
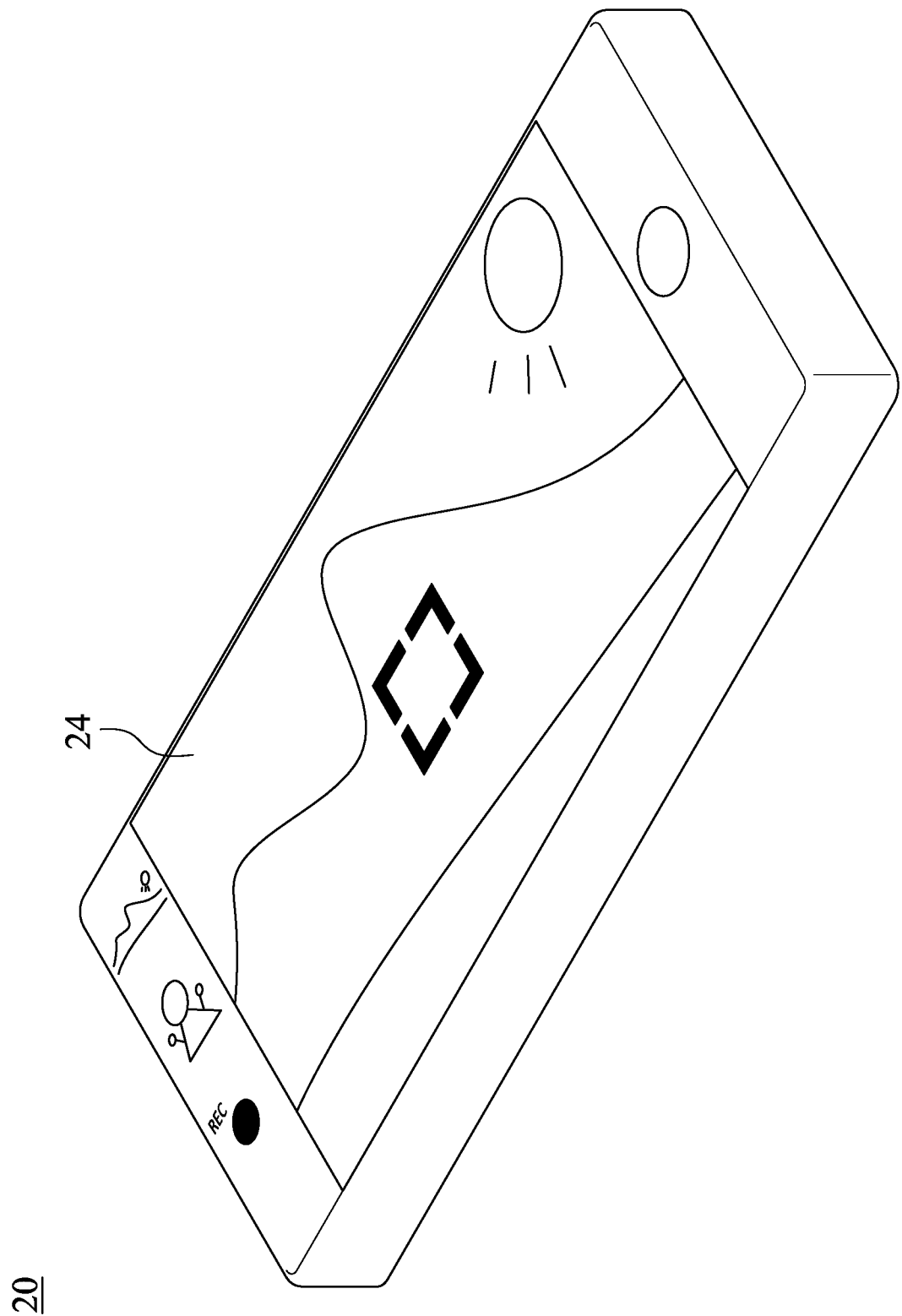
FIG. 32B is a schematic view of another side of the electronic device of FIG. 32A.
Figure 32C:
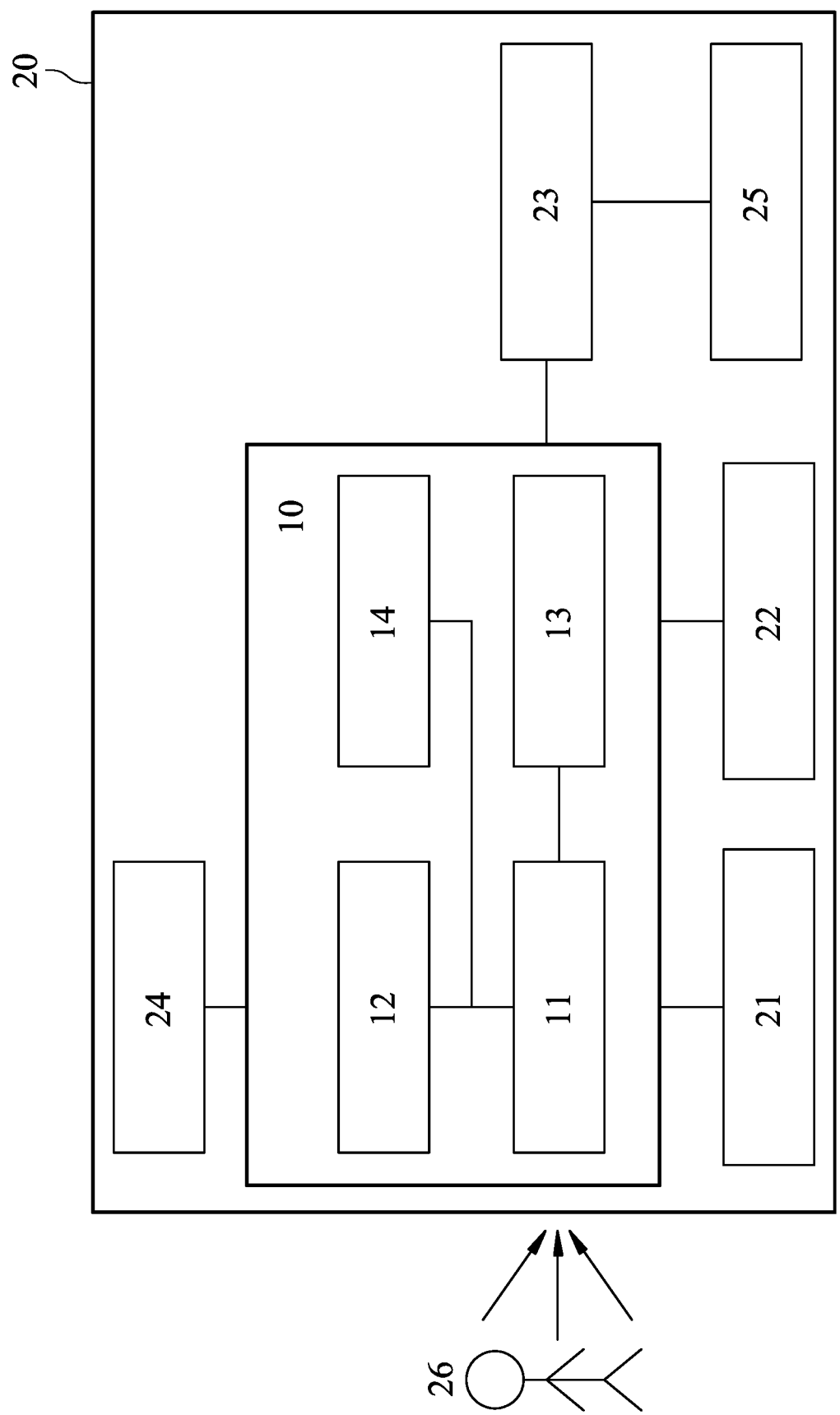
FIG. 32C is a system schematic view of the electronic device of FIG. 32A.

FIG. 32A is a schematic view of one side of an electronic device 20 according to the 15th embodiment of the present disclosure, FIG. 32B is a schematic view of another side of the electronic device 20 of FIG. 32A, and FIG. 32C is a system schematic view of the electronic device 20 of FIG. 32A. In FIG. 32A, FIG. 32B and FIG. 32C, the electronic device 20 according to the 15th embodiment is a smartphone, the electronic device 20 includes an image capturing apparatus 10, a flash module 21, a focusing assisting module 22, an image signal processor 23, a user interface 24 and an image software processor 25. When the user captures images via the user interface 24, the electronic device 20 focuses and generates an image via the image capturing apparatus 10 while compensating for low illumination via the flash module 21. Then, the electronic device 20 quickly focuses on an imaged object 26 according to its object distance information provided by the focusing assisting module 22, and optimizes the image via the image signal processor 23 and the image software processor 25. Thus, the image quality can be further enhanced. The focusing assisting module 22 can adopt infrared or laser for obtaining quick focusing, and the user interface 24 can utilize a touch screen or a physical button for capturing and processing the image with various functions of the image processing software.

The image capturing apparatus 10 of the 15th embodiment is the same as the aforementioned image capturing apparatus 10 of the 14th embodiment, and will not be stated herein again. Furthermore, the electronic device 20 can further include an imaging lens apparatus (not shown in drawings), wherein a maximum field of view of the imaging lens apparatus is smaller than the maximum field of view of the optical imaging module of the image capturing apparatus 10, and the applications of the imaging lens apparatus are similar to the applications of the image capturing apparatus 10. Thus, the electronic device 20 includes two lens apparatuses (one lens apparatus being the image capturing apparatus 10 and the other lens apparatus being the imaging lens apparatus are a total of two lens apparatuses).

16th Embodiment

Figure 33:
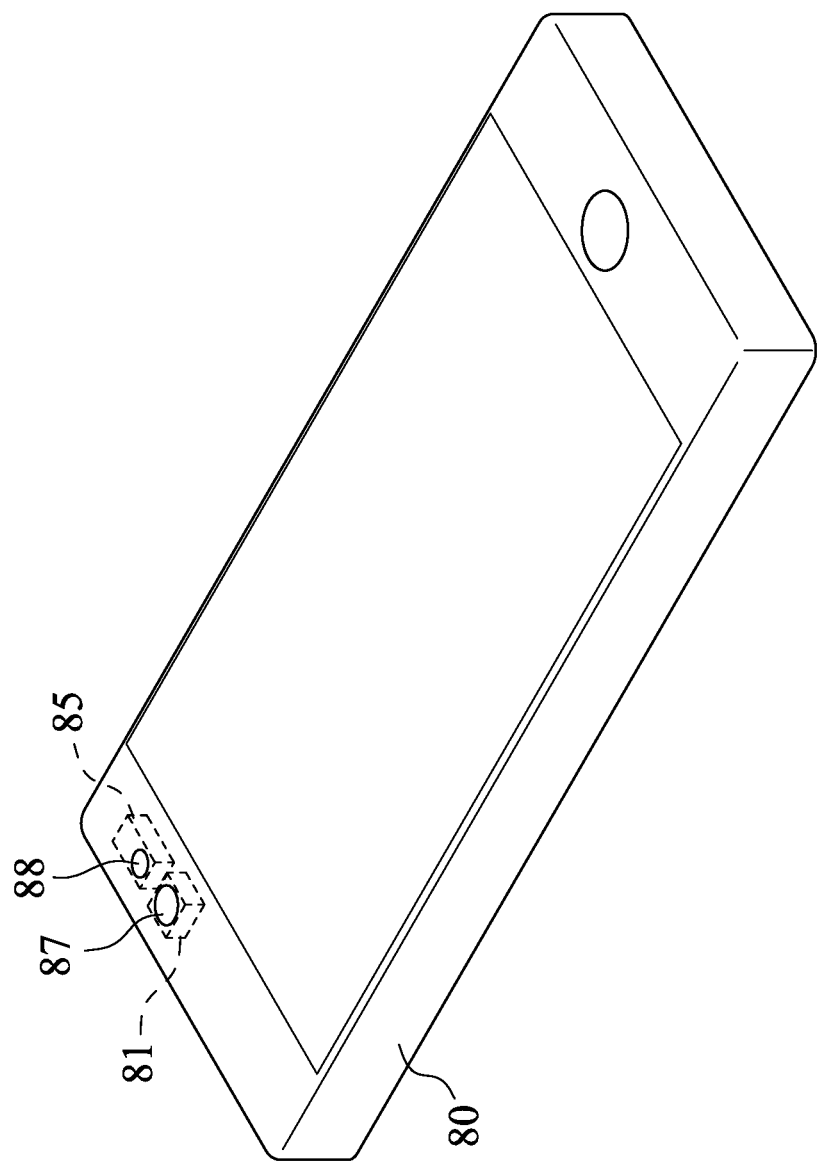
FIG. 33 is a schematic view of an electronic device according to the 16th embodiment of the present disclosure.

FIG. 33 is a schematic view of an electronic device 80 according to the 16th embodiment of the present disclosure. The electronic device 80 according to the 16th embodiment is a smartphone, wherein the electronic device 80 includes an image capturing apparatus 81 according to the present disclosure and an imaging lens apparatus 85, and a maximum field of view of the imaging lens apparatus 85 is smaller than a maximum field of view of the optical imaging module (not shown in drawings) of the image capturing apparatus 81. The electronic device 80 includes two lens apparatuses (one lens apparatus being the image capturing apparatus 81 and the other lens apparatus being the imaging lens apparatus 85 are a total of two lens apparatuses).

In the 16th embodiment, an optical axis of the image capturing apparatus 81 and an optical axis of the imaging lens apparatus 85 are substantially perpendicular to each other, wherein the imaging lens apparatus 85 includes a reflective element (not shown in drawings). Furthermore, the electronic device 80 further includes protection housings 87 and 88, wherein the protection housings 87 and 88 are respectively disposed on an object side of the image capturing apparatus 81 and on an object side of the imaging lens apparatus 85, and the protection housings 87 and 88 are both located on the same side with a screen (its reference numeral is omitted) of the electronic device 80.

17th Embodiment

Figure 34:
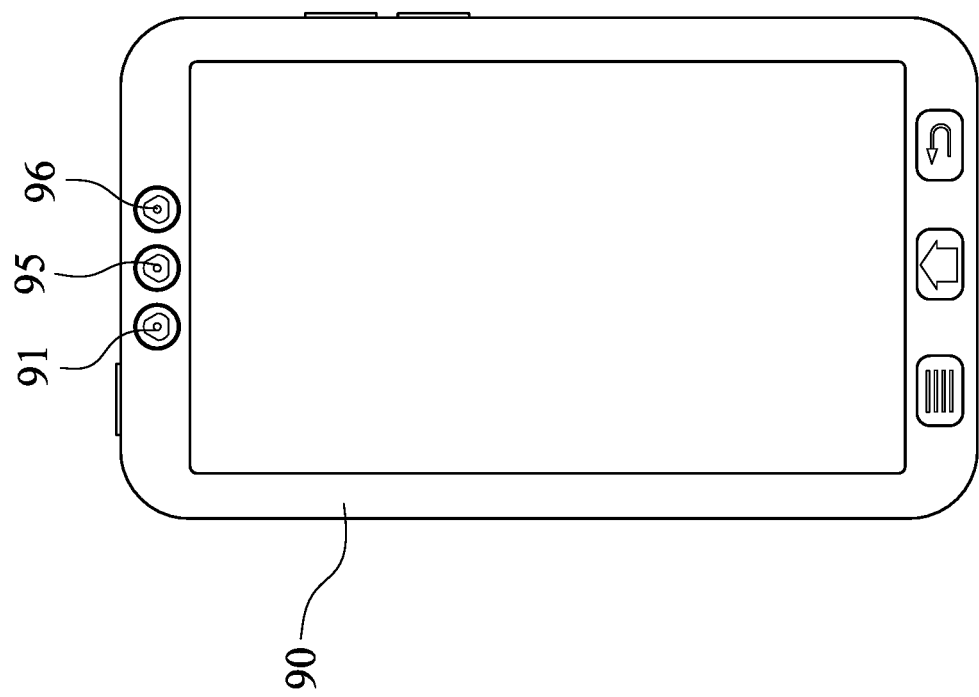
FIG. 34 is a schematic view of an electronic device according to the 17th embodiment of the present disclosure.

FIG. 34 is a schematic view of an electronic device 90 according to the 17th embodiment of the present disclosure. The electronic device 90 according to the 17th embodiment is a smartphone, wherein the electronic device 90 includes an image capturing apparatus 91 according to the present disclosure and imaging lens apparatuses 95, 96, and both a maximum field of view of the imaging lens apparatus 95 and a maximum field of view of the imaging lens apparatus 96 are smaller than a maximum field of view of the optical imaging module (not shown in drawings) of the image capturing apparatus 91. The electronic device 90 includes three lens apparatuses (one lens apparatus indicates the image capturing apparatus 91, the other two lens apparatuses indicate the imaging lens apparatuses 95, 96, and a total of three lens apparatuses).

18th Embodiment

Figure 35:
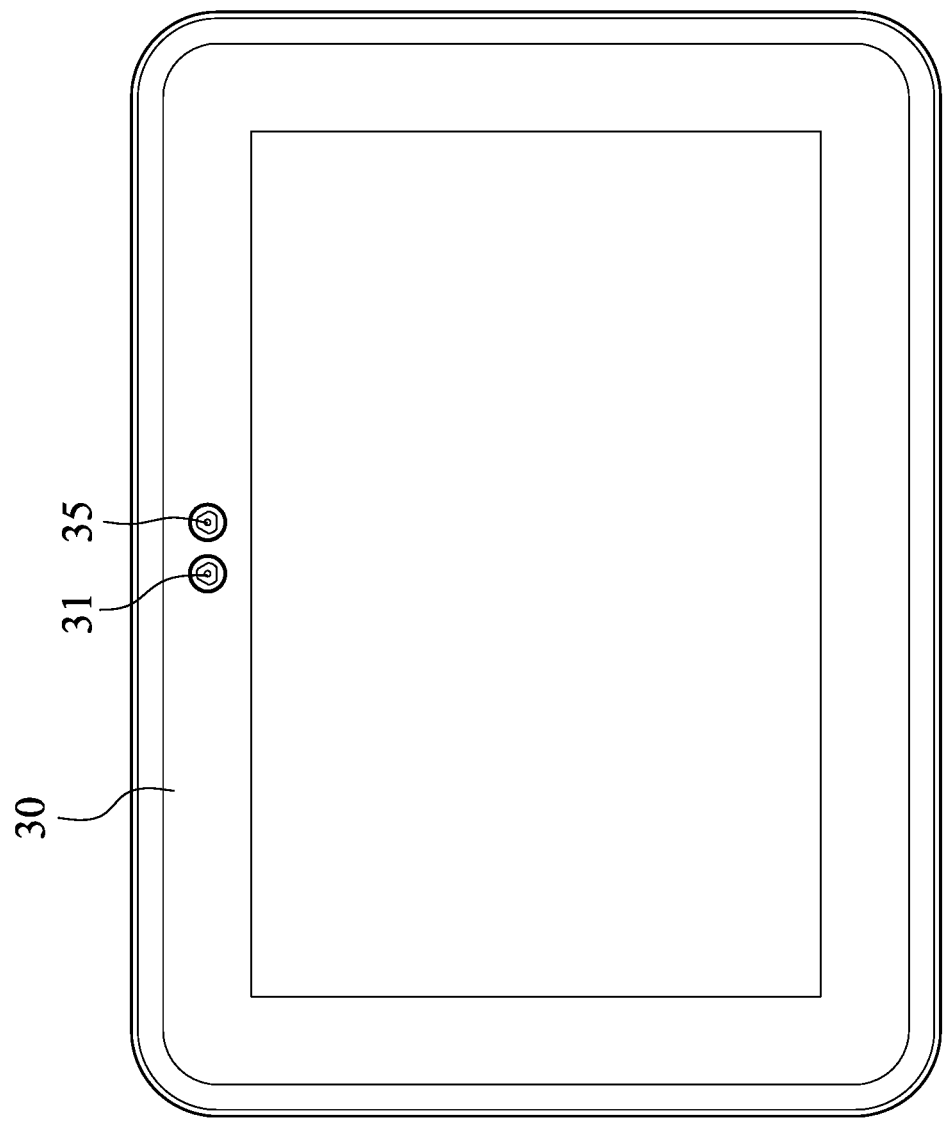
FIG. 35 is a schematic view of an electronic device according to the 18th embodiment of the present disclosure.

FIG. 35 is a schematic view of an electronic device 30 according to the 18th embodiment of the present disclosure. The electronic device 30 according to the 18th embodiment is a tablet personal computer, wherein the electronic device 30 includes an image capturing apparatus 31 according to the present disclosure and an imaging lens apparatus 35, and a maximum field of view of the imaging lens apparatus 35 is smaller than a maximum field of view of the optical imaging module (not shown in drawings) of the image capturing apparatus 31.

19th Embodiment

Figure 36:
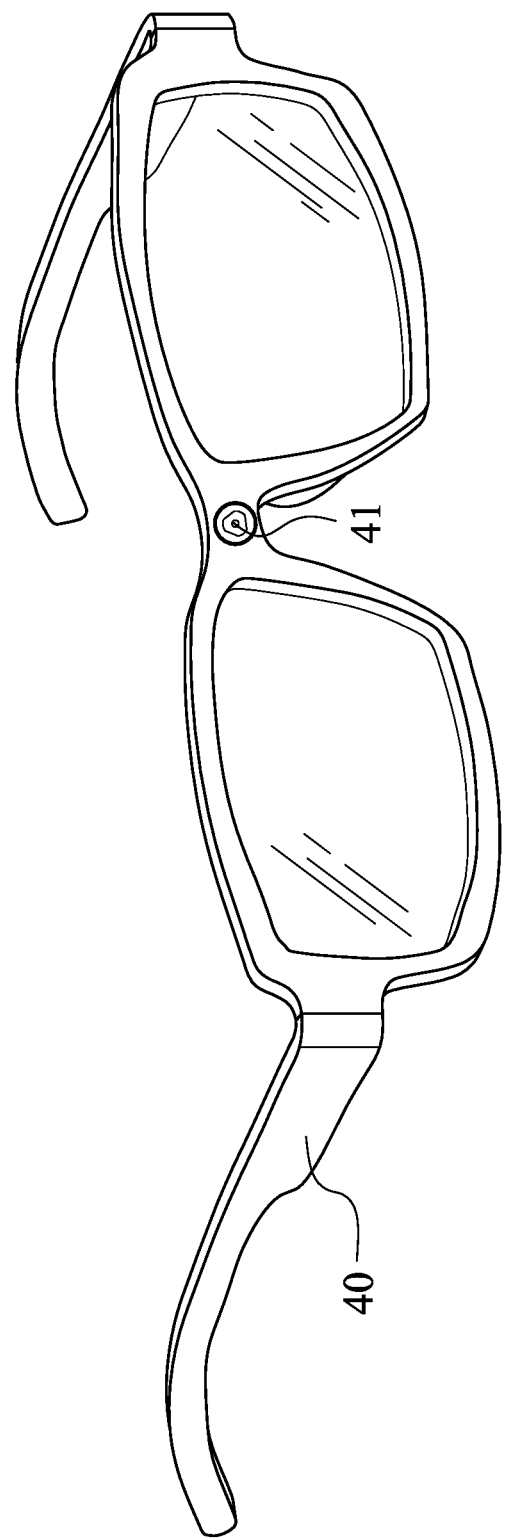
FIG. 36 is a schematic view of an electronic device according to the 19th embodiment of the present disclosure.

FIG. 36 is a schematic view of an electronic device 40 according to the 19th embodiment of the present disclosure. The electronic device 40 according to the 19th embodiment is a wearable device, wherein the electronic device 40 includes an image capturing apparatus 41 according to the present disclosure.

20th Embodiment

Figure 37:
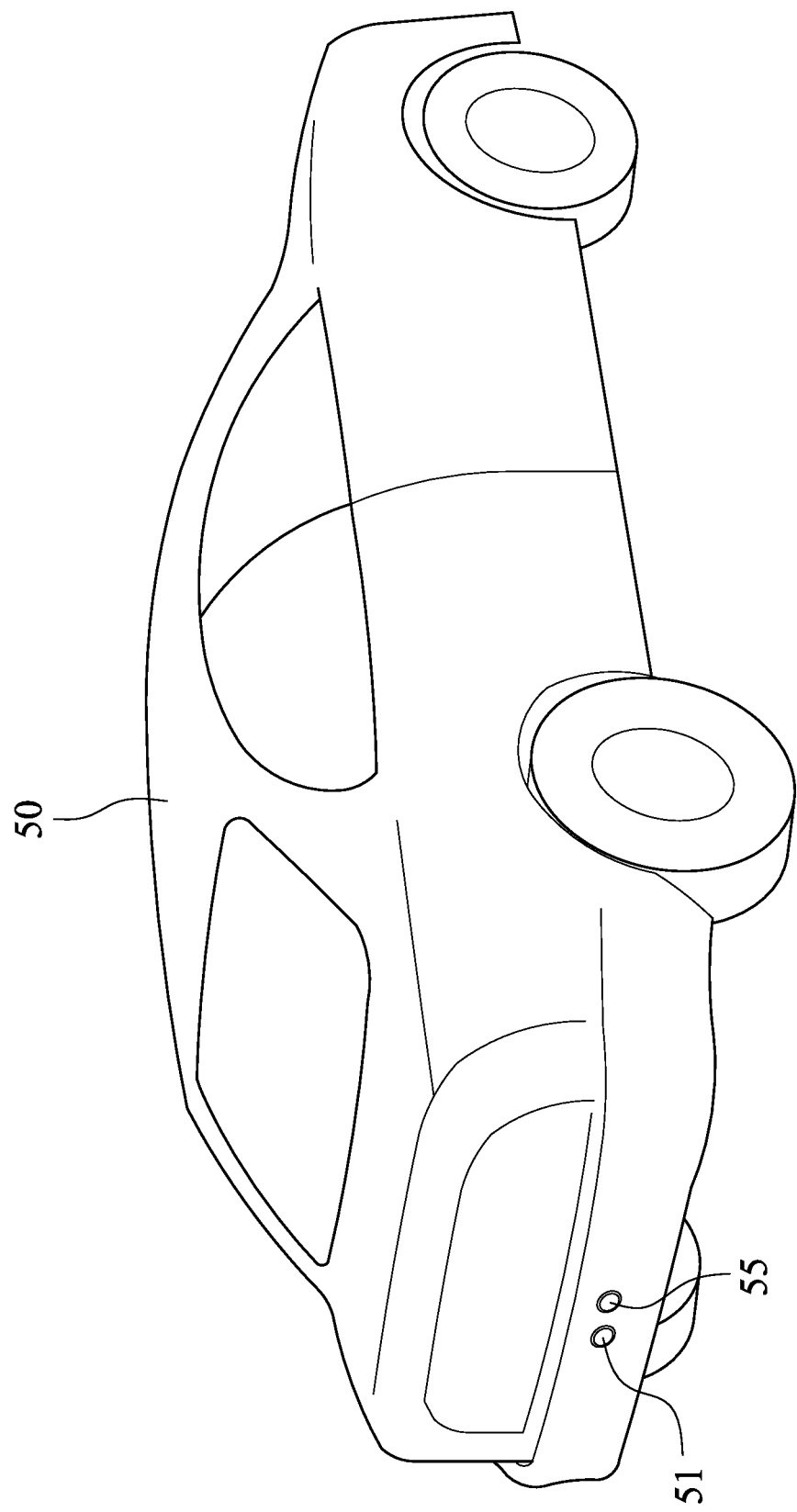
FIG. 37 is a schematic view of an electronic device according to the 20th embodiment of the present disclosure.

FIG. 37 is a schematic view of an electronic device 50 according to the 20th embodiment of the present disclosure. The electronic device 50 according to the 20th embodiment is a rear view camera system, wherein the electronic device 50 includes an image capturing apparatus 51 according to the present disclosure and an imaging lens apparatus 55, and a maximum field of view of the imaging lens apparatus 55 is smaller than a maximum field of view of the optical imaging module (not shown in drawings) of the image capturing apparatus 51.

21th Embodiment

Figure 38:
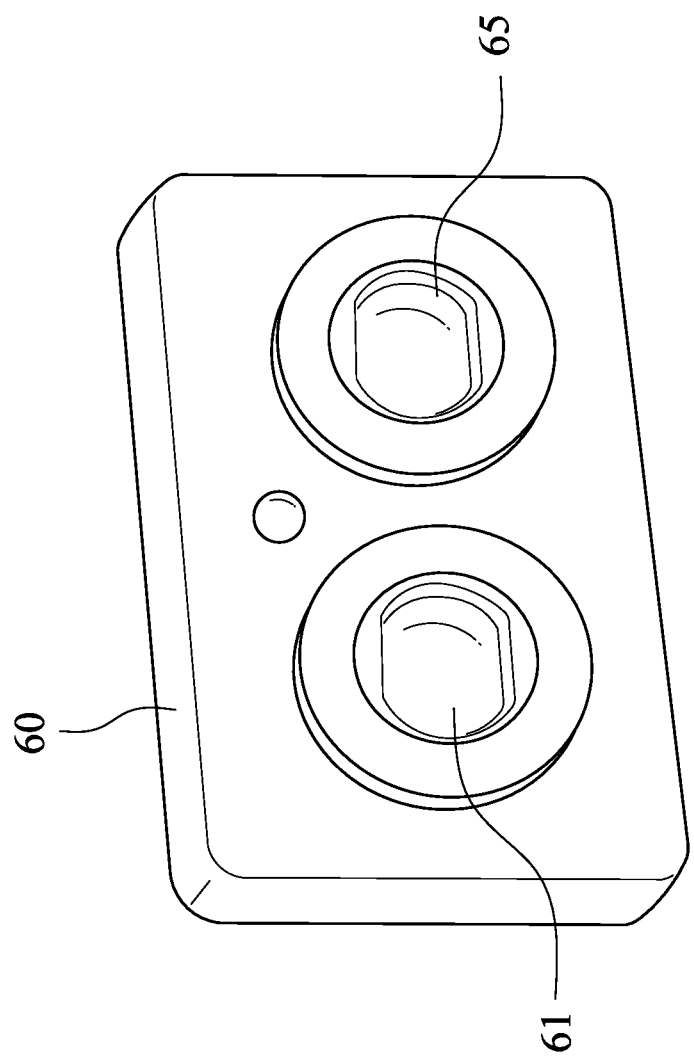
FIG. 38 is a schematic view of an electronic device according to the 21th embodiment of the present disclosure.

FIG. 38 is a schematic view of an electronic device 60 according to the 21th embodiment of the present disclosure. The electronic device 60 according to the 21th embodiment is a driving recorder, wherein the electronic device 60 includes an image capturing apparatus 61 according to the present disclosure and an imaging lens apparatus 65, and a maximum field of view of the imaging lens apparatus 65 is smaller than a maximum field of view of the optical imaging module (not shown in drawings) of the image capturing apparatus 61.

22th Embodiment

Figure 39:
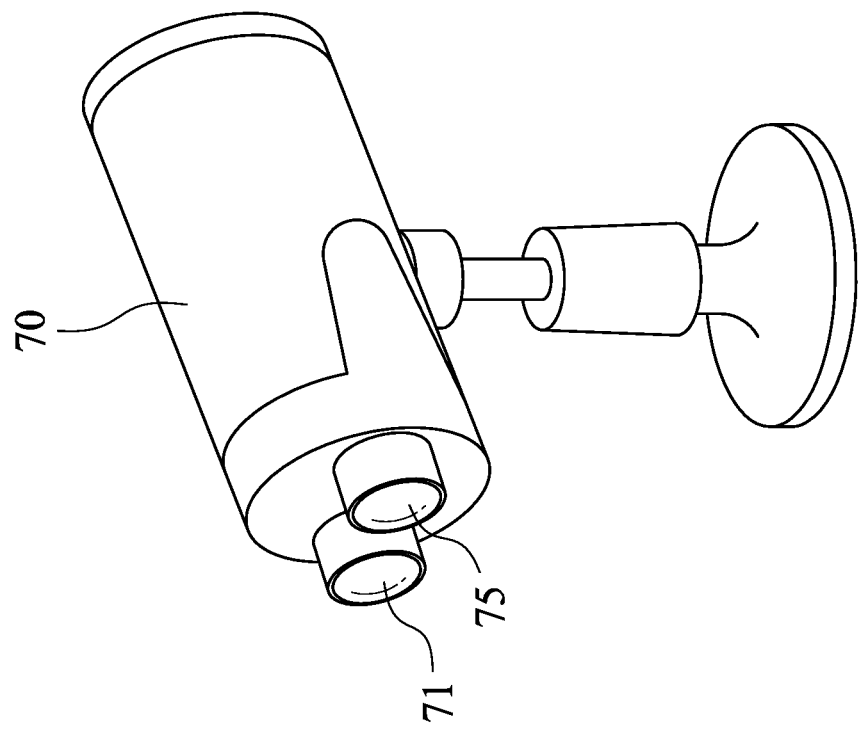
FIG. 39 is a schematic view of an electronic device according to the 22th embodiment of the present disclosure.

FIG. 39 is a schematic view of an electronic device 70 according to the 22th embodiment of the present disclosure. The electronic device 70 according to the 22th embodiment is a surveillance camera, wherein the electronic device 70 includes an image capturing apparatus 71 according to the present disclosure and an imaging lens apparatus 75, and a maximum field of view of the imaging lens apparatus 75 is smaller than a maximum field of view of the optical imaging module (not shown in drawings) of the image capturing apparatus 71.

The foregoing description, for purpose of explanation, has been described with reference to specific embodiments. It is to be noted that Tables 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging module comprising six lens elements, the six lens elements being, in order from an object side to an image side:
   a first lens element, a second lens element, a third lens element, a fourth lens element, a fifth lens element and a sixth lens element;
   wherein each of the six lens elements has an object-side surface facing towards the object side and an image-side surface facing towards the image side;
   wherein the first lens element has negative refractive power, the object-side surface of the first lens element is concave in a paraxial region thereof, the image-side surface of the first lens element is concave in a paraxial region thereof, at least one of the object-side surface and the image-side surface of the first lens element comprises at least one inflection point, the second lens element has positive refractive power, the object-side surface of the second lens element is convex in a paraxial region thereof, the image-side surface of the fourth lens element is convex in a paraxial region thereof, the object-side surface of the sixth lens element is convex in a paraxial region thereof, and the image-side surface of the sixth lens element is concave in a paraxial region thereof and comprises at least one inflection point;
   wherein a maximum value among refractive indices of the six lens elements is Nmax, an axial distance between the second lens element and the third lens element is T23, an axial distance between the fifth lens element and the sixth lens element is T56, an axial distance between the object-side surface of the first lens element and an image surface is TL, a maximum image height of the optical imaging module is ImgH, a focal length of the first lens element is f1, a focal length of the fourth lens element is f4, and the following conditions are satisfied:

$1.66 \leq N\text{max} < 1.72$;

$0.11 \leq T56/T23 \leq 1.12$;

$TL/\text{ImgH} < 3.50$; and $f4/f1 < -0.20$.

2. The optical imaging module of claim 1, wherein the image-side surface of the second lens element is concave in a paraxial region thereof.

3. The optical imaging module of claim 1, further comprising:
an aperture stop disposed between the second lens element and the third lens element;
wherein a vertical distance between a critical point in an off-axis region on the image-side surface of the sixth lens element and an optical axis is Yc62, a focal length of the optical imaging module is f, and the following condition is satisfied:

$0.50 < Yc62/f < 1.0$.

4. The optical imaging module of claim 1, wherein the axial distance between the second lens element and the third lens element is T23, the axial distance between the fifth lens element and the sixth lens element is T56, and the following condition is satisfied:

$0.11 \leq T56/T23 < 0.80$.

5. The optical imaging module of claim 1, wherein a half of a maximum field of view of the optical imaging module is HFOV, an f-number of the optical imaging module is Fno, the axial distance between the object-side surface of the first lens element and the image surface is TL, the maximum image height of the optical imaging module is ImgH, and the following conditions are satisfied:

$1.20 < \tan(HFOV) < 6.0$;

$1.40 < Fno < 2.80$; and $1.50 < TL/ImgH < 2.50$.

6. An optical imaging module comprising six lens elements, the six lens elements being, in order from an object side to an image side:
a first lens element, a second lens element, a third lens element, a fourth lens element, a fifth lens element and a sixth lens element;
wherein each of the six lens elements has an object-side surface facing towards the object side and an image-side surface facing towards the image side;
wherein the first lens element has negative refractive power, the image-side surface of the first lens element is concave in a paraxial region thereof, at least one of the object-side surface and the image-side surface of the first lens element comprises at least one inflection point, the second lens element has positive refractive power, the object-side surface of the second lens element is convex in a paraxial region thereof, the object-side surface of the sixth lens element is convex in a paraxial region thereof, and the image-side surface of the sixth lens element is concave in a paraxial region thereof and comprises at least one inflection point;
wherein an axial distance between the second lens element and the third lens element is larger than an axial distance between the fifth lens element and the sixth lens element, a maximum value among refractive indices of the six lens elements is Nmax, an f-number of the optical imaging module is Fno, an axial distance between the object-side surface of the first lens element and an image surface is TL, a focal length of the optical imaging module is f, a maximum image height of the optical imaging module is ImgH, and the following conditions are satisfied:

$1.66 \leq Nmax < 1.72$;

$1.40 < Fno \leq 2.39$;

$2.0 < TL/f < 3.0$; and $TL/ImgH < 3.50$.

7. The optical imaging module of claim 6, wherein the fourth lens element has positive refractive power, and the fifth lens element has negative refractive power.

8. The optical imaging module of claim 6, wherein the object-side surface of the first lens element is concave in a paraxial region thereof.

9. The optical imaging module of claim 6, wherein the object-side surface of the fourth lens element is convex in a paraxial region thereof, an axial distance between the first lens element and the second lens element is T12, the axial distance between the second lens element and the third lens element is T23, an axial distance between the third lens element and the fourth lens element is T34, an axial distance between the fourth lens element and the fifth lens element is T45, the axial distance between the fifth lens element and the sixth lens element is T56, and the following condition is satisfied:

$(T12+T56)/(T23+T34+T45) < 3.0$.

10. The optical imaging module of claim 6, wherein the f-number of the optical imaging module is Fno, and the following condition is satisfied:

$1.40 < Fno \leq 2.27$.

11. The optical imaging module of claim 6, wherein a distortion percentage on a maximum image height of the optical imaging module is DST1.0, a maximum field of view of the optical imaging module is FOV, and the following condition is satisfied:

$|DST1.0/FOV| < 0.25$ (%/degrees).

12. An image capturing apparatus, comprising:
the optical imaging module of claim 6;
a driving unit for driving the optical imaging module; and
an image sensor, wherein the image sensor is disposed on an image surface of the optical imaging module.

13. An electronic device, comprising:
the image capturing apparatus of claim 12; and
an imaging lens apparatus, wherein the image capturing apparatus and the imaging lens apparatus face the same side, and a maximum field of view of the imaging lens apparatus is smaller than a maximum field of view of the image capturing apparatus.

14. An optical imaging module comprising six lens elements, the six lens elements being, in order from an object side to an image side:
a first lens element, a second lens element, a third lens element, a fourth lens element, a fifth lens element and a sixth lens element;
wherein each of the six lens elements has an object-side surface facing towards the object side and an image-side surface facing towards the image side;
wherein the first lens element has negative refractive power, the second lens element has positive refractive power, the object-side surface of the second lens element is convex in a paraxial region thereof, the object-side surface of the fourth lens element is convex in a paraxial region thereof, the object-side surface of the sixth lens element is convex in a paraxial region thereof, and the image-side surface of the sixth lens element is concave in a paraxial region thereof and comprises at least one inflection point;
wherein an axial distance between the second lens element and the third lens element is larger than an axial distance between the fifth lens element and the sixth lens element, a maximum value among refractive indices of the six lens elements is Nmax, a maximum effective radius of the object-side surface of the first lens element is Y11, a maximum effective radius of the image-side surface of the sixth lens element is Y62, and the following conditions are satisfied:

1.66≤$N$max<1.72; and 0.50<$Y11/Y62$<1.50.

15. The optical imaging module of claim 14, wherein the third lens element has positive refractive power, and the image-side surface of the third lens element is convex in a paraxial region thereof.

16. The optical imaging module of claim 14, wherein a focal length of the optical imaging module is f, a focal length of the first lens element is f1, a focal length of the second lens element is f2, and the following condition is satisfied:

0.80<|$f/f1$|+|$f/f2$|<3.80.

17. The optical imaging module of claim 14, wherein the axial distance between the fifth lens element and the sixth lens element is T56, a central thickness of the sixth lens element is CT6, and the following condition is satisfied:

$T56/CT6$<0.50.

18. The optical imaging module of claim 14, wherein an axial distance between the object-side surface of the first lens element and an image surface is TL, a maximum image height of the optical imaging module is ImgH, a distortion percentage on a maximum image height of the optical imaging module is DST1.0, and the following conditions are satisfied:

1.50<$TL$/ImgH<2.50; and

|$DST1.0$|<30%.

19. The optical imaging module of claim 14, wherein a curvature radius of the object-side surface of the sixth lens element is R11, a curvature radius of the image-side surface of the sixth lens element is R12, a central thickness of the sixth lens element is CT6, and the following condition is satisfied:

1.50<(|$R11$|+|$R12$|)/$CT6$<5.50.

20. An optical imaging module comprising six lens elements, the six lens elements being, in order from an object side to an image side:
a first lens element, a second lens element, a third lens element, a fourth lens element, a fifth lens element and a sixth lens element;
wherein each of the six lens elements has an object-side surface facing towards the object side and an image-side surface facing towards the image side;
wherein the first lens element has negative refractive power, the image-side surface of the first lens element is concave in a paraxial region thereof, at least one of the object-side surface and the image-side surface of the first lens element comprises at least one inflection point, the second lens element has positive refractive power, the object-side surface of the second lens element is convex in a paraxial region thereof, the object-side surface of the sixth lens element is convex in a paraxial region thereof, and the image-side surface of the sixth lens element is concave in a paraxial region thereof and comprises at least one inflection point;
wherein the optical imaging module further comprises an aperture stop, an axial distance between the second lens element and the third lens element is larger than an axial distance between the fifth lens element and the sixth lens element, a maximum value among refractive indices of the six lens elements is Nmax, an axial distance between the aperture stop and the image-side surface of the sixth lens element is SD, an axial distance between the object-side surface of the first lens element and the image-side surface of the sixth lens element is TD, an axial distance between the object-side surface of the first lens element and an image surface is TL, a focal length of the optical imaging module is f, a maximum image height of the optical imaging module is ImgH, a focal length of the first lens element is f1, a focal length of the fifth lens element is f5, and the following conditions are satisfied:

1.66≤$N$max<1.72;

0.50<$SD/TD$<0.80;

2.0<$TL/f$<3.0;

$TL$/ImgH<3.50; and 0.30<$f1/f5$<1.0.

21. The optical imaging module of claim 20, wherein the image-side surface of the fifth lens element is convex in a paraxial region thereof, and at least one of the object-side surfaces and the image-side surfaces of the fourth lens element and the fifth lens element comprises at least one inflection point.

22. The optical imaging module of claim 20, wherein the axial distance between the second lens element and the third lens element is T23, the axial distance between the fifth lens element and the sixth lens element is T56, and the following condition is satisfied:

0<$T56/T23$<0.80.

23. The optical imaging module of claim 20, wherein a curvature radius of the object-side surface of the third lens element is R5, a curvature radius of the image-side surface of the third lens element is R6, a half of a maximum field of view of the optical imaging module is HFOV, and the following conditions are satisfied:

0<($R5+R6$)/($R5-R6$)<1.0; and 1.20<tan(HFOV)<6.0.

24. The optical imaging module of claim 20, wherein the focal length of the first lens element is f1, a focal length of the second lens element is f2, an axial distance between the first lens element and the second lens element is T12, the axial distance between the second lens element and the third lens element is T23, and the following conditions are satisfied:

|$f1/f2$|<3.0; and

0<$T12/T23$<2.80.

25. An optical imaging module comprising six lens elements, the six lens elements being, in order from an object side to an image side:
a first lens element, a second lens element, a third lens element, a fourth lens element, a fifth lens element and a sixth lens element;
wherein each of the six lens elements has an object-side surface facing towards the object side and an image-side surface facing towards the image side;
wherein the first lens element has negative refractive power, the object-side surface of the first lens element is concave in a paraxial region thereof, at least one of the object-side surface and the image-side surface of the first lens element comprises at least one inflection point, the second lens element has positive refractive power, the object-side surface of the second lens element is convex in a paraxial region thereof, the object-side surface of the sixth lens element is convex in a paraxial region thereof, and the image-side surface of the sixth lens element is concave in a paraxial region thereof and comprises at least one inflection point;

wherein an axial distance between the first lens element and the second lens element is larger than an axial distance between the fourth lens element and the fifth lens element, an axial distance between the second lens element and the third lens element is larger than an axial distance between the fifth lens element and the sixth lens element, a maximum value among refractive indices of the six lens elements is Nmax, an axial distance between the object-side surface of the first lens element and an image surface is TL, a maximum image height of the optical imaging module is ImgH, and the following conditions are satisfied:

$1.66 \leq Nmax < 1.72$; and $TL/ImgH < 3.50$.

26. The optical imaging module of claim 25, wherein the fifth lens element has negative refractive power.

27. The optical imaging module of claim 25, further comprising:

an aperture stop disposed between the second lens element and the third lens element;

wherein a half of a maximum field of view of the optical imaging module is HFOV, and the following condition is satisfied:

$1.20 < \tan(HFOV) < 6.0$.

28. The optical imaging module of claim 25, wherein the axial distance between the object-side surface of the first lens element and the image surface is TL, the maximum image height of the optical imaging module is ImgH, a vertical distance between a critical point in an off-axis region on the image-side surface of the sixth lens element and an optical axis is Yc62, a focal length of the optical imaging module is f, and the following conditions are satisfied:

$1.50 < TL/ImgH < 2.50$; and $0.50 < Yc62/f < 1.0$.

29. The optical imaging module of claim 25, wherein the axial distance between the first lens element and the second lens element is T12, the axial distance between the second lens element and the third lens element is T23, an axial distance between the third lens element and the fourth lens element is T34, the axial distance between the fourth lens element and the fifth lens element is T45, the axial distance between the fifth lens element and the sixth lens element is T56, and the following condition is satisfied:

$(T12+T56)/(T23+T34+T45) < 3.0$.

* * * * *